United States Patent
Liess

(10) Patent No.: US 10,323,484 B2
(45) Date of Patent: Jun. 18, 2019

(54) COMBINED MULTI-COUPLER FOR A TOP DRIVE AND A METHOD FOR USING THE SAME FOR CONSTRUCTING A WELLBORE

(71) Applicant: Weatherford Technology Holdings, LLC, Houston, TX (US)

(72) Inventor: Martin Liess, Seelze (DE)

(73) Assignee: WEATHERFORD TECHNOLOGY HOLDINGS, LLC, Houston, TX (US)

(*) Notice: Subject to any disclaimer, the term of this patent is extended or adjusted under 35 U.S.C. 154(b) by 78 days.

(21) Appl. No.: 15/004,736

(22) Filed: Jan. 22, 2016

(65) Prior Publication Data

US 2017/0067320 A1    Mar. 9, 2017

Related U.S. Application Data

(60) Provisional application No. 62/214,310, filed on Sep. 4, 2015.

(51) Int. Cl.

| | |
|---|---|
| *E21B 41/00* | (2006.01) |
| *E21B 19/20* | (2006.01) |
| *E21B 3/02* | (2006.01) |
| *E21B 19/16* | (2006.01) |

(52) U.S. Cl.
CPC ............ *E21B 41/00* (2013.01); *E21B 3/02* (2013.01); *E21B 19/16* (2013.01); *E21B 19/20* (2013.01)

(58) Field of Classification Search
CPC ........ E21B 17/046; E21B 19/06; E21B 19/16; E21B 3/02
See application file for complete search history.

(56) References Cited

U.S. PATENT DOCUMENTS

| | | | |
|---|---|---|---|
| 1,367,156 A | | 2/1921 | McAlvay et al. |
| 1,610,977 A | | 12/1926 | Scott |
| 1,822,444 A | | 9/1931 | MacClatchie |
| 2,370,354 A | * | 2/1945 | Hurst ............ F16L 37/20 |
| | | | 285/27 |

(Continued)

FOREIGN PATENT DOCUMENTS

| | | |
|---|---|---|
| AU | 2012201644 A1 | 4/2012 |
| AU | 2013205714 A1 | 5/2013 |

(Continued)

OTHER PUBLICATIONS

PCT International Search Report and Written Opinion dated Nov. 22, 2016, for International Patent Application No. PCT/US2016/049462.

(Continued)

*Primary Examiner* — D. Andrews
*Assistant Examiner* — Jonathan Malikasim
(74) *Attorney, Agent, or Firm* — Patterson + Sheridan, LLP

(57) ABSTRACT

A combined multi-coupler including a first tubular member having a first axial load profile, a first torque profile, and a first junction member, and a second tubular member having a second axial load profile, a second torque profile, and a second junction member. The engagement of the first tubular member to the second tubular member forms connections between the first and second axial load profiles, the first and second torque profiles, and the first and second junction members. The combined multi-coupler can be used when constructing a wellbore.

19 Claims, 29 Drawing Sheets

(56) References Cited

U.S. PATENT DOCUMENTS

| | | | |
|---|---|---|---|
| 3,096,999 | A * | 7/1963 | Ahlstone .............. E21B 33/038 166/340 |
| 3,147,992 | A | 9/1964 | Haeber et al. |
| 3,354,951 | A | 11/1967 | Savage et al. |
| 3,385,370 | A | 5/1968 | Knox et al. |
| 3,662,842 | A | 5/1972 | Bromell |
| 3,698,426 | A | 10/1972 | Litchfield et al. |
| 3,747,675 | A | 7/1973 | Brown |
| 3,766,991 | A | 10/1973 | Brown |
| 3,774,697 | A | 11/1973 | Brown |
| 3,776,320 | A | 12/1973 | Brown |
| 3,842,619 | A | 10/1974 | Bychurch, Sr. |
| 3,888,318 | A | 6/1975 | Brown |
| 3,899,024 | A | 8/1975 | Tonnelli et al. |
| 3,913,687 | A | 10/1975 | Gyongyosi et al. |
| 3,915,244 | A | 10/1975 | Brown |
| 3,964,552 | A | 6/1976 | Slator |
| 4,022,284 | A | 5/1977 | Crow |
| 4,051,587 | A | 10/1977 | Boyadjieff |
| 4,100,968 | A | 7/1978 | Delano |
| 4,192,155 | A | 3/1980 | Gray |
| 4,199,847 | A | 4/1980 | Owens |
| 4,235,469 | A | 11/1980 | Denny et al. |
| 4,364,407 | A | 12/1982 | Hilliard |
| 4,377,179 | A | 3/1983 | Giebeler |
| 4,402,239 | A | 9/1983 | Mooney |
| 4,449,596 | A | 5/1984 | Boyadjieff |
| 4,478,244 | A | 10/1984 | Garrett |
| 4,497,224 | A | 2/1985 | Jürgens |
| 4,593,773 | A | 6/1986 | Skeie |
| 4,693,497 | A * | 9/1987 | Pettus ................... E21B 33/038 285/12 |
| 4,762,187 | A | 8/1988 | Haney |
| 4,776,617 | A | 10/1988 | Sato |
| 4,779,688 | A | 10/1988 | Baugh |
| 4,791,997 | A | 12/1988 | Krasnov |
| 4,813,493 | A | 3/1989 | Shaw et al. |
| 4,815,546 | A | 3/1989 | Haney et al. |
| 4,821,814 | A | 4/1989 | Willis et al. |
| 4,844,181 | A | 7/1989 | Bassinger |
| 4,867,236 | A | 9/1989 | Haney et al. |
| 4,955,949 | A | 9/1990 | Bailey et al. |
| 4,962,819 | A | 10/1990 | Bailey et al. |
| 4,972,741 | A | 11/1990 | Sibille |
| 4,981,180 | A | 1/1991 | Price |
| 4,997,042 | A | 3/1991 | Jordan et al. |
| 5,036,927 | A * | 8/1991 | Willis ..................... E21B 3/02 166/77.51 |
| 5,099,725 | A | 3/1992 | Bouligny, Jr. et al. |
| 5,152,554 | A | 10/1992 | LaFleur et al. |
| 5,172,940 | A | 12/1992 | Usui et al. |
| 5,191,939 | A | 3/1993 | Stokley |
| 5,215,153 | A | 6/1993 | Younes |
| 5,245,877 | A | 9/1993 | Ruark |
| 5,282,653 | A | 2/1994 | LaFleur et al. |
| 5,297,833 | A | 3/1994 | Willis et al. |
| 5,348,351 | A | 9/1994 | LaFleur et al. |
| 5,385,514 | A | 1/1995 | Dawe |
| 5,433,279 | A | 7/1995 | Tessari et al. |
| 5,441,310 | A | 8/1995 | Barrett et al. |
| 5,456,320 | A | 10/1995 | Baker |
| 5,479,988 | A | 1/1996 | Appleton |
| 5,486,223 | A | 1/1996 | Carden |
| 5,501,280 | A | 3/1996 | Brisco |
| 5,509,442 | A | 4/1996 | Claycomb |
| 5,577,566 | A | 11/1996 | Albright et al. |
| 5,584,343 | A | 12/1996 | Coone |
| 5,645,131 | A | 7/1997 | Trevisani |
| 5,664,310 | A | 9/1997 | Penisson |
| 5,682,952 | A | 11/1997 | Stokley |
| 5,735,348 | A | 4/1998 | Hawkins, III |
| 5,778,742 | A | 7/1998 | Stuart |
| 5,839,330 | A | 11/1998 | Stokka |
| 5,909,768 | A | 6/1999 | Castille et al. |
| 5,918,673 | A | 7/1999 | Hawkins et al. |
| 5,950,724 | A | 9/1999 | Giebeler |
| 5,971,079 | A | 10/1999 | Mullins |
| 5,992,520 | A | 11/1999 | Schultz et al. |
| 6,003,412 | A | 12/1999 | Dlask et al. |
| 6,053,191 | A | 4/2000 | Hussey |
| 6,102,116 | A | 8/2000 | Giovanni |
| 6,142,545 | A | 11/2000 | Penman et al. |
| 6,161,617 | A | 12/2000 | Gjedebo |
| 6,173,777 | B1 | 1/2001 | Mullins |
| 6,276,450 | B1 | 8/2001 | Seneviratne |
| 6,279,654 | B1 | 8/2001 | Mosing et al. |
| 6,289,911 | B1 | 9/2001 | Majkovic |
| 6,309,002 | B1 | 10/2001 | Bouligny |
| 6,311,792 | B1 * | 11/2001 | Scott ..................... E21B 19/10 166/379 |
| 6,328,343 | B1 | 12/2001 | Hosie et al. |
| 6,378,630 | B1 | 4/2002 | Ritorto et al. |
| 6,390,190 | B2 | 5/2002 | Mullins |
| 6,401,811 | B1 | 6/2002 | Coone |
| 6,415,862 | B1 | 7/2002 | Mullins |
| 6,431,626 | B1 | 8/2002 | Bouligny |
| 6,443,241 | B1 | 9/2002 | Juhasz et al. |
| 6,460,620 | B1 | 10/2002 | LaFleur |
| 6,527,047 | B1 | 3/2003 | Pietras |
| 6,536,520 | B1 | 3/2003 | Snider et al. |
| 6,571,876 | B2 | 6/2003 | Szarka |
| 6,578,632 | B2 | 6/2003 | Mullins |
| 6,595,288 | B2 | 7/2003 | Mosing et al. |
| 6,604,578 | B2 | 8/2003 | Mullins |
| 6,622,796 | B1 | 9/2003 | Pietras |
| 6,637,526 | B2 | 10/2003 | Juhasz et al. |
| 6,640,824 | B2 | 11/2003 | Majkovic |
| 6,666,273 | B2 | 12/2003 | Laurel |
| 6,675,889 | B1 | 1/2004 | Mullins et al. |
| 6,679,333 | B2 | 1/2004 | York et al. |
| 6,688,398 | B2 | 2/2004 | Pietras |
| 6,691,801 | B2 | 2/2004 | Juhasz et al. |
| 6,705,405 | B1 | 3/2004 | Pietras |
| 6,715,542 | B2 | 4/2004 | Mullins |
| 6,719,046 | B2 | 4/2004 | Mullins |
| 6,722,425 | B2 | 4/2004 | Mullins |
| 6,725,938 | B1 | 4/2004 | Pietras |
| 6,732,819 | B2 | 5/2004 | Wenzel |
| 6,732,822 | B2 | 5/2004 | Slack et al. |
| 6,742,584 | B1 | 6/2004 | Appleton |
| 6,742,596 | B2 | 6/2004 | Haugen |
| 6,779,599 | B2 | 8/2004 | Mullins et al. |
| 6,832,656 | B2 | 12/2004 | Fournier, Jr. et al. |
| 6,883,605 | B2 | 4/2005 | Arceneaux et al. |
| 6,892,835 | B2 | 5/2005 | Shahin et al. |
| 6,908,121 | B2 | 6/2005 | Hirth et al. |
| 6,925,807 | B2 | 8/2005 | Jones et al. |
| 6,938,697 | B2 | 9/2005 | Haugen |
| 6,976,298 | B1 | 12/2005 | Pietras |
| 6,994,176 | B2 | 2/2006 | Shahin et al. |
| 7,000,503 | B2 | 2/2006 | Dagenais et al. |
| 7,001,065 | B2 | 2/2006 | Dishaw et al. |
| 7,004,259 | B2 | 2/2006 | Pietras |
| 7,007,753 | B2 | 3/2006 | Robichaux et al. |
| 7,017,671 | B2 | 3/2006 | Williford |
| 7,021,374 | B2 | 4/2006 | Pietras |
| 7,025,130 | B2 | 4/2006 | Bailey et al. |
| 7,073,598 | B2 | 7/2006 | Haugen |
| 7,090,021 | B2 | 8/2006 | Pietras |
| 7,096,948 | B2 | 8/2006 | Mosing et al. |
| 7,114,235 | B2 | 10/2006 | Jansch et al. |
| 7,128,161 | B2 | 10/2006 | Pietras |
| 7,137,454 | B2 | 11/2006 | Pietras |
| 7,140,443 | B2 | 11/2006 | Beierbach et al. |
| 7,143,849 | B2 | 12/2006 | Shahin et al. |
| 7,147,254 | B2 | 12/2006 | Niven et al. |
| 7,159,654 | B2 | 1/2007 | Ellison et al. |
| 7,178,612 | B2 | 2/2007 | Belik |
| 7,213,656 | B2 | 5/2007 | Pietras |
| 7,219,744 | B2 | 5/2007 | Pietras |
| 7,231,969 | B2 | 6/2007 | Folk et al. |
| 7,270,189 | B2 | 9/2007 | Brown et al. |
| 7,281,451 | B2 | 10/2007 | Schulze Beckinghausen |
| 7,281,587 | B2 | 10/2007 | Haugen |

(56) References Cited

U.S. PATENT DOCUMENTS

| | | | |
|---|---|---|---|
| 7,303,022 B2 | 12/2007 | Tilton et al. | |
| 7,325,610 B2 | 2/2008 | Giroux et al. | |
| 7,353,880 B2 | 4/2008 | Pietras | |
| 7,448,456 B2 | 11/2008 | Shahin et al. | |
| 7,451,826 B2 | 11/2008 | Pietras | |
| 7,490,677 B2 | 2/2009 | Buytaert et al. | |
| 7,503,397 B2 | 3/2009 | Giroux et al. | |
| 7,509,722 B2 | 3/2009 | Shahin et al. | |
| 7,513,300 B2 | 4/2009 | Pietras et al. | |
| 7,591,304 B2 | 9/2009 | Juhasz et al. | |
| 7,617,866 B2 | 11/2009 | Pietras | |
| 7,635,026 B2 | 12/2009 | Mosing et al. | |
| 7,665,515 B2 | 2/2010 | Mullins | |
| 7,665,530 B2 | 2/2010 | Wells et al. | |
| 7,665,531 B2 | 2/2010 | Pietras | |
| 7,669,662 B2 | 3/2010 | Pietras | |
| 7,690,422 B2 | 4/2010 | Swietlik et al. | |
| 7,694,730 B2 | 4/2010 | Angman | |
| 7,694,744 B2 | 4/2010 | Shahin | |
| 7,699,121 B2 | 4/2010 | Juhasz et al. | |
| 7,712,523 B2 | 5/2010 | Snider et al. | |
| 7,730,698 B1 | 6/2010 | Montano et al. | |
| 7,757,759 B2 | 7/2010 | Jahn et al. | |
| 7,779,922 B1 | 8/2010 | Harris et al. | |
| 7,793,719 B2 | 9/2010 | Snider et al. | |
| 7,817,062 B1 | 10/2010 | Li et al. | |
| 7,828,085 B2 | 11/2010 | Kuttel et al. | |
| 7,841,415 B2 | 11/2010 | Winter | |
| 7,854,265 B2 | 12/2010 | Zimmermann | |
| 7,866,390 B2 | 1/2011 | Latiolais, Jr. et al. | |
| 7,874,352 B2 | 1/2011 | Odell, II et al. | |
| 7,874,361 B2 | 1/2011 | Mosing et al. | |
| 7,878,237 B2 | 2/2011 | Angman | |
| 7,878,254 B2 | 2/2011 | Abdollahi et al. | |
| 7,882,902 B2 | 2/2011 | Boutwell, Jr. | |
| 7,896,084 B2 | 3/2011 | Haugen | |
| 7,918,273 B2 | 4/2011 | Snider et al. | |
| 7,958,787 B2 | 6/2011 | Hunter | |
| 7,971,637 B2 | 7/2011 | Duhon et al. | |
| 7,975,768 B2 * | 7/2011 | Fraser | E21B 17/01 166/344 |
| 8,118,106 B2 | 2/2012 | Wiens et al. | |
| 8,141,642 B2 | 3/2012 | Olstad et al. | |
| 8,176,986 B2 * | 5/2012 | Warren | E21B 7/20 166/377 |
| 8,210,268 B2 * | 7/2012 | Heidecke | E21B 3/02 166/380 |
| 8,281,856 B2 | 10/2012 | Jahn et al. | |
| 8,307,903 B2 | 11/2012 | Redlinger et al. | |
| 8,365,834 B2 | 2/2013 | Liess et al. | |
| 8,459,361 B2 | 6/2013 | Leuchtenberg | |
| 8,505,984 B2 | 8/2013 | Henderson et al. | |
| 8,567,512 B2 | 10/2013 | Odell, II et al. | |
| 8,601,910 B2 | 12/2013 | Begnaud | |
| 8,636,067 B2 | 1/2014 | Robichaux et al. | |
| 8,651,175 B2 | 2/2014 | Fallen | |
| 8,668,003 B2 | 3/2014 | Osmundsen et al. | |
| 8,708,055 B2 | 4/2014 | Liess et al. | |
| 8,727,021 B2 | 5/2014 | Heidecke et al. | |
| 8,776,898 B2 | 7/2014 | Liess et al. | |
| 8,783,339 B2 | 7/2014 | Sinclair et al. | |
| 8,839,884 B2 | 9/2014 | Kuttel et al. | |
| 8,893,772 B2 | 11/2014 | Henderson et al. | |
| 9,068,406 B2 | 6/2015 | Clasen et al. | |
| 9,206,851 B2 | 12/2015 | Slaughter, Jr. et al. | |
| 9,528,326 B2 | 12/2016 | Heidecke et al. | |
| 9,617,819 B2 * | 4/2017 | Older | E21B 33/038 |
| 9,631,438 B2 | 4/2017 | McKay | |
| 2002/0043403 A1 | 4/2002 | Juhasz et al. | |
| 2002/0074132 A1 | 6/2002 | Juhasz et al. | |
| 2002/0084069 A1 | 7/2002 | Mosing et al. | |
| 2002/0129934 A1 | 9/2002 | Mullins et al. | |
| 2002/0170720 A1 | 11/2002 | Haugen | |
| 2003/0098150 A1 | 5/2003 | Andreychuk | |
| 2003/0107260 A1 | 6/2003 | Ording et al. | |
| 2003/0221519 A1 | 12/2003 | Haugen | |
| 2004/0003490 A1 | 1/2004 | Shahin et al. | |
| 2004/0069497 A1 | 4/2004 | Jones et al. | |
| 2004/0216924 A1 | 11/2004 | Pietras et al. | |
| 2005/0000691 A1 | 1/2005 | Giroux et al. | |
| 2005/0173154 A1 | 8/2005 | Lesko | |
| 2005/0206163 A1 | 9/2005 | Guesnon et al. | |
| 2005/0257933 A1 | 11/2005 | Pietras | |
| 2005/0269072 A1 | 12/2005 | Folk et al. | |
| 2005/0269104 A1 | 12/2005 | Folk et al. | |
| 2005/0269105 A1 | 12/2005 | Pietras | |
| 2005/0274508 A1 | 12/2005 | Folk et al. | |
| 2006/0037784 A1 | 2/2006 | Walter et al. | |
| 2006/0124353 A1 | 6/2006 | Juhasz et al. | |
| 2006/0151181 A1 | 7/2006 | Shahin | |
| 2006/0180315 A1 | 8/2006 | Shahin et al. | |
| 2007/0030167 A1 | 2/2007 | Li et al. | |
| 2007/0044973 A1 | 3/2007 | Fraser et al. | |
| 2007/0074588 A1 | 4/2007 | Harata et al. | |
| 2007/0074874 A1 | 4/2007 | Richardson | |
| 2007/0102992 A1 | 5/2007 | Jager | |
| 2007/0131416 A1 | 6/2007 | Odell, II et al. | |
| 2007/0140801 A1 | 6/2007 | Kuttel et al. | |
| 2007/0144730 A1 | 6/2007 | Shahin et al. | |
| 2007/0158076 A1 | 7/2007 | Hollingsworth, Jr. et al. | |
| 2007/0251699 A1 | 11/2007 | Wells et al. | |
| 2007/0251701 A1 | 11/2007 | Jahn et al. | |
| 2007/0257811 A1 | 11/2007 | Hall et al. | |
| 2008/0059073 A1 | 3/2008 | Giroux et al. | |
| 2008/0093127 A1 | 4/2008 | Angman | |
| 2008/0099196 A1 | 5/2008 | Latiolais et al. | |
| 2008/0125876 A1 | 5/2008 | Boutwell | |
| 2008/0202812 A1 | 8/2008 | Childers et al. | |
| 2008/0308281 A1 | 12/2008 | Boutwell, Jr. et al. | |
| 2009/0151934 A1 | 6/2009 | Heidecke et al. | |
| 2009/0159294 A1 | 6/2009 | Abdollahi et al. | |
| 2009/0200038 A1 | 8/2009 | Swietlik et al. | |
| 2009/0205820 A1 | 8/2009 | Koederitz et al. | |
| 2009/0205827 A1 | 8/2009 | Swietlik et al. | |
| 2009/0205836 A1 | 8/2009 | Swietlik et al. | |
| 2009/0205837 A1 | 8/2009 | Swietlik et al. | |
| 2009/0229837 A1 | 9/2009 | Wiens et al. | |
| 2009/0266532 A1 | 10/2009 | Revheim et al. | |
| 2009/0272537 A1 | 11/2009 | Alikin et al. | |
| 2009/0274544 A1 | 11/2009 | Liess | |
| 2009/0274545 A1 | 11/2009 | Liess et al. | |
| 2009/0316528 A1 | 12/2009 | Ramshaw et al. | |
| 2009/0321086 A1 | 12/2009 | Zimmermann | |
| 2010/0032162 A1 | 2/2010 | Olstad et al. | |
| 2010/0101805 A1 | 4/2010 | Angelle et al. | |
| 2010/0200222 A1 | 8/2010 | Robichaux et al. | |
| 2010/0206583 A1 | 8/2010 | Swietlik et al. | |
| 2010/0206584 A1 | 8/2010 | Clubb et al. | |
| 2010/0236777 A1 | 9/2010 | Partouche et al. | |
| 2011/0036586 A1 | 2/2011 | Hart et al. | |
| 2011/0039086 A1 | 2/2011 | Graham et al. | |
| 2011/0088495 A1 | 4/2011 | Buck et al. | |
| 2011/0214919 A1 | 9/2011 | McClung, III | |
| 2011/0280104 A1 | 11/2011 | McClung, III | |
| 2012/0048574 A1 | 3/2012 | Wiens et al. | |
| 2012/0152530 A1 | 6/2012 | Wiedecke et al. | |
| 2012/0160517 A1 | 6/2012 | Bouligny et al. | |
| 2012/0212326 A1 | 8/2012 | Christiansen et al. | |
| 2012/0234107 A1 | 9/2012 | Pindiprolu et al. | |
| 2012/0298376 A1 | 11/2012 | Twardowski | |
| 2013/0055858 A1 | 3/2013 | Richardson | |
| 2013/0056977 A1 | 3/2013 | Henderson et al. | |
| 2013/0062074 A1 | 3/2013 | Angelle et al. | |
| 2013/0075077 A1 | 3/2013 | Henderson et al. | |
| 2013/0075106 A1 | 3/2013 | Tran et al. | |
| 2013/0105178 A1 | 5/2013 | Pietras | |
| 2013/0168106 A1 * | 7/2013 | Leman | E21B 19/00 166/380 |
| 2013/0207382 A1 | 8/2013 | Robichaux | |
| 2013/0207388 A1 | 8/2013 | Jansson et al. | |
| 2013/0233624 A1 | 9/2013 | In | |
| 2013/0269926 A1 | 10/2013 | Liess et al. | |
| 2013/0271576 A1 | 10/2013 | Elllis | |
| 2013/0275100 A1 | 10/2013 | Ellis et al. | |

(56) References Cited

U.S. PATENT DOCUMENTS

| | | |
|---|---|---|
| 2013/0299247 A1 | 11/2013 | Küttel et al. |
| 2014/0090856 A1 | 4/2014 | Pratt et al. |
| 2014/0116686 A1 | 5/2014 | Odell, II et al. |
| 2014/0131052 A1 | 5/2014 | Richardson |
| 2014/0202767 A1 | 7/2014 | Feasey |
| 2014/0233804 A1 | 8/2014 | Gustavsson et al. |
| 2014/0262521 A1 | 9/2014 | Bradley et al. |
| 2014/0305662 A1 | 10/2014 | Giroux et al. |
| 2014/0326468 A1 | 11/2014 | Heidecke et al. |
| 2014/0352944 A1 | 12/2014 | Devarajan et al. |
| 2014/0360780 A1 | 12/2014 | Moss et al. |
| 2015/0014063 A1 | 1/2015 | Simanjuntak et al. |
| 2015/0053424 A1 | 2/2015 | Wiens et al. |
| 2015/0083391 A1 | 3/2015 | Bangert et al. |
| 2015/0107385 A1 | 4/2015 | Mullins et al. |
| 2015/0337648 A1 | 11/2015 | Zippel et al. |
| 2015/0361723 A1* | 12/2015 | Mahoney ............... E21B 19/06 175/40 |
| 2016/0024862 A1 | 1/2016 | Wilson et al. |
| 2016/0138348 A1 | 5/2016 | Kunec |
| 2016/0145954 A1 | 5/2016 | Helms et al. |
| 2016/0177639 A1 | 6/2016 | McIntosh et al. |
| 2016/0215592 A1 | 7/2016 | Helms et al. |
| 2016/0230481 A1 | 8/2016 | Misson et al. |
| 2017/0037683 A1 | 2/2017 | Heidecke et al. |
| 2017/0044854 A1 | 2/2017 | Hebebrand et al. |
| 2017/0044875 A1 | 2/2017 | Hebebrand et al. |
| 2017/0051568 A1 | 2/2017 | Wern et al. |
| 2017/0067303 A1 | 3/2017 | Thiemann et al. |
| 2017/0067320 A1 | 3/2017 | Zouhair et al. |
| 2017/0074075 A1* | 3/2017 | Liess ...................... E21B 41/00 |
| 2017/0211327 A1 | 7/2017 | Wern et al. |
| 2017/0211343 A1 | 7/2017 | Thiemann |
| 2017/0284164 A1 | 10/2017 | Holmes et al. |

FOREIGN PATENT DOCUMENTS

| | | |
|---|---|---|
| AU | 2014215938 A1 | 9/2014 |
| CA | 2 707 050 A1 | 6/2009 |
| CA | 2 841 654 A1 | 8/2015 |
| CA | 2 944 327 A1 | 10/2015 |
| DE | 102007016822 A1 | 10/2008 |
| EP | 0 250 072 A2 | 12/1987 |
| EP | 0 250 072 B1 | 4/1991 |
| EP | 1 619 349 A2 | 1/2006 |
| EP | 1 772 715 A2 | 4/2007 |
| EP | 1 961 912 A1 | 8/2008 |
| EP | 1 961 913 A1 | 8/2008 |
| EP | 2085566 A2 | 8/2009 |
| EP | 2 322 357 A1 | 5/2011 |
| EP | 3032025 A1 | 6/2016 |
| GB | 1487948 A | 10/1977 |
| GB | 2 077 812 A | 12/1981 |
| GB | 2077812 A | 12/1981 |
| GB | 2 180 027 A | 3/1987 |
| GB | 2180027 A | 3/1987 |
| GB | 2 228 025 A | 8/1990 |
| GB | 2 314 391 A | 12/1997 |
| WO | 2004/079153 A2 | 9/2004 |
| WO | 2004/101417 A2 | 11/2004 |
| WO | 2007/001887 A2 | 1/2007 |
| WO | 2007/070805 A2 | 6/2007 |
| WO | 2007127737 A2 | 11/2007 |
| WO | 2008005767 A1 | 1/2008 |
| WO | 2009/076648 A2 | 6/2009 |
| WO | 2012100019 A1 | 7/2012 |
| WO | 2012/115717 A2 | 8/2012 |
| WO | 2014056092 A1 | 4/2014 |
| WO | 2015/000023 A1 | 1/2015 |
| WO | 2015/119509 A1 | 8/2015 |
| WO | 2015/127433 A1 | 8/2015 |
| WO | 2015127433 A1 | 8/2015 |
| WO | 2015176121 A1 | 11/2015 |
| WO | 2016197255 A1 | 12/2016 |
| WO | 2017/044384 A1 | 3/2017 |

OTHER PUBLICATIONS

A123 System; 14Ah Prismatic Pouch Cell; Nanophosphate® Lithium-Ion; www.a123systems.com; date unknown; 1 page.

Streicher Load/Torque Cell Systems; date unknown; 1 page.

3PS, Inc.; Enhanced Torque and Tension Sub with Integrated Turns; date unknown; 2 total pages.

Lefevre, et al.; Drilling Technology; Deeper, more deviated wells push development of smart drill stem rotary shouldered connections; dated 2008; 2 total pages.

PCT Invitaiton to Pay Additional Fees for International Application No. PCT/US2008/086699; dated Sep. 9, 2009; 7 total pages.

PCT Notification of Transmittal of the International Search Report and the Written Opinion of the International Searching Authority for International Application No. PCT/US2008/086699; dated Sep. 11, 2009; 19 total pages.

National Oilwell Varco; Rotary Shoulder Handbook; dated 2010; 116 total pages.

Weatherford; TorkSub™ Stand-Alone Torque Measuring System; dated 2011-2014; 4 total pages.

Australian Examination Report for Application No. 2008334992; dated Apr. 5, 2011; 2 total pages.

European Search Report for Application No. 08 860 261.0-2315; dated Apr. 12, 2011; 4 total pages.

Eaton; Spool Valve Hydraulic Motors; dated Sep. 2011; 16 total pages.

European Extended Search Report for Application No. 12153779. 9-2315; dated Apr. 5, 2012; 4 total pages.

Australian Examination Report for Application No. 2012201644; dated May 15, 2013; 3 total pages.

WARRIOR; 250E Electric Top Drive (250-TON); 250H Hydraulic Top Drive (250-TON); dated Apr. 2014; 4 total pages.

Hydraulic Pumps & Motors; Fundamentals of Hydraulic Motors; dated Jun. 26, 2014; 6 total pages.

WARRIOR; Move Pipe Better; 500E Electric Top Drive (500 Ton—1000 hp); dated May 2015; 4 total pages.

Canadian Office Action for Application No. 2,837,581; dated Aug. 24, 2015; 3 total pages.

European Extended Search Report for Application No. 15166062. 8-1610; dated Nov. 23, 2015; 6 total pages.

Australian Examination Report for Application No. 2014215938; dated Feb. 4, 2016; 3 total pages.

Rexroth; Bosch Group; Motors and Gearboxes; Asynchronous high-speed motors 1 MB for high speeds; dated Apr. 13, 2016; 6 total pages.

Canadian Office Action for Application No. 2,837,581; dated Apr. 25, 2016; 3 total pages.

PCT Notification of Transmittal of the International Search Report and the Written Opinion of the International Searching Authority for International Application No. PCT/US2015/061960; dated Jul. 25, 2016; 16 total pages.

PCT Notification of Transmittal of the International Search Report and the Written Opinion of the International Searching Authority for International Application No. PCT/US2016/049462; dated Nov. 22, 2016; 14 total pages.

PCT Notification of Transmittal of the International Search Report and the Written Opinion of the International Searching Authority for International Application No. PCT/US2016/050542; dated Nov. 25, 2016; 13 total pages.

PCT Notification of Transmittal of the International Search Report and the Written Opinion of the International Searching Authority for International Application No. PCT/US2016/046458; dated Dec. 14, 2016; 16 total pages.

PCT Notification of Transmittal of the International Search Report and the Written Opinion of the International Searching Authority for International Application No. PCT/US2016/047813; dated Jan. 12, 2017; 15 total pages.

(56) References Cited

OTHER PUBLICATIONS

PCT Notification of Transmittal of the International Search Report and the Written Opinion of the International Searching Authority for International Application No. PCT/US2016/050139; dated Feb. 20, 2017; 20 total pages.
PCT Notification of Transmittal of the International Search Report and the Written Opinion of the International Searching Authority for International Application No. PCT/US2017/014646; dated Apr. 4, 2017; 14 total pages.
PCT Notification of Transmittal of the International Search Report and the Written Opinion of the International Searching Authority for International Application No. PCT/US2017/014224; dated Jun. 8, 2017; 15 total pages.
European Extended Search Report for Application No. 17152458.0-1609; dated Jun. 8, 2017; 7 total pages.
Australian Examination Report for Application No. 2017200371; dated Sep. 19, 2017; 5 total pages.
European Extended Search Report for Application No. 17195552.9-1614; dated Dec. 4, 2017; 6 total pages.
Australian Examination Report for Application No. 2017200371; dated Feb. 8, 2018; 6 total pages.
Canadian Office Action for Application No. 2,955,754; dated Mar. 28, 2018; 3 total pages.
Australian Examination Report for Application No. 2017200371; dated May 2, 2018; 4 total pages.
Canadian Office Action for Application No. 2,974,298; dated May 16, 2018; 3 total pages.
European Patent Office; Extended European Search Report for Application No. 18157915.2; dated Jun. 6, 2018; 8 total pages.
EPO Partial European Search Report dated Jul. 31, 2018, for European Application No. 18159597.6.
European Patent Office; Extended Search Report for Application No. 18160808.4; dated Sep. 20, 2018; 8 total pages.
EPO Partial European Search Report dated Oct. 4, 2018, for European Patent Application No. 18159598.4.
EPO Extended European Search Report dated Oct. 5, 2018, for European Patent Application No. 18173275.1.
EPO Extended European Search Report dated Nov. 6, 2018, for European Application No. 18159597.6.
International Search Report and Written Opinion in PCT/US2018/042812 dated Oct. 17, 2018.
Extended Search Report in application EP18177312.8 dated Nov. 6, 2018.
Canadian Office Action in related application CA 2,955,754 dated Jul. 17, 2018.
EPO Extended European Search Report dated Jul. 19, 2018, for European Application No. 18159595.0.
EPO Extended European Search Report dated Jul. 17, 2018, for European Application No. 181580507.
Cookson, Colter, "Inventions Speed Drilling, Cut Costs," The American Oil & Gas Reporter, Sep. 2015, 2 pages.
Ennaifer, Amine et al., "Step Change in Well Testing Operations," Oilfield Review, Autumn 2014: 26, No. 3, pp. 32-41.
Balltec Lifting Solutions, LiftLOK™ Brochure, "Highest integrity lifting tools for the harshest environments," 2 pages.
Balltec Lifting Solutions, CoilLOKTM™ Brochure, "Highest integrity hand-held coiled tubing handling tools," 2 pages.
Peters; Tool Coupler for Use With a Top Drive; U.S. Appl. No. 15/656,508, filed Jul. 21, 2017. (Application not attached to IDS.).
Fuehring et al.; Tool Coupler With Rotating Coupling Method for Top Drive; U.S. Appl. No. 15/445,758, filed Feb. 28, 2017. (Application not attached to IDS.).
Bell; Interchangeable Swivel Combined Multicoupler; U.S. Appl. No. 15/607,159, filed May 26, 2017 (Application not attached to IDS.).
Amezaga; Dual Torque Transfer for Top Drive System; U.S. Appl. No. 15/447,881, filed Mar. 2, 2017. (Application not attached to IDS.).
Zouhair; Coupler With Threaded Connection for Pipe Handler; U.S. Appl. No. 15/444,016, filed Feb. 27, 2017. (Application not attached to IDS.).
Liess; Downhole Tool Coupling System; U.S. Appl. 15/670,897, filed Aug. 7, 2017. (Application not attached to IDS.).
Muller et al; Combined Multi-Coupler With Rotating Locking Method for Top Drive; U.S. Appl. No. 15/721,216, filed Sep. 29, 2017. (Application not attached to IDS.).
Amezaga et al; Tool Coupler With Threaded Connection for Top Drive; U.S. Appl. No. 15/457,572, filed Mar. 13, 2017. (Application not attached to IDS.).
Wiens; Combined Multi-Coupler With Locking Clamp Connection for Top Drive; U.S. Appl. No. 15/627,428, filed Jun. 19, 2017. (Application not attached to IDS.).
Henke et al.; Tool Coupler With Sliding Coupling Members for Top Drive; U.S. Appl. No. 15/448,297, filed Mar. 2, 2017. (Application not attached to IDS.).
Schoknecht et al.; Combined Multi-Coupler With Rotating Fixations for Top Drive; U.S. Appl. No. 15/447,926, filed Mar. 2, 2017. (Application not attached to IDS.).
Metzlaff et al.; Combined Multi-Coupler for Top Drive; U.S. Appl. No. 15/627,237, filed Jun. 19, 2017. (Application not attached to IDS.).
Liess; Combined Multi-Coupler for Top Drive; U.S. Appl. No. 15/656,914, filed Jul. 21, 2017. (Application not attached to IDS.).
Liess et al.; Combined Multi-Coupler; U.S. Appl. No. 15/656,684, filed Jul. 21, 2017. (Application not attached to IDS).
Amezaga et al.; Tool Coupler With Data and Signal Transfer Methods for Top Drive; U.S. Appl. No. 15/730,305, filed Oct. 11, 2017. (Application not attached to IDS).
Liess; Tool Coupler With Threaded Connection for Top Drive; U.S. Appl. No. 15/806,560, filed Nov. 8, 2017. (Application not attached to IDS).
European Office Action in related application EP 16760375.2 dated Mar. 25, 2019.

* cited by examiner

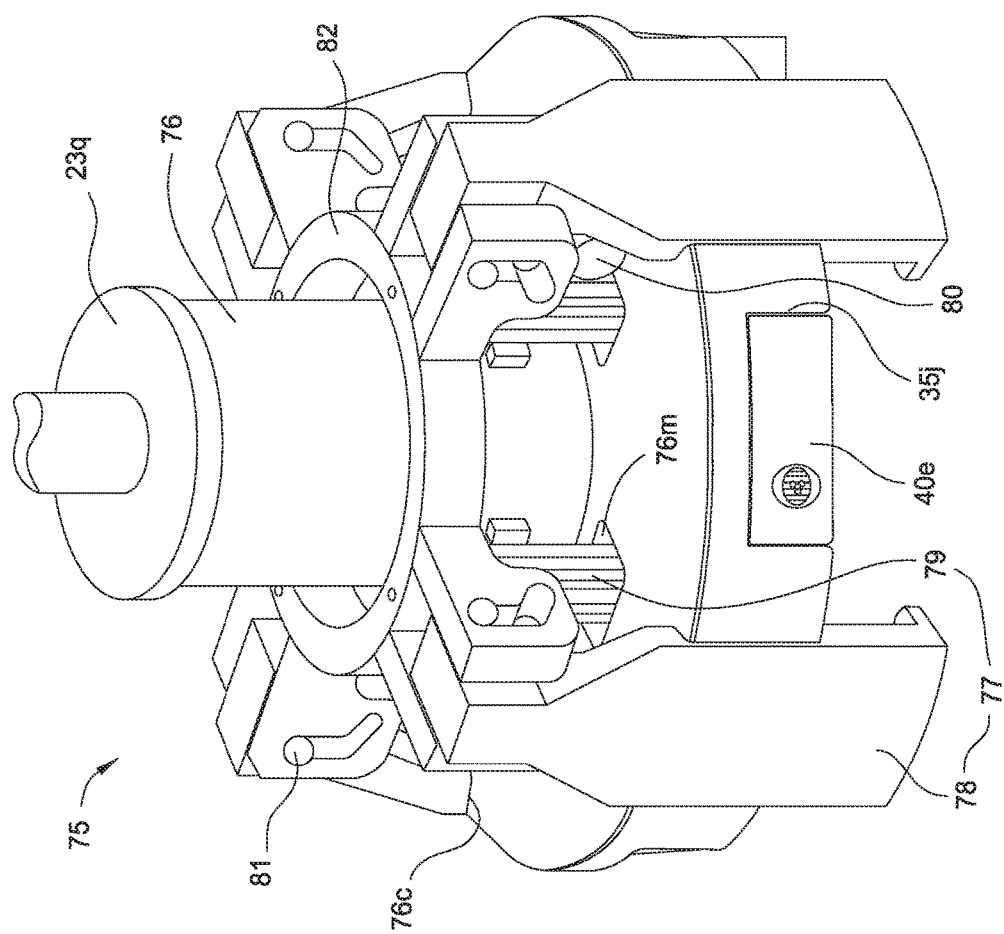

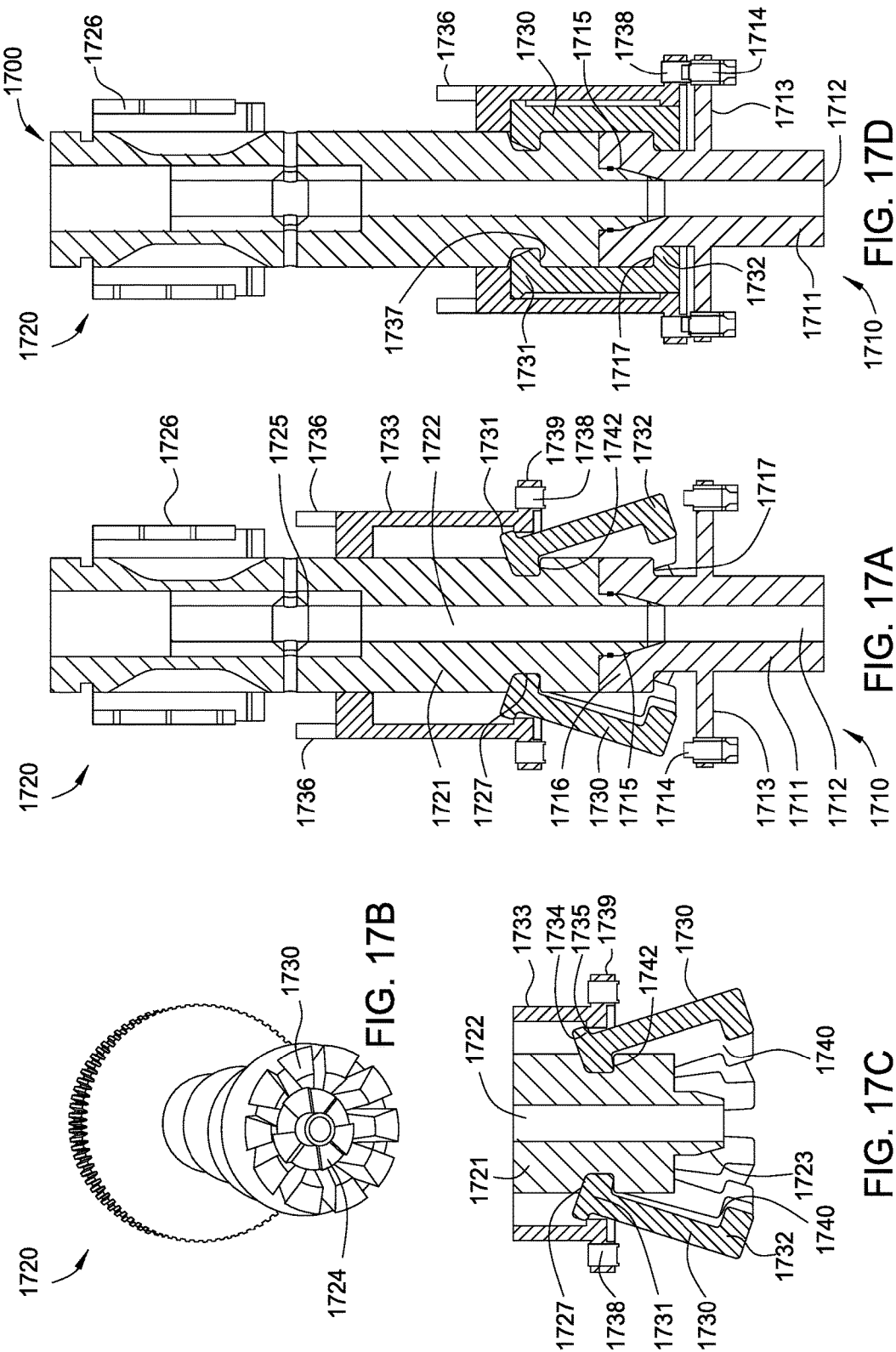

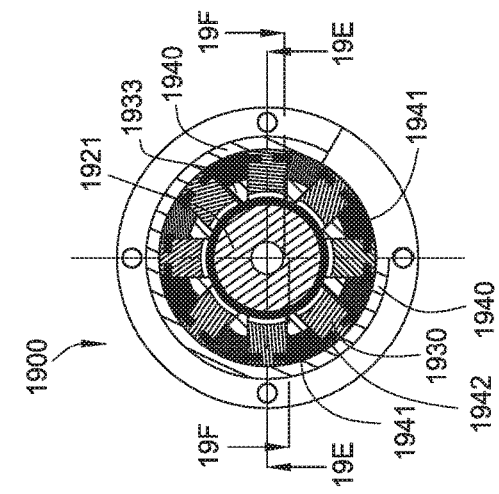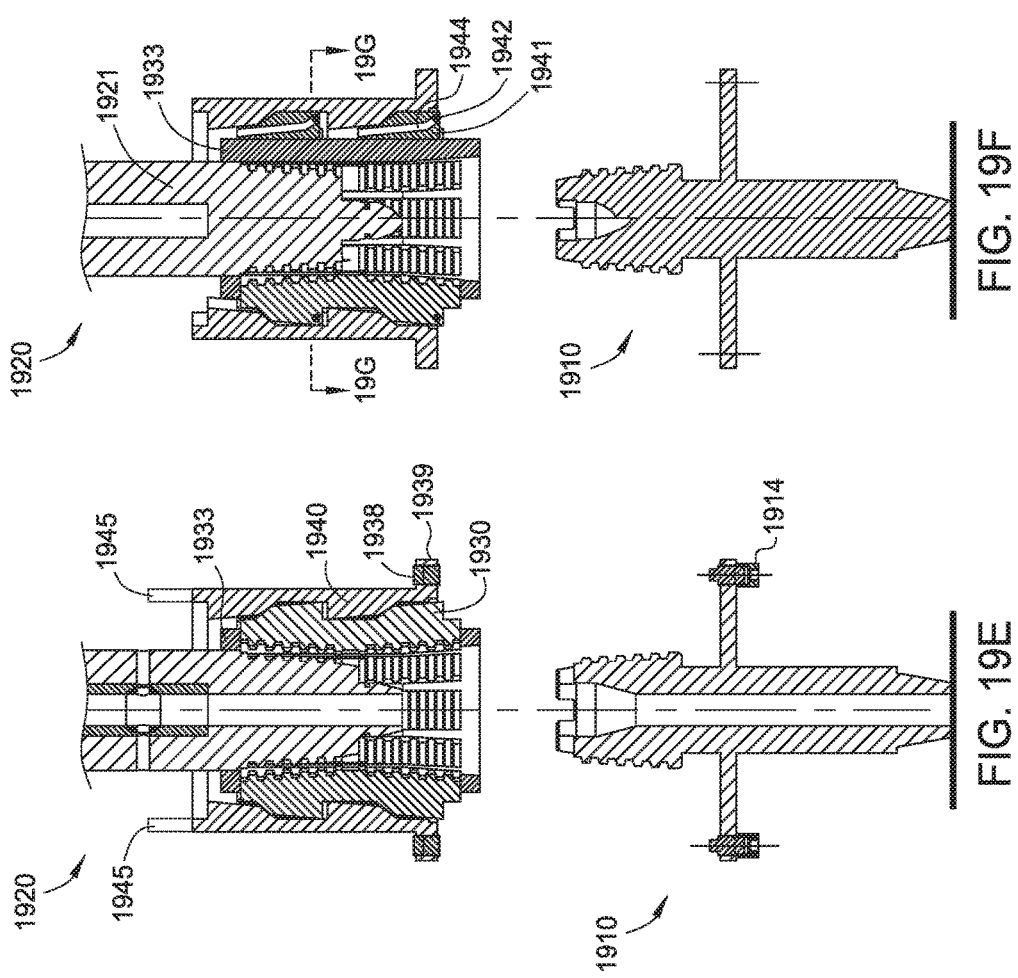

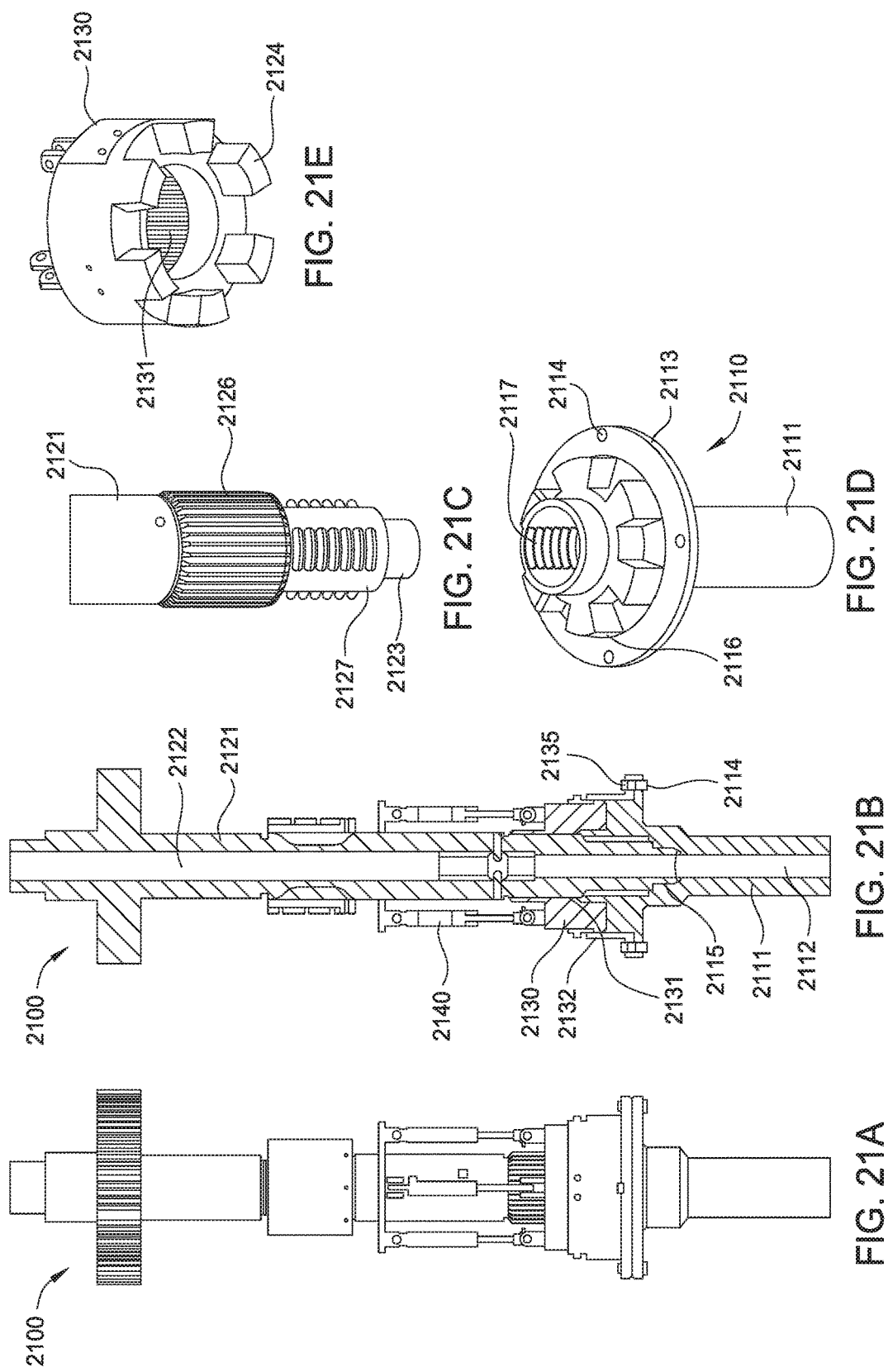

COMBINED MULTI-COUPLER FOR A TOP DRIVE AND A METHOD FOR USING THE SAME FOR CONSTRUCTING A WELLBORE

CLAIM OF PRIORITY UNDER 35 U.S.C. 119

This application claims benefit of U.S. Provisional Patent Application No. 62/214,310, filed Sep. 4, 2015, and entitled "COMBINED MULTI-COUPLER FOR TOP DRIVE" which is herein incorporated by reference in its entirety.

BACKGROUND

Field

The present disclosure generally relates to a combined multi-coupler for a top drive.

Description of the Related Art

A wellbore is formed to access hydrocarbon-bearing formations (e.g., crude oil and/or natural gas) or for geothermal power generation by the use of drilling. Drilling is accomplished by utilizing a drill bit that is mounted on the end of a drill string. To drill within the wellbore to a predetermined depth, the drill string is often rotated by a top drive on a drilling rig. After drilling to a predetermined depth, the drill string and drill bit are removed and a string of casing is lowered into the wellbore. An annulus is thus formed between the casing string and the wellbore. The casing string is hung from the wellhead. A cementing operation is then conducted in order to fill the annulus with cement. The casing string is cemented into the wellbore by circulating cement into the annulus defined between the outer wall of the casing and the borehole. The combination of cement and casing strengthens the wellbore and facilitates the isolation of certain areas of the formation behind the casing for the production of hydrocarbons.

During a drilling and well construction operation, various tools are used which have to be attached to the top drive. The process of changing tools is very time consuming and dangerous requiring personnel to work at heights.

SUMMARY

The present disclosure generally relates to a combined multi-coupler for a top drive. Embodiment of the present disclosure includes a combined multi-coupler, comprising a first tubular member having a first load profile and a first junction member, and a second tubular member having a second load profile and a second junction member. Engagement of the first tubular member to the second tubular member forms a connection between the first and second load profiles to transfer at least one of axial load and torsional load and a connection between the first and second junction members to transfer fluid or signals.

In one embodiment, a combined multi-coupler includes a first tubular member having a first axial load profile, a first torque profile, and a first junction member, and a second tubular member having a second axial load profile, a second torque profile, and a second junction member. The engagement of the first tubular member to the second tubular member forms connections between the first and second axial load profiles, the first and second torque profiles, and the first and second junction members.

In one embodiment, a method for constructing a wellbore comprising engaging a tool dock to a drive stem connected to a top drive to formed a connection, transferring at least one of axial load and torsional load through the connection, and transferring at least at least one of hydraulic fluid, electric power, electric signals, data, and pneumatic signals through the junction.

Another embodiment provides a modular top drive system for construction of a wellbore. The system includes a tool, a tool dock connected to the tool, wherein the tool dock has a first axial load profile, a first torque profile, and a first junction member, a top drive, and a drive stem connected to the top drive, wherein the drive stem has a second axial load profile, a second torque profile, and a second junction member. Engagement of the tool dock and the drive stem forms a connection between the first and second axial profiles for axial load transfer, a connection between the first and second torque profiles for torsional load transfer, and a connection between the first and second junction member for fluid or electric communication between the tool and the top drive.

Another embodiment provides a method for constructing a wellbore. The method includes engaging a tool dock to a drive stem connected to a top drive. The tool dock has a first axial load profile, a first torque profile, and a first junction member, and the drive stem has a second axial load profile, a second torque profile, and a second junction member, and the engagement of the tool dock and the drive stem forms a connection between the first and second axial profiles for axial load transfer, a connection between the first and second torque profiles for torsional load transfer, and a connection between the first and second junction member for fluid or electric communication between the tool and the top drive.

In another embodiment, a combined multi-coupler for a top drive includes: a shaft for being rotated by a motor unit of the top drive; a stem for connecting a drilling unit, a casing unit, or a cementing unit to the shaft; a bore formed through the shaft and the stem for transporting fluid from the top drive to a tubular string connected to one of the units; a latch connected to a flange of the shaft and operable to engage a flange of the stem for longitudinally connecting the shaft and the stem; a fluid junction and an electrical junction, each junction comprising a member connected to the shaft flange and a member connected to the stem flange; a torsional coupling formed in the shaft; and a torsional coupling formed in the stem. Engagement of the stem with the shaft mates the torsional couplings and the junction members.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 2A corresponds to the portion of FIG. 2 within the boxed region.

FIG. 15 illustrates an alternative latch head, according to another embodiment of the present disclosure.

FIGS. 17A-17D schematically illustrate a combined multi-coupler according to another embodiment of the present disclosure.

FIGS. 21A-21I schematically illustrate a combined multi-coupler according to another embodiment of the present disclosure.

DETAILED DESCRIPTION

Figure 1:
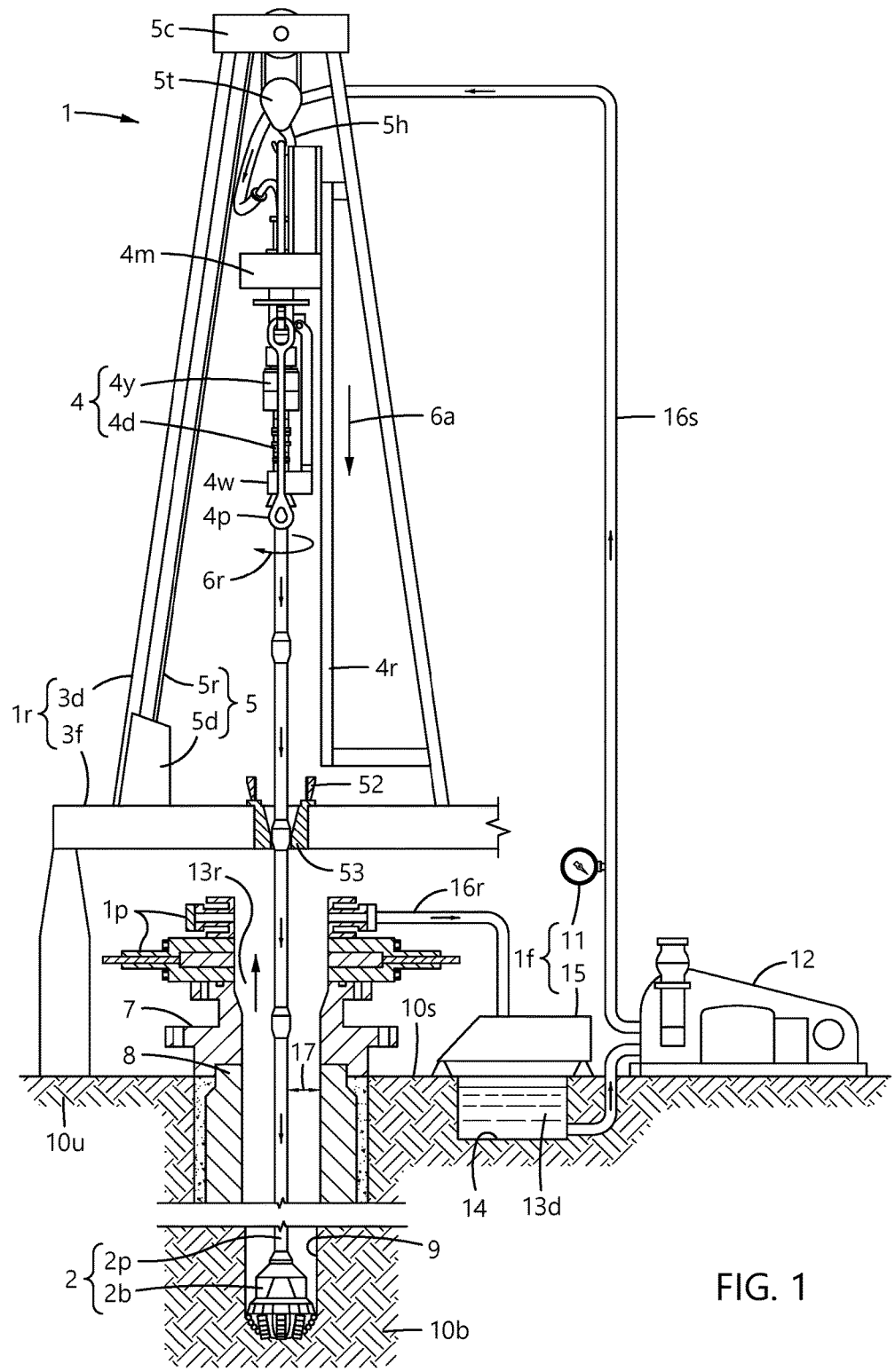
FIG. 1 illustrates a drilling system in a drilling mode, according to one embodiment of the present disclosure.

FIG. 1 illustrates a drilling system 1 in a drilling mode, according to one embodiment of the present disclosure. The drilling system 1 may include a drilling rig 1$r$, a fluid handling system 1$f$, a pressure control assembly (PCA) 1$p$, and a drill string 2. The drilling rig 1$r$ may include a derrick 3$d$, a floor 3$f$, a top drive 4, and a hoist 5. The rig floor 3$f$ may have an opening through which the drill string 2 extends downwardly into the PCA 1$p$.

The drill string 2 may include a bottomhole assembly (BHA) and a pipe string 2$p$. The pipe string 2$p$ may include joints of drill pipe connected together, such as by threaded couplings. The BHA may be connected to the pipe string 2$p$, such as by threaded couplings. The BHA may include one or more drill collars (not shown) and a drill bit 2$b$. Each BHA component may be connected to adjacent component(s), such as by threaded couplings. The drill bit 2$b$ may be rotated 6$r$ by the top drive 4 via the pipe string 2$p$ and/or the BHA may further include a drilling motor (not shown) for rotating the drill bit. The BHA may further include an instrumentation sub (not shown), such as a measurement while drilling (MWD) and/or a logging while drilling (LWD) sub.

An upper end of the pipe string 2$p$ may be connected to the top drive 4, such as by threaded couplings. The top drive 4 may include a control unit 4$n$ (FIG. 2), a motor unit 4$m$, a drilling unit 4$d$, a casing unit 4$c$ (FIG. 10), a cementing unit 4$s$ (FIG. 13), a pipe handler 4$p$, a backup wrench 4$w$, a rail 4$r$, a unit handler 4$u$ (FIG. 9), and a combined multi-coupler (CMC) 4$y$. The top drive 4 may be assembled as part of the drilling rig 1$r$ by connecting ends of the rail 4$r$ to the derrick 3$d$ such that a front of the rail is adjacent to a drill string opening in the rig floor 3$f$. The rail 4$r$ may have a length sufficient for the top drive 4 to handle stands 2$s$ (FIG. 12) of two to four joints of drill pipe. The rail length may be greater than or equal to twenty-five meters and less than or equal to one hundred meters.

Alternatively, the top drive 4 may include twin rails instead of the monorail. Alternatively, the lower end of the rail 4$r$ may be connected to the rig floor 3$f$ instead of the derrick 3$d$.

The hoist 5 may include a hook 5$h$ carried by a traveling block 5$t$ supported by wire rope 5$r$. An upper end of the wire ripe 5$r$ may be coupled to a crown block 5$c$. The wire rope 5$r$ may be woven through sheaves of the blocks 5$c,t$ and extend to drawworks 5$d$ for reeling thereof, thereby raising or lowering the traveling block 5$t$ relative to the derrick 3$d$.

The PCA 1$p$ may include a blowout preventer (BOP) and a flow cross. A housing of the BOP and the flow cross may each be interconnected and/or connected to a wellhead 7, such as by a flanged connection. The wellhead 7 may be mounted on a casing string 8 which has been deployed into a wellbore 9 drilled from a surface 10$s$ of the earth and cemented into the wellbore. The casing string 8 may extend to a depth adjacent a bottom of an upper formation 10$u$. The upper formation 10$u$ may be non-productive and a lower formation 10$b$ may be a hydrocarbon-bearing reservoir.

Alternatively, the lower formation 10$b$ may be non-productive (e.g., a depleted zone), environmentally sensitive, such as an aquifer, or unstable. Alternatively, the wellbore 9 may be subsea having a wellhead located adjacent to the waterline and the drilling rig 1$r$ may be a located on a platform adjacent the wellhead. Alternatively, the wellbore 9 may be subsea having a wellhead located adjacent to the seafloor and the drilling rig 1$r$ may be a located on an offshore drilling unit.

The fluid system 1$f$ may include a pressure gauge 11, a mud pump 12, a reservoir of drilling fluid 13$d$, such as a pit 14 or tank, a solids separator, such as a shale shaker 15, a return line 16$r$, a feed line, and a supply line 16$s$. A first end of the return line 16$r$ may be connected to a branch of the flow cross and a second end of the return line may be connected to an inlet of the shaker 15. A lower end of the supply line 16$s$ may be connected to an outlet of the mud pump 12 and an upper end of the supply line may be connected to the top drive 4. The pressure gauge 11 may be assembled as part of the supply line 16$s$. A lower end of the feed line may be connected to an outlet of the pit 14 and an upper end of the feed line may be connected to an inlet of the mud pump 12. The pressure gauge 11 may be used to monitor discharge pressure of the mud pump 12.

The drilling fluid 13$d$ may include a base liquid. The base liquid may be refined and/or synthetic oil, water, brine, or a water/oil emulsion. The drilling fluid 13$d$ may further include solids dissolved or suspended in the base liquid, such as organophilic clay, lignite, and/or asphalt, thereby forming a mud.

To extend the wellbore 9 from a shoe of the casing string 8 into the lower formation 10$b$, the mud pump 12 may pump the drilling fluid 13$d$ from the pit 14, through the supply line 16$s$ to the top drive 4. The drilling fluid 13$d$ may flow from the supply line 16$s$ and into the drill string 2 via the top drive 4. The drilling fluid 13$d$ may be pumped down through the drill string 2 and exit the drill bit 2$b$, where the fluid may circulate the cuttings away from the bit and return the cuttings up an annulus 17 formed between an inner surface of the casing string 8 or wellbore 9 and an outer surface of the drill string 2. The returns 13*r* (drilling fluid 13*d* plus cuttings) may flow up the annulus 17 to the wellhead 7 and exit the wellhead at the flow cross. The returns 13*r* may continue through the return line 16*r* and into the shale shaker 15 and be processed thereby to remove the cuttings, thereby completing a cycle. As the drilling fluid 13*d* and returns 13*r* circulate, the drill string 2 may be rotated 6*r* by the top drive 4 and lowered 6*a* by the traveling block 5*t*, thereby extending the wellbore 9 into the lower formation 10*b*.

Figure 2:
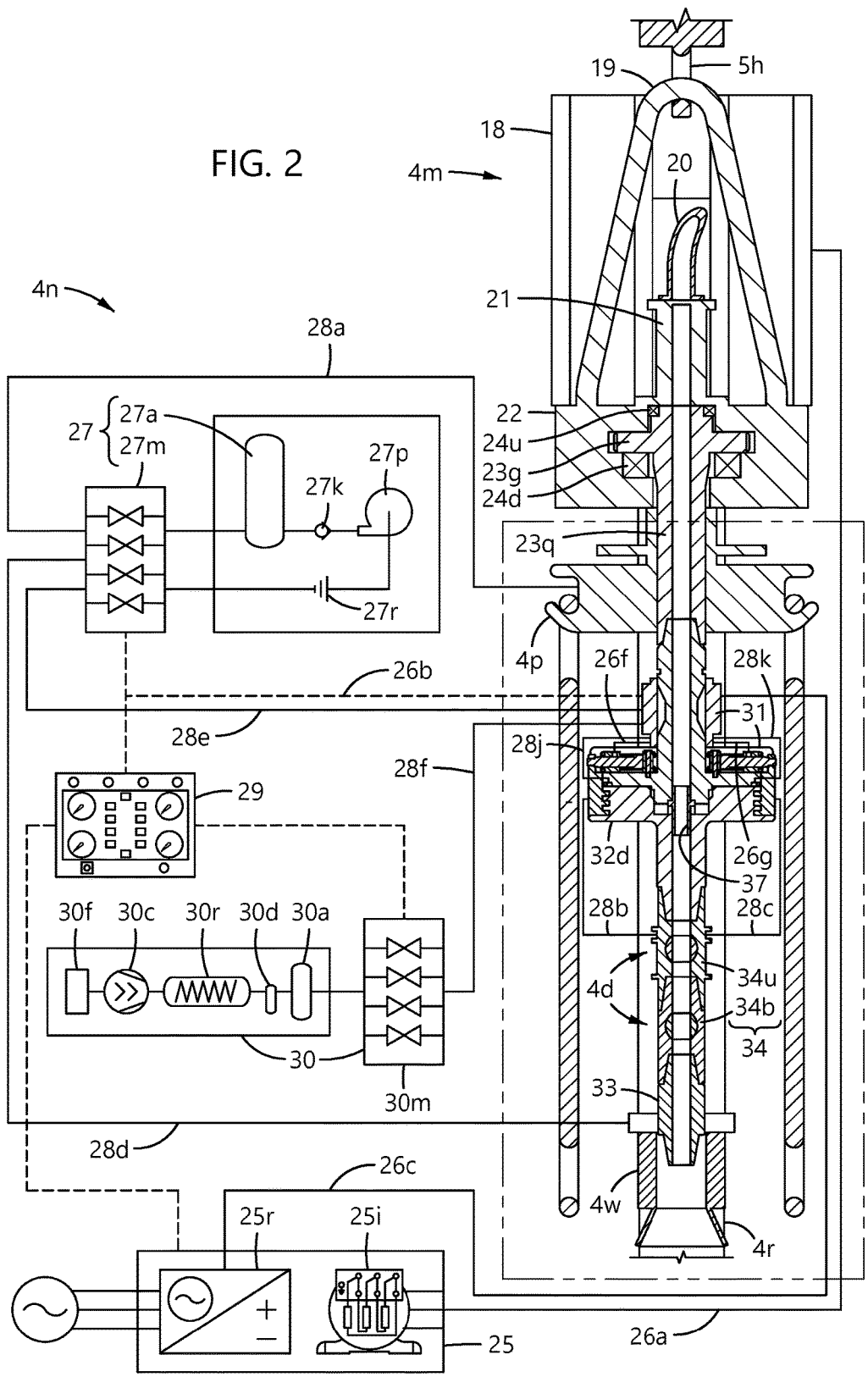
FIGS. 2 and 2A illustrate a top drive of the drilling system.
Figure 2A:
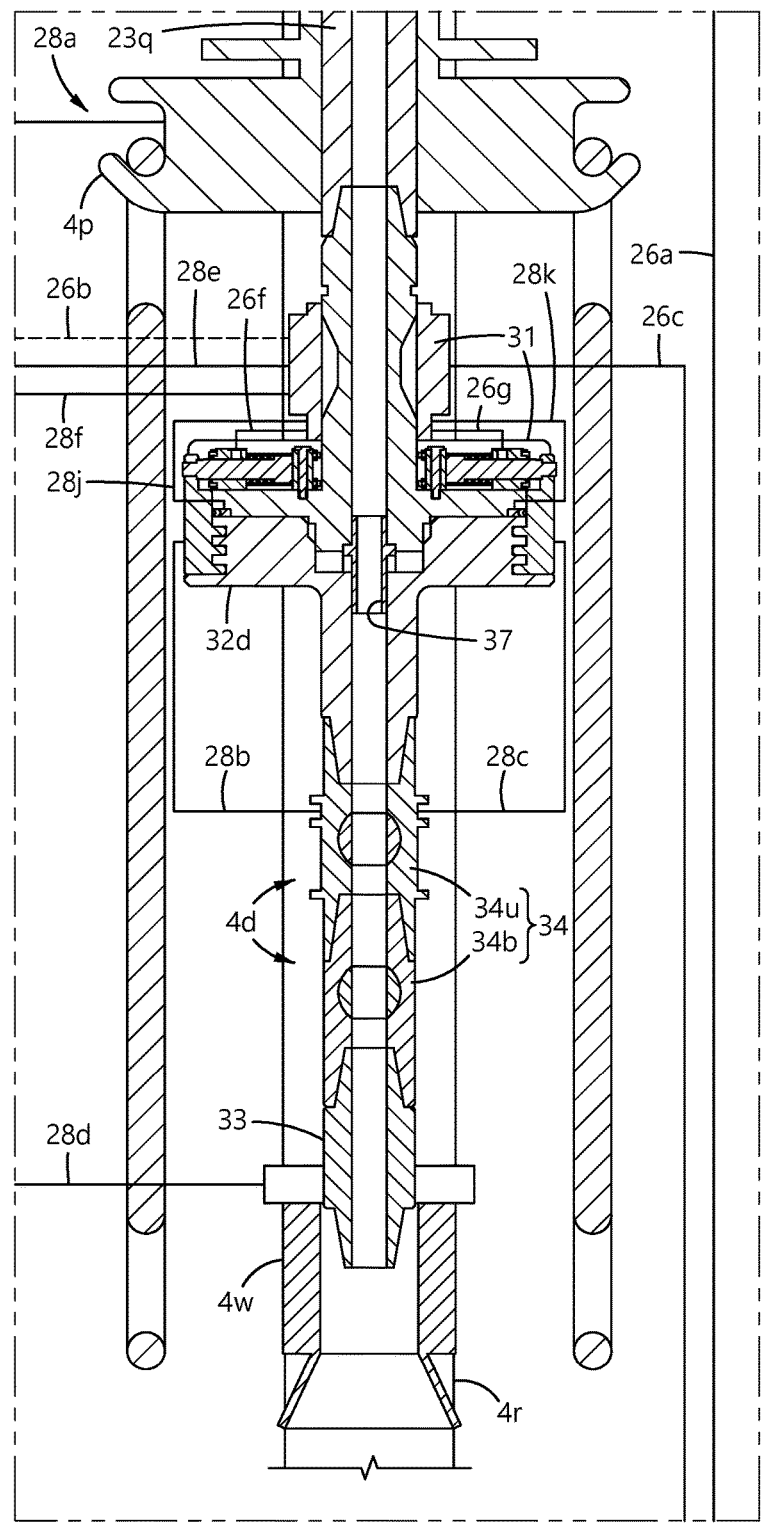

FIG. 2 illustrates the top drive 4. The control unit 4*n* may be located on the rig floor 3*f* and include a hydraulic power unit (HPU) 27, a motor driver 25, a control console 29, and an air supply unit 30. The HPU 27 may include a pump 27*p*, a check valve 27*k*, an accumulator 27*a*, a reservoir 27*r* of hydraulic fluid, and a manifold 27*m*. The motor driver 25 may be one or more (three shown) phase and include a rectifier 25*r* and an inverter 25*i*. The inverter 25*i* may be capable of speed control of the motor unit 4*m*, such as being a pulse width modulator. The air supply unit 30 may include a filter 30*f*, a compressor 30*c*, a cooler 30*r*, a dryer 30*d*, an accumulator 30*a*, and a manifold 30*m*. Each of the HPU manifold 27*m*, the pneumatic manifold 30*m*, and the motor driver 25 may be in data communication with the control console 29 for control of the various functions of the top drive 4.

Additionally, the control unit 4*n* may further include a video monitoring unit having a video camera and a light source such that a technician (not shown) may visually monitor operation of the top drive 4 from the rig floor 3*f* or control room (not shown) especially during shifting of the modes. The video monitoring unit may be mounted on the motor unit 4*m*.

The motor unit 4*m* may include one or more (pair shown) drive motors 18, a becket 19, a hose nipple 20, a mud swivel 21, a drive body 22, a drive ring, such as a gear 23*g*, a quill 23*q*, a trolley (not shown), a down thrust bearing 24*d*, and an up thrust bearing 24*u*. The drive body 22 may be rectangular, may have a thrust chamber formed therein, and may have a central opening formed therethrough. The drive gear 23*g* may be longitudinally and torsionally connected to the quill 23*q*. The drive motors 18 may be electric (shown) or hydraulic (not shown) and have a rotor and a stator. A stator of each drive motor 18 may be connected to the drive body 22, such as by fastening, and be in electrical communication with the motor driver 25 via a power cable 26*a*. The rotor of each drive motor 18 may be torsionally connected to the drive gear 23*g* for rotation 6*r* thereof.

Alternatively, the motor unit 4*m* may instead be a direct drive unit having the drive motor 18 centrally located.

Each thrust bearing 24*u,d* may include a shaft washer, a housing washer, a cage, and a plurality of rollers extending through respective openings formed in the cage. The shaft washer of the down thrust bearing 24*d* may be connected to the drive gear 23*g* adjacent to a bottom thereof. The housing washer of the down thrust bearing 24*d* may be connected to the drive body 22. The cage and rollers of the down thrust bearing 24*d* may be trapped between the washers thereof, thereby supporting rotation 6*r* of the drive gear 23*g* (and the quill 23*q*) relative to the drive body 22. The down thrust bearing 24*d* may be capable of sustaining weight of the drill string 2 during rotation thereof. The shaft washer of the up thrust bearing 24*u* may be connected to the drive gear 23*g* adjacent to a top thereof. The housing washer of the up thrust bearing 24*u* may be connected to the drive body 22. The cage and rollers of the up thrust bearing 24*u* may be trapped between the washers thereof.

The trolley may be connected to a back of the drive body 22, such as by fastening. The trolley may be transversely connected to a front of the rail 4*r* and may ride along the rail, thereby torsionally restraining the drive body 22 while allowing vertical movement of the motor unit 4*m* with the travelling block 5*t*. The becket 19 may be connected to the drive body 22, such as by fastening, and the becket may receive the hook 5*h* to suspend the motor unit 4*m* from the derrick 3*d*.

Alternatively, motor unit 4*m* may include a block-becket instead of the becket 19 and the block-becket may obviate the need for a separate traveling block 5*t*.

The hose nipple 20 may be connected to the mud swivel 21 and receive a mud hose of the supply line 16*s*. The mud hose may deliver the drilling fluid 13*d* from a standpipe of the supply line 16*s* to the hose nipple 20. The mud swivel 21 may have an outer non-rotating barrel connected to the hose nipple 20 and an inner rotating barrel. The mud swivel 21 may have a bearing (not shown) and a dynamic seal (not shown) for accommodating rotation of the rotating barrel relative to the non-rotating barrel. The outer non-rotating barrel may be connected to the drive body 22, such as by fastening. The inner rotating barrel may be disposed in the outer non-rotating barrel and have a stinger portion (not shown) extending therefrom. A lower end of the stinger portion may carry a stab seal for engagement with an inner seal receptacle of the quill 23*q*, thereby sealing an interface formed between the mud swivel 21 and the quill.

The pipe handler 4*p* may include a body, a drill pipe elevator (not shown), a pair of bails, and a link tilt (not shown). The handler body may be connected to a bottom of the drive body 22, such as by fastening. Each bail may have an eyelet formed at each longitudinal end thereof. An upper eyelet of each bail may be received by a respective knuckle of the handler body. The link tilt may include a pair of piston and cylinder assemblies for swinging the elevator relative to the handler body. Each piston and cylinder assembly may have a coupling, such as a hinge knuckle, formed at each longitudinal end thereof. An upper hinge knuckle of each piston and cylinder assembly may be received by a respective lifting lug of the handler body and pivotally connected thereto, such as by fastening. A lower hinge knuckle of each piston and cylinder assembly may be received by a complementary hinge knuckle of the respective bail and pivotally connected thereto, such as by fastening. A piston of each piston and cylinder assembly may be disposed in a bore of the respective cylinder. The piston may divide the cylinder bore into a raising chamber and a lowering chamber and the cylinder may have ports formed through a wall thereof and each port may be in fluid communication with a respective chamber.

Each port may be in fluid communication with the manifold 27*m* via a respective control line 28*a* (only one shown). Supply of hydraulic fluid to the raising port may lift the drill pipe elevator by increasing a tilt angle (measured from a longitudinal axis of the rail 4*r*). Supply of hydraulic fluid to the lowering port may drop the drill pipe elevator by decreasing the tilt angle. The drill pipe elevator may be manually opened and closed or the pipe handler 4*p* may include an actuator (not shown) for opening and closing the drill pipe elevator. The drill pipe elevator may include a bushing having a profile, such as a bottleneck, complementary to an upset formed in an outer surface of a joint of the drill pipe adjacent to the threaded coupling thereof. The bushing may receive the drill pipe for hoisting one or more joints thereof, such as the stand 2s. The bushing may allow rotation of the stand 2s relative to the pipe handler 4p. The pipe handler 4p may deliver the stand to the drill string 2 where the stand may be assembled therewith to extend the drill string during a drilling operation. The pipe handler 4p may be capable of supporting the weight of the drill string 2 to expedite tripping of the drill string.

The CMC 4y may include a latch head 31 and a stem 32d,c,s (32c in FIG. 7A, 32s in FIG. 8) for the respective drilling 4d, casing 4c, and cementing 4s units. The drilling unit 4d may include the drilling stem 32d, a thread saver 33, and an internal blowout preventer (IBOP) 34. The components of the drilling unit 4d may be connected to each other by threaded couplings. The IBOP 34 may include one or more shutoff valves 34u,b. One 34u of the shutoff valves 34u,b may be actuated and the other 34b may be manual. The IBOP valve actuator may include an opening port and/or a closing port and each port may be in fluid communication with the HPU manifold 27m via the control lines 28b,c.

The backup wrench 4w may include a pair of hinges, a tong, a guide, an arm, and a tong actuator (not shown). The tong may be transversely connected to the arm. The upper hinge may pivotally connect the arm to the handler body. The upper hinge may include a pair of knuckles fastened or welded to the handler body and a pin extending through the knuckles and a hole formed through a top of the arm. The tong may include a pair of semi-annular segments and the lower hinge may pivotally connect the segments to the arm. The tong actuator may include a pair of piston and cylinder assemblies each having an end pivotally connected to the arm and another end pivotally connected to the respective tong segment. The piston may divide the cylinder bore into an activation chamber and a stowing chamber and the cylinder may have ports formed through a wall thereof and each port may be in fluid communication with a respective chamber. Each port may be in fluid communication with the HPU manifold 27m via a respective control line 28d (only one shown). Supply of hydraulic fluid to the activation port may pivot the tong segments about the lower hinge toward an engaged position with the drill string 2. Supply of hydraulic fluid to the stowing port may pivot the tong segments about the lower hinge toward a stowed position adjacent to the rail 4r. The stowed position may accommodate connection and removal of the units 4d,c,s to/from the latch head 31.

Each tong segment may include a housing and a jaw (not shown) and the jaws may engage an outer surface of the drill string 2 when the tong segments are in the engaged position. The guide may be a pair of cone segments connected to a lower end of the tong housings, such as by fastening, for receiving a threaded coupling, such as a box, of the drill string 2. The thread saver 33 may extend into the tong opening for stabbing into the drill pipe box. Once stabbed, the tong actuator may be operated to engage the drill pipe box, thereby torsionally connecting the drill pipe box to the drive body 22. The motor unit 4m may then be operated to rotate the thread saver 33 relative to the drill pipe box, thereby connecting the drilling unit 4d to the drill string 2.

Figure 3:
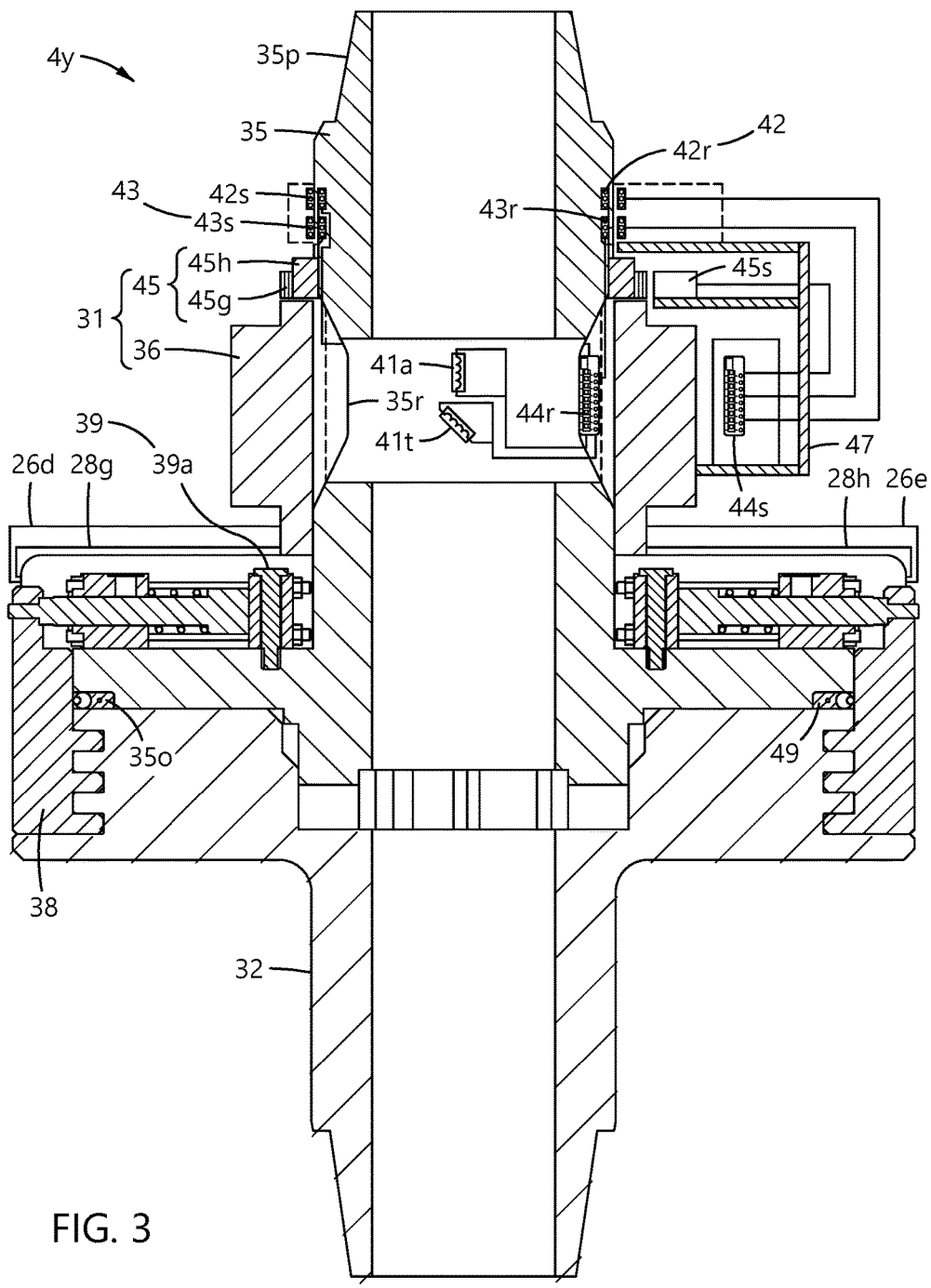
FIGS. 3, 4A, and 4B illustrate a combined multi-coupler of the top drive in a docked mode.
Figure 4A:
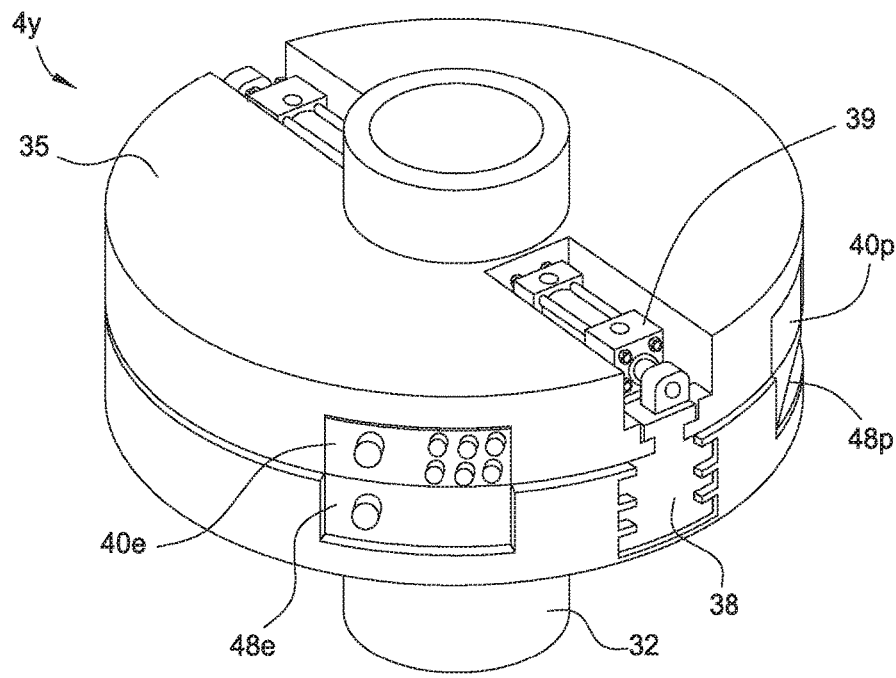
Figure 4B:
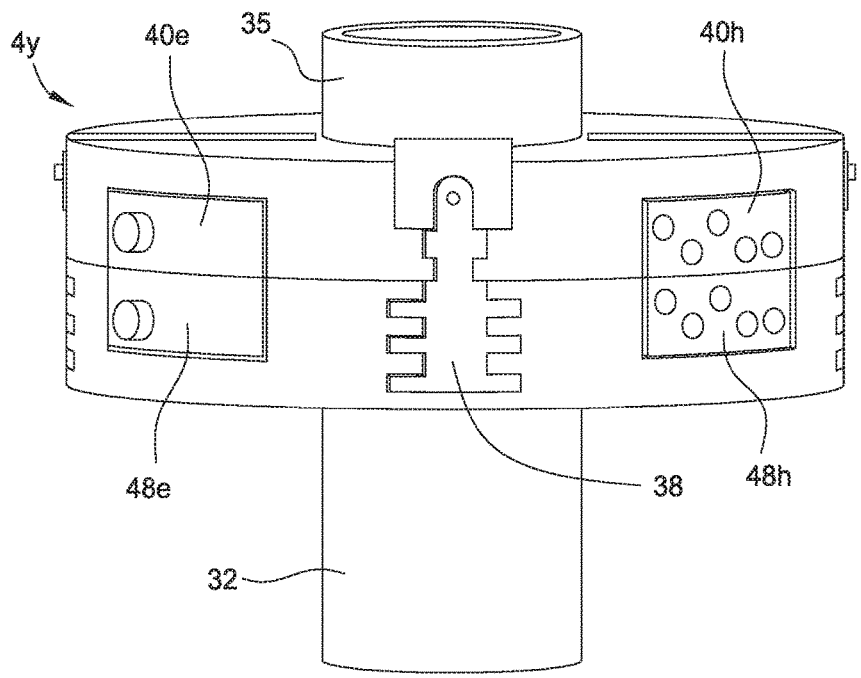

FIGS. 3, 4A, and 4B illustrate the CMC 4y in a docked mode. The latch head 31 may include a torque shaft 35, a control swivel 36, a seal sleeve 37 (FIG. 2), a plurality of latch members, such as blocks 38, a latch actuator 39 for each latch block, one or more junction members 40d,e,h,p (40d in FIG. 5A), and a torque sub.

The torque sub may include a recess 35r of the torque shaft 35, one or more load cells 41a,t, one or more wireless couplings, such as a wireless power coupling 42 and a wireless data coupling 43, a shaft electronics package 44r, a turns counter 45, a non-rotating interface box 47, and an interface electronics package 44s. The interface box 47 may be connected to a non-rotating outer barrel of the control swivel 36, such as by fastening. The load cell 41t may include a circuit of one or more torsional strain gages and the load cell 41a may include a circuit of one or more longitudinal strain gages, each strain gage attached to the recess of the torque shaft 35, such as by adhesive. The strain gages may each be made from metallic foil, semiconductor, or optical fiber.

Additionally, the load cell 41a may include a set of strain gages disposed around the torque shaft 35 such that one or more bending moments exerted on the torque shaft may be determined from the strain gage measurements.

Each wireless coupling 42, 43 may include a shaft member 42r, 43r connected to the torque shaft 35 and an interface member 42s, 43s housed in an encapsulation on the interface box 47. The wireless power coupling members 42r,s may each be inductive coils and the wireless data coupling members 43r,s may each be antennas. The shaft electronics may be connected by leads and the electronics package 44r, load cells 41a,t, and the shaft member 43r may be encapsulated into the recess.

Alternatively, the torque shaft 35 may carry a power source, such as a battery, capacitor, and/or inductor, and the wireless power coupling 42 may be omitted or used only to charge the power source.

The shaft electronics package 44r may include a microcontroller, a power converter, an ammeter and a transmitter. The power converter may receive an AC power signal from the power coupling 42r and convert the signal to a DC power signal for operation of the shaft electronics. The DC power signal may be supplied to the load cells 41a,t and the ammeter may measure the current. The microcontroller may receive the measurements from the ammeter and digitally encode the measurements. The transmitter may receive the digitally encoded measurements, modulate them onto a carrier signal, and supply the modulated signal to the shaft member 43r.

The interface electronics package 44s may be housed in the interface box 47. The interface member 43s may receive the modulated signal and the interface electronics package 44s may include a receiver for demodulating the signal. The interface electronics package 44s may further include a microcontroller for digitally decoding the measurements and converting the measurements to torque and longitudinal load. The interface electronics package 44s may send the converted measurements to the control console 29 via a data cable 26b (FIG. 2). The interface package 44s may further include a power converter for supplying the interface data coupling with the AC power signal. The interface electronics package 44s may also be powered by the data cable 26b or include a battery.

The turns counter 45 may include a base 45h torsionally connected to the torque shaft 35, a turns gear 45g connected to the base, and a proximity sensor 45s housed in the interface box 47 and located adjacent to the turns gear. The turns gear 45g may be made from an electrically conductive metal or alloy and the proximity sensor 45s may be inductive. The proximity sensor 45s may include a transmitting coil, a receiving coil, an inverter for powering the transmitting coil, and a detector circuit connected to the receiving coil. A magnetic field generated by the transmitting coil may induce an eddy current in the turns gear 45g. The magnetic field generated by the eddy current may be measured by the detector circuit and supplied to the interface microcontroller. The interface microcontroller may then convert the measurement to angular movement and/or speed and supply the converted measurement to the control console 29.

Alternatively, the proximity sensor 45s may be Hall effect, ultrasonic, or optical. Alternatively, the turns counter 45 may include a gear box instead of a single turns gear 45g to improve resolution.

Figure 5A:
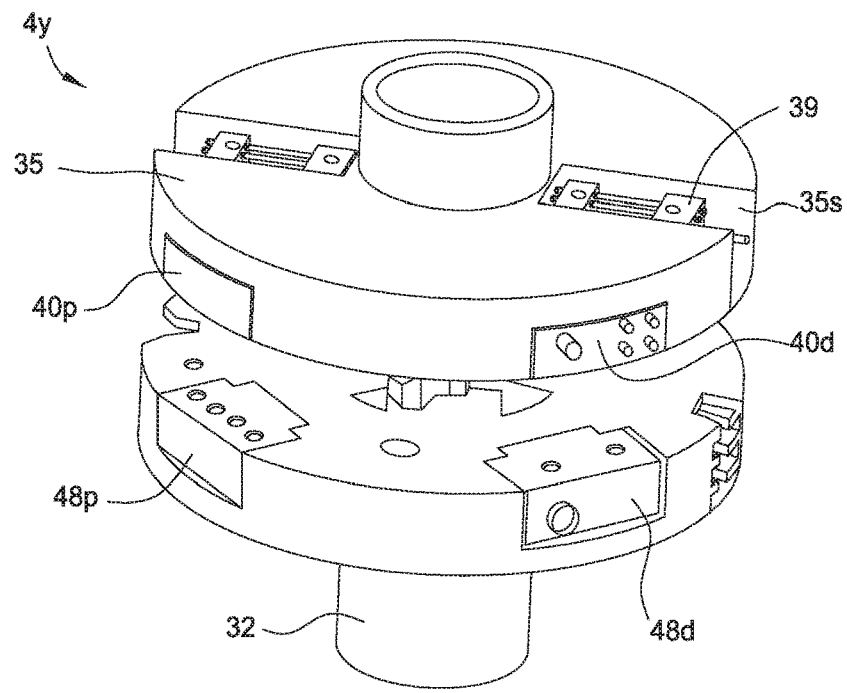
FIGS. 5A and 8 illustrate the combined multi-coupler in a release mode.
Figure 5B:
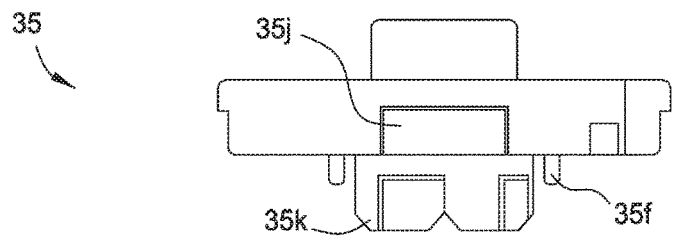
FIGS. 5B and 5C illustrate a torque shaft of a latch head of the combined multi-coupler.
Figure 5C:
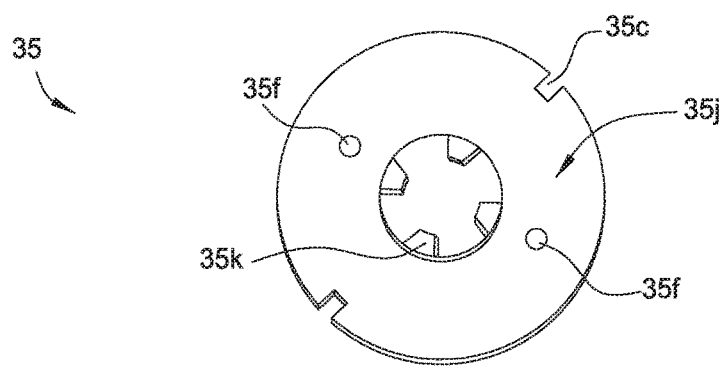

FIGS. 5B and 5C illustrate the torque shaft 35. The torque shaft 35 may have a bore formed therethrough and may have a tubular portion and a flange portion extending outward from the tubular portion. The tubular portion of the torque shaft 35 may have a coupling, such as a threaded box or pin 35p (FIG. 3), formed at a top thereof, may have the recess 35r formed in an outer surface thereof, and may have a torsional coupling, such as keys 35k, formed in an a bottom thereof. The flange portion of the torque shaft 35 may have receptacles 35j formed in a lower face and an outer surface thereof for receiving the respective junction members 40d,e,h,p, may have one or more slots 35s (FIG. 5A) formed in an upper face thereof for receiving the respective latch actuator 39, may have cavities 35c formed in an outer surface thereof for receiving the latch blocks 38, and may have an alignment feature, such as pins 35f, extending from the lower face thereof. Each junction member 40d,e,h,p may be disposed in the respective receptacle 35j and connected to the torque shaft 35, such as by fastening. The quill 23q may have a coupling, such as a threaded box (shown) or pin, formed at a lower end thereof and an upper end of the torque shaft 35 may be longitudinally and torsionally connected to the lower end of the quill 23q, such as by mating of the threaded couplings 35p.

Figure 7A:
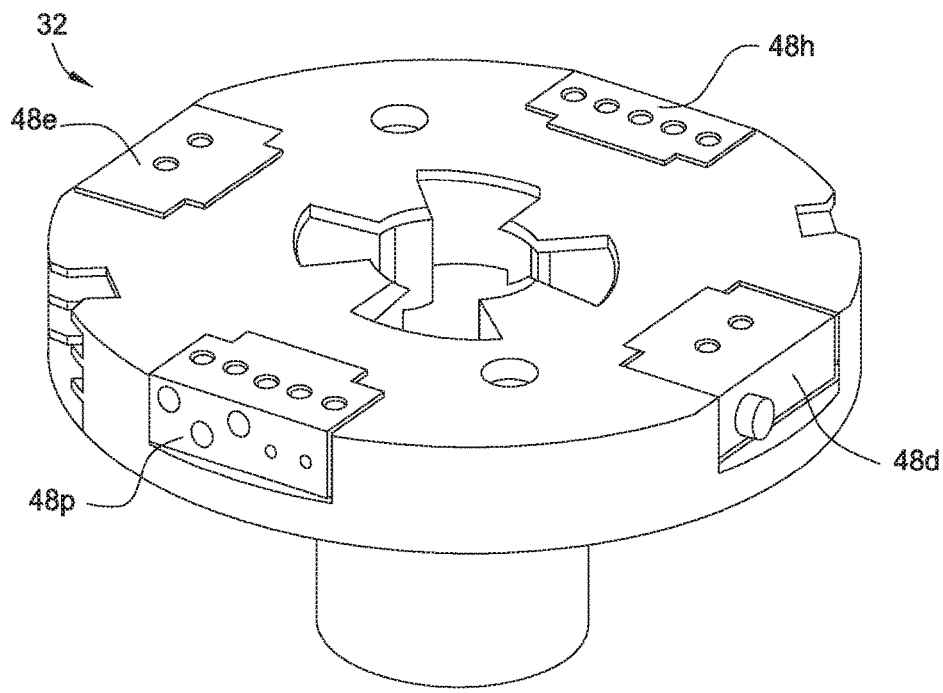
FIG. 7A illustrates a typical stem of the combined multi-coupler.

FIG. 7A illustrates a stem 32 typical of the stems 32d,c,s. The stem 32 may have a bore formed therethrough and may have a tubular portion and a flange portion extending outward from the tubular portion. The tubular portion of the stem 32 may have a polished receptacle formed in an inner surface thereof and adjacent to a top thereof, may have a torsional coupling, such as keyways, formed in the top thereof, and may have a coupling, such as a threaded box or pin, formed at a bottom thereof. The flange portion of the stem 32 may have receptacles formed in an upper face and outer surface thereof for receiving respective junction members 48d,e,h,p, may have one or more latch profiles formed in an outer surface thereof for receiving the latch blocks 38, and may have an alignment feature, such as pinholes, extending from the upper face thereof. Each junction member 48d,e,h,p may be disposed in the respective receptacle of the stem 32 and be connected thereto, such as by fastening. Alignment and orientation of the pins 35f with the pinholes of the stem 32 may orient the keys 35k with respect to the keyways of the stem 32 such that when the upper face of the stem 32 is engaged with the lower face of the torque shaft 35, the keys may mate with the keyways, thereby torsionally connecting the respective unit 4c,d,s to the latch head 31, and the latch profiles may be aligned with the cavities 35c, thereby allowing the latch actuator 39 to engage the latch bocks 38 therewith for longitudinally connecting the respective unit to the latch head.

Alternatively, the alignment features 35f may be part of the torsional couplings instead of being located on the flange portions.

The seal sleeve 37 may have an upper threaded portion (thread not shown), a lower stinger portion, and a shoulder connecting the portions. The upper threaded portion of the seal sleeve 37 may carry a seal (not shown) for engagement with a seal bore of the torque shaft 35 upon engagement of the upper threaded portion with an inner thread formed adjacent to the lower face of the torque shaft. A lower end of the stinger portion of the seal sleeve 37 may carry a stab seal (not shown) for engagement with the inner seal receptacle of each stem 32c,d,s when the respective unit 4d,c,s is connected to the latch head 31, thereby sealing an interface formed between the units.

The control swivel 36 may include a rotating inner barrel and the non-rotating outer barrel. The inner barrel may be disposed around and connected to the torque shaft 35 and the outer barrel may be supported from the inner barrel by one or more bearings. The control swivel 36 may further include a torsional arrestor (not shown), such as a bracket, connected to the outer barrel and engaged with the rail 4r. The outer barrel may have one or more ports (not shown) for each of the hydraulic 40h and pneumatic 40p junction members formed through a wall thereof, each port in fluid communication with a respective passage (not shown) formed through the inner barrel. An interface between each port and passage may be straddled by dynamic seals (not shown) for isolation thereof. The outer barrel ports may be in fluid communication with the respective manifolds 27m, 30m via respective control lines 28e,f (FIG. 2, only one shown for each) and the inner barrel passages may be in fluid communication with the respective hydraulic 40h and pneumatic 40p junction members via control lines 28g,h (FIG. 3). The outer barrel ports may be disposed along the outer barrel. The inner barrel may have a mandrel portion extending along the outer barrel and a foot portion extending below the outer barrel. The foot portion may connect to the torque shaft 35 and have the ports extending therearound.

The outer barrel may also have one or more electrical couplings (not shown) for each of the electric power 40e and data 40d junction members and conduits extending therefrom and formed through a wall thereof, each conduit in electrical communication with a respective conduit formed through the inner barrel. The outer barrel couplings may be in electrical communication with the respective rectifier 25r or control console 29 via respective control cables 26c,b (FIG. 2, only one shown for each) and the inner barrel passages may be in fluid communication with the respective electric power 40e and data 40d junction members via control cables 26d,e (FIG. 3).

Each fluid junction member 40h,p, 48h,p may include a radial connection plate facing outward from the respective latch head 31 or stem 32c,d,s and a longitudinal stab plate facing upward or downward from the respective stem or latch head. Each connection plate may include a nipple for each control line 28g,h and a passage for each control line. A male stab plate of one of each fluid junction member 40h,p, 48h,p may have a stinger for each control line 28g,h, each stinger in fluid communication with a respective passage and carrying a seal. A female stab plate of the other one of each fluid junction member 40h,p, 48h,p may have a seal receptacle for each control line 28g,h, each receptacle in fluid communication with a respective passage and configured to receive each stinger.

Each electrical junction member 40d,e, 48d,e may include a radial connection plate facing outward from the respective latch head 31 or stem 32c,d,s and a longitudinal stab plate facing upward or downward from the respective stem or latch head. Each connection plate may include an electrical coupling for each control cable 26d,e, and a conduit for each control cable. A male stab plate of one of each electrical junction member 40d,e, 48d,e may have a conductive plug for each cable 26d,e, each plug in electrical communication with a respective conduit. A female stab plate of the other one of each electrical junction member 40d,e, 48d,e may have a conductive socket for each control cable 26d,e, each socket in electrical communication with a respective conduit and configured to receive each plug.

When the upper face of the stem 32 is engaged with the lower face of the torque shaft 35, the junction members 40d,e,h,p may mate with the respective junction members 48d,e,h,p, thereby establishing data, electrical, hydraulic, and pneumatic communication between the respective stem and the control swivel 36. If a particular one of the stems 32c,d,s does not require all four medias of communication, then the particular stem may have one or more blank or plugged junction members (not shown) for the unused media(s).

Figure 6A:
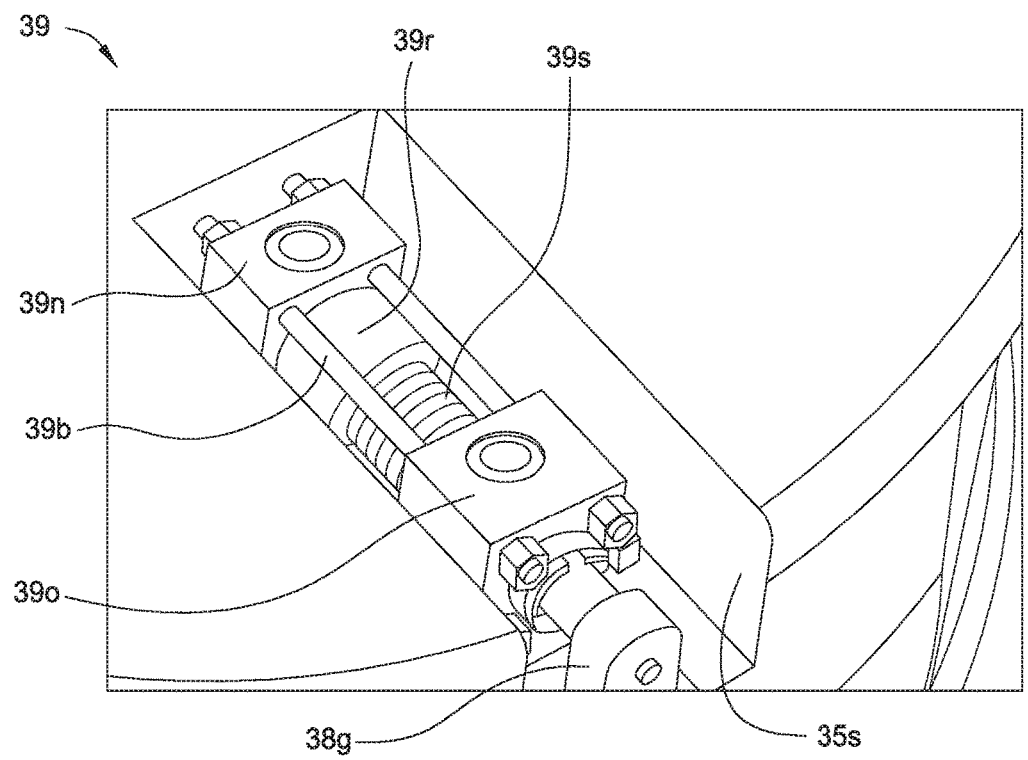
FIG. 6A illustrates a latch actuator of the latch head.
Figure 8:
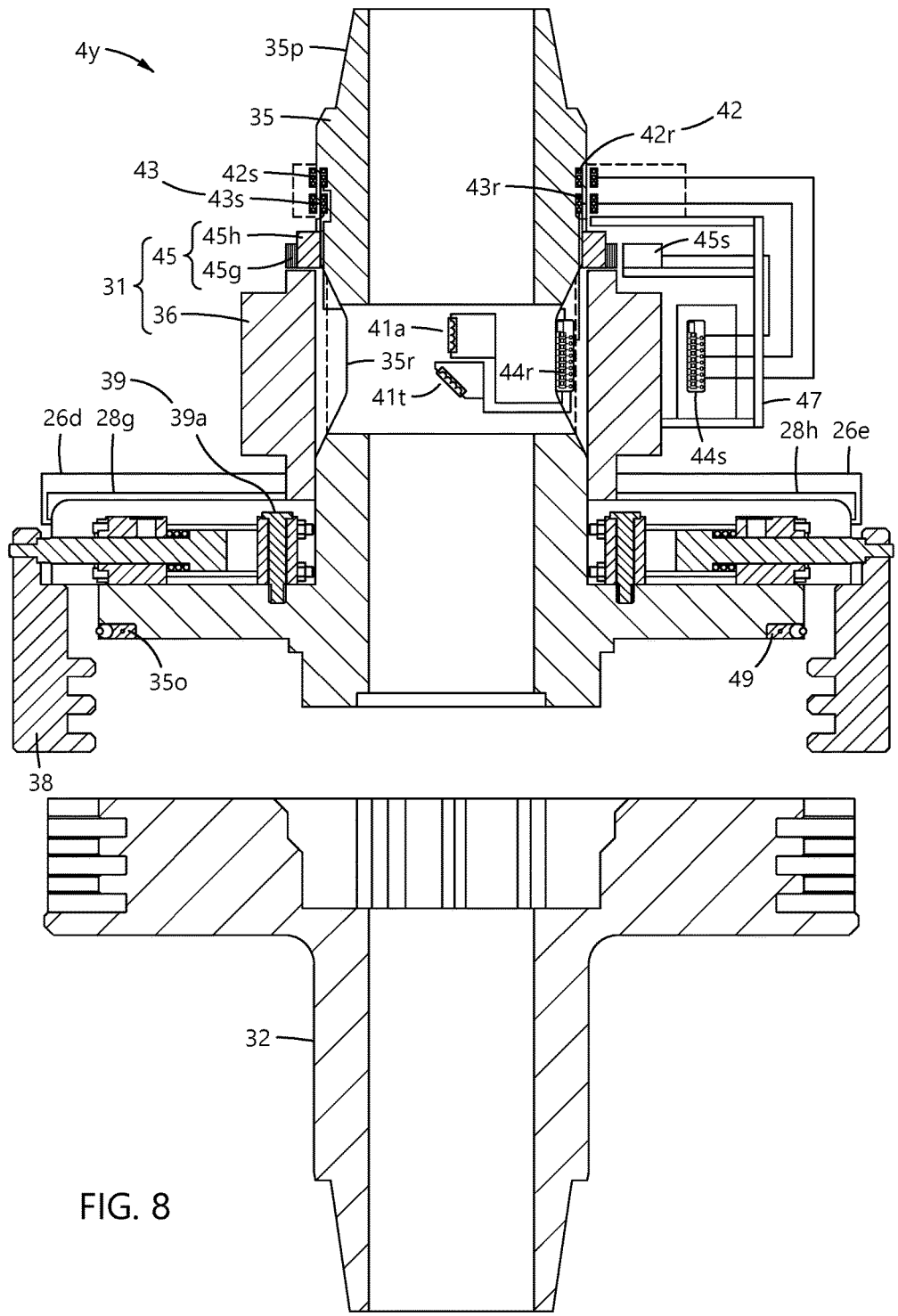

FIG. 6A illustrates a typical one of the latch actuators 39. Each latch actuator 39 may be disposed in a respective slot 35s and connected to the torque shaft 35, such as by a first fastener 39a (FIG. 3). The latch actuator 39 may further include an inner block 39n, an outer block 39o, one or more second fasteners 39b connecting the inner and outer blocks, a rod 39r, and a spring 39s, such as a compression spring. The inner 39n and outer 39o blocks may be spaced apart along the respective slot 35s. The outer block 39o may have a bore formed therethrough. The rod 39r may have a head formed at an inner end thereof, may have a coupling, such as a threaded pin, formed at an outer end thereof, and may have a shank connecting the head and the threaded pin. The shank of the rod 39r may extend through the bore of the outer block 39o and the rod may be radially movable relative to the inner 39n and outer blocks between a retracted position (shown) and an extended position (FIG. 8). An inner end of the spring 39s may bear against a shoulder of the rod 39r formed between the head and the skank thereof and an outer end of the spring may bear against the outer latch block 39o, thereby biasing the rod toward the retracted position.

Each latch block 38 may have a coupling, such as a threaded box, formed in a lug 38g thereof and mated with the threaded pin of the respective rod 39r, thereby connecting the rod and the latch block. Movement of each rod 39r to the extended position may disengage the respective latch block 38 from the respective latch profile of the stem 32 and movement of each rod 39r to the retracted position may engage the respective latch block 38 with the respective latch profile. The latch actuator 39 may further include a solenoid (not shown) wrapped around second fasteners 39b and a power converter (not shown) connected to the solenoid and in electrical communication with the rectifier 25r via control cable 26f,g (FIG. 2). The head of the rod 39r may be made from a magnetic material and energization of the solenoid may move the rod 39r to the extended position against the bias of the spring 39s.

Alternatively, the latch actuator 39 may include a cylinder instead of the solenoid and the head of the rod 39r may be a piston in sealing engagement with the cylinder and the rod may be moved to the extended position by supply of pressurized fluid to a chamber formed between the piston and the cylinder.

Figure 6B:
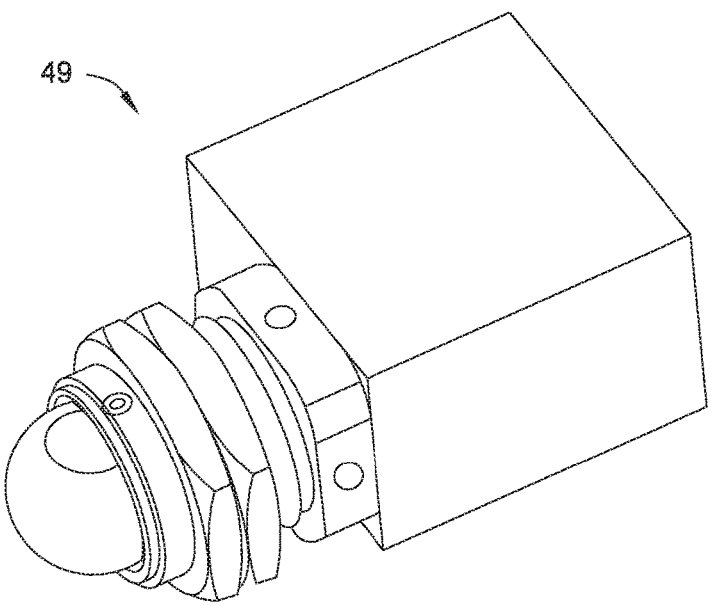
FIG. 6B illustrates a latch sensor of the latch head.

FIG. 6B illustrates a typical latch sensor 49 of the latch head 31. The latch head 31 may further include one of the latch sensors 49 for each latch block 38. Each latch sensor 49 may be disposed in a respective cutout 35o (FIG. 3) formed in the lower face of the torque shaft 35 in alignment with the respective slot 35s. The latch sensor 49 may be connected to the torque shaft 35, such as by fastening. Each latch sensor 49 may be in fluid communication with the pneumatic manifold 30m via a respective control line 28j,k (FIG. 2). The latch sensor 49 may be a valve movable between an open position and a closed position and biased toward the closed position by pneumatic pressure. When the latch blocks 38 are in the disengaged position, the valve may be closed, thereby resulting in no air flow through the control lines. As the latch blocks 38 are moved to the engaged position by the latch actuators 39, inner surfaces of the latch blocks may engage valve members of the latch sensors 49, thereby opening the valves and causing air flow through the control lines which is detectable by flow meters of the pneumatic manifold 30m. The pneumatic manifold 30m may then report detection of successful engagement of the latch blocks 38 to the control console 29.

Figures 7B, 7C, 7D:
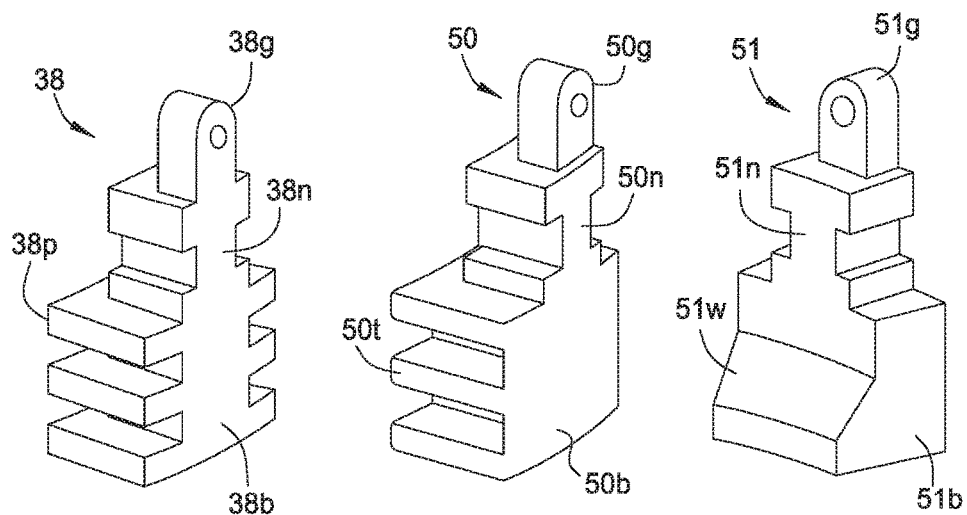
FIG. 7B illustrates a latch block of the combined multi-coupler.
FIGS. 7C and 7D illustrate alternative latch blocks for the combined multi-coupler, according to other embodiments of the present disclosure.

FIG. 7B illustrates a typical one of the latch blocks 38. The latch block 38 may have a central backbone 38b, plates 38p extending from sides and an inner surface of the backbone, a neck 38n extending upward from the backbone 38b, and the lug 38g formed on top of the neck. The plates 38p may mate with the respective latch profile of the stem 32 and the neck 38n may mate with the respective cavity 35c of the torque shaft 35, thereby longitudinally connecting the respective unit 4c,d,s to the latch head 31.

FIGS. 7C and 7D illustrate alternative latch blocks 50, 51 for the CMC 4y, according to other embodiments of the present disclosure. A first alternative latch block 50 may have an outer base 50b, inner teeth 50t extending from and along an inner surface of the base, a neck 50n extending upward from the base, and a lug 50g formed on top of the neck. A second alternative latch block 51 may have a base 51b with a wedge 51w formed on an inner surface thereof, a neck 51n extending upward from the base, and a lug 51g formed on top of the neck.

FIGS. 5A and 8 illustrate the CMC 4y in a release mode. During drilling of the wellbore 9, once a top of the drill string 2 reaches the rig floor 3f, the drill string must be extended to continue drilling. Drilling may be halted by stopping rotation 6r of the motor unit 4m, stopping lowering 6a of the traveling block 5t, stopping injection of the drilling fluid 13d, and removing weight from the drill bit 2b. A spider 52 (FIG. 1) may then be installed into a rotary table 53 (FIG. 1), thereby longitudinally supporting the drill string 2 from the rig floor 3f. The tong actuator of the backup wrench 4w may be operated via control line 28d to engage the backup wrench tong with a top coupling of the drill string 2. The drive motors 18 may then be operated to loosen and counterspin the connection between the thread saver 33 and the top coupling of the drill string 2.

The pipe handler 4p may then be raised by the hoist 5 until the drill pipe elevator is adjacent a top of the stand 2s to be added to the drill string 2. The elevator may be engaged with the stand 2s, the hoist 5 operated to lift the stand from a pipe rack of the drilling rig 1r, and the link tilt operated to swing the stand from the pipe rack to a location adjacent a top of the drill string 2. A set of tongs may be used to screw the stand 2s into the top of the drill string 2. The top drive 4 may then be lowered by the hoist 5 until the thread saver 33 is adjacent to a top of the stand 2. The backup wrench 4w may then be engaged with the top of the stand 2s and the drive motors 18 operated to spin and tighten the connection between the thread saver 33 and the top coupling of the stand. The spider 52 may then be released and drilling may continue.

Once drilling the lower formation 10b has been completed, the drill string 2 may be tripped out from the wellbore 9. Once the drill string 2 has been retrieved to the rig 1r, the backup wrench 4w may be shifted to the stowed position and the drilling unit 4d may be released from the motor unit 4m by operation of the actuator 39. The drilling elevator may be removed from the pipe handler 4*p* and the link tilt operated to move the bails to a stowed position.

Figure 9:
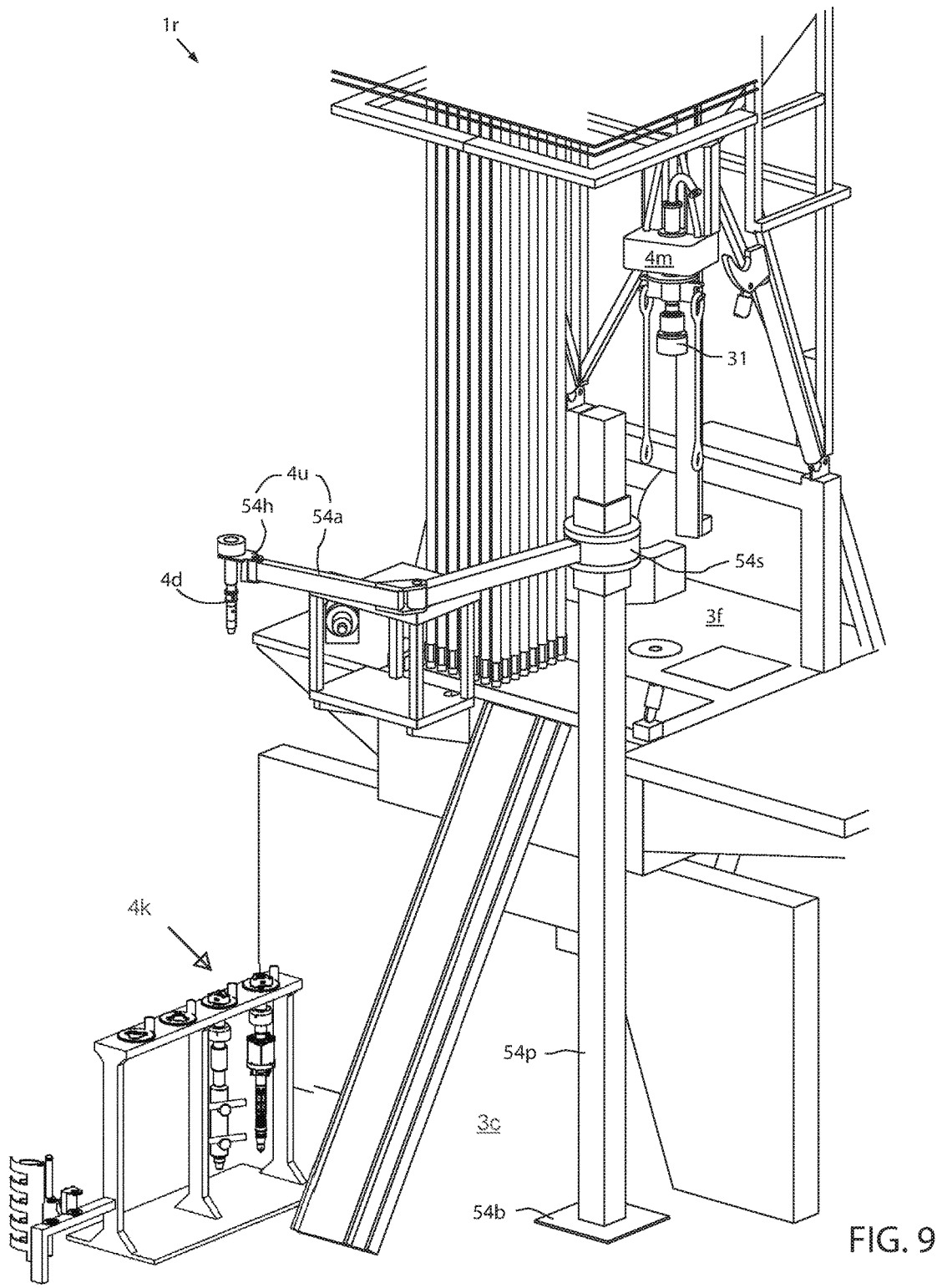
FIG. 9 illustrates a unit handler of the top drive transporting a drilling unit thereof from a motor unit thereof.

FIG. 9 illustrates the unit handler 4*u*. The unit handler 4*u* may transport the units 4*d,c,s* between a unit rack 4*k* located on or adjacent to a structure of the drilling rig 1*r* and the motor unit 4*m*. A unit rack 4*k* may include one or more tool receiving slots for storing the tool units. Each tool receiving slot may include a coupling profile for receiving a tool. The coupling profile in each tool receiving slot may be the same as the coupling profile in the motor unit 4*m*. The rig structure may be a subfloor structure, such as a catwalk 3*c* or pad (not shown). The unit handler 4*u* may include a post 54*p*, a slide hinge 54*s*, an arm 54*a*, a holder 54*h*, a base 54*b*, and one or more actuators (not shown).

The base 54*b* may mount the post 54*p* on or adjacent to the catwalk 3*c* (or other rig structure discussed above). The post 54*p* may extend vertically from the base 54*b* to a height above the rig floor 3*f* such that the unit handler 4*u* may transport any of the units 4*d,c,s* between the unit rack and the motor unit 4*m*. The arm 54*a* may be connected to the slide hinge 54*s*, such as by fastening. The slide hinge 54*s* may be transversely connected to the post 54*p*, such as by a slide joint, while being free to move longitudinally along the post. The slide hinge 54*s* may also be pivotally connected to a linear actuator (not shown), such as by fastening. The slide hinge 54*s* may longitudinally support the arm 54*a* from the linear actuator while allowing pivoting of the arm relative to the post 54*p*. The unit handler 4*u* may further include an electric or hydraulic slew motor (not shown) for pivoting the arm 54*a* about the slide hinge 54*s*.

The linear actuator may have a lower end pivotally connected to the base 54*b* and an upper end pivotally connected to the slide hinge 54*s*. The linear actuator may include a cylinder and a piston disposed in a bore of the cylinder. The piston may divide the cylinder bore into a raising chamber and a lowering chamber and the cylinder may have ports formed through a wall thereof and each port may be in fluid communication with a respective chamber. Each port may be in fluid communication with the hydraulic manifold 27*m* via a control line (not shown). Supply of hydraulic fluid to the raising port may move the slide hinge 54*s* and arm 54*a* upward to the rig floor 3*f*. Supply of hydraulic fluid to the lowering port may move the slide hinge 54*s* and arm 54*a* downward toward the base 54*b*.

Alternatively, the linear actuator may include an electromechanical linear actuator, such as a motor and lead screw or pinion and gear rod, instead of the piston and cylinder assembly.

The arm 54*a* may include a forearm, an aft-arm, and an actuated joint, such as an elbow, connecting the arm segments. The holder 54*h* may be releasably connected to the forearm, such as by fastening. The arm 54*a* may further include an actuator (not shown) for selectively curling and extending the forearm and relative to the aft-arm. The arm actuator may have an end pivotally connected to the forearm and another end pivotally connected to the aft-arm. The arm actuator may include a cylinder and a piston disposed in a bore of the cylinder. The piston may divide the cylinder bore into an extension chamber and a curling chamber and the cylinder may have ports formed through a wall thereof and each port may be in fluid communication with a respective chamber. Each port may be in fluid communication with the HPU manifold 27*m* via a control line (not shown). Supply of hydraulic fluid to the respective ports may articulate the forearm and holder 54*h* relative to the aft-arm toward the respective positions.

Alternatively, the arm actuator may include an electromechanical linear actuator, such as a motor and lead screw or pinion and gear rod, instead of the piston and cylinder assembly. Alternatively, the actuated joint may be a telescopic joint instead of an elbow. Additionally, the holder 54*h* may include a safety latch for retaining any of the units 4*c,d,s* thereto after engagement of the holder therewith to prevent unintentional release of the units during handling thereof. Additionally, the holder 54*h* may include a brake for torsionally connecting any of the units 4*c,d,s* thereto after engagement of the holder therewith to facilitate connection to the motor unit 4*m*.

Before release of the drilling unit 4*d* from the motor unit 4*m*, the unit handler 4*u* may be operated to engage the holder 54*h* with the lower face of the drilling stem 32*d*. The drilling unit 4*d* may then be released from the motor unit 4*m* into the grasp of the holder 54*h*. The unit handler 4*u* may then be operated to deliver the drilling unit 4*d* to the unit rack.

Figure 10:
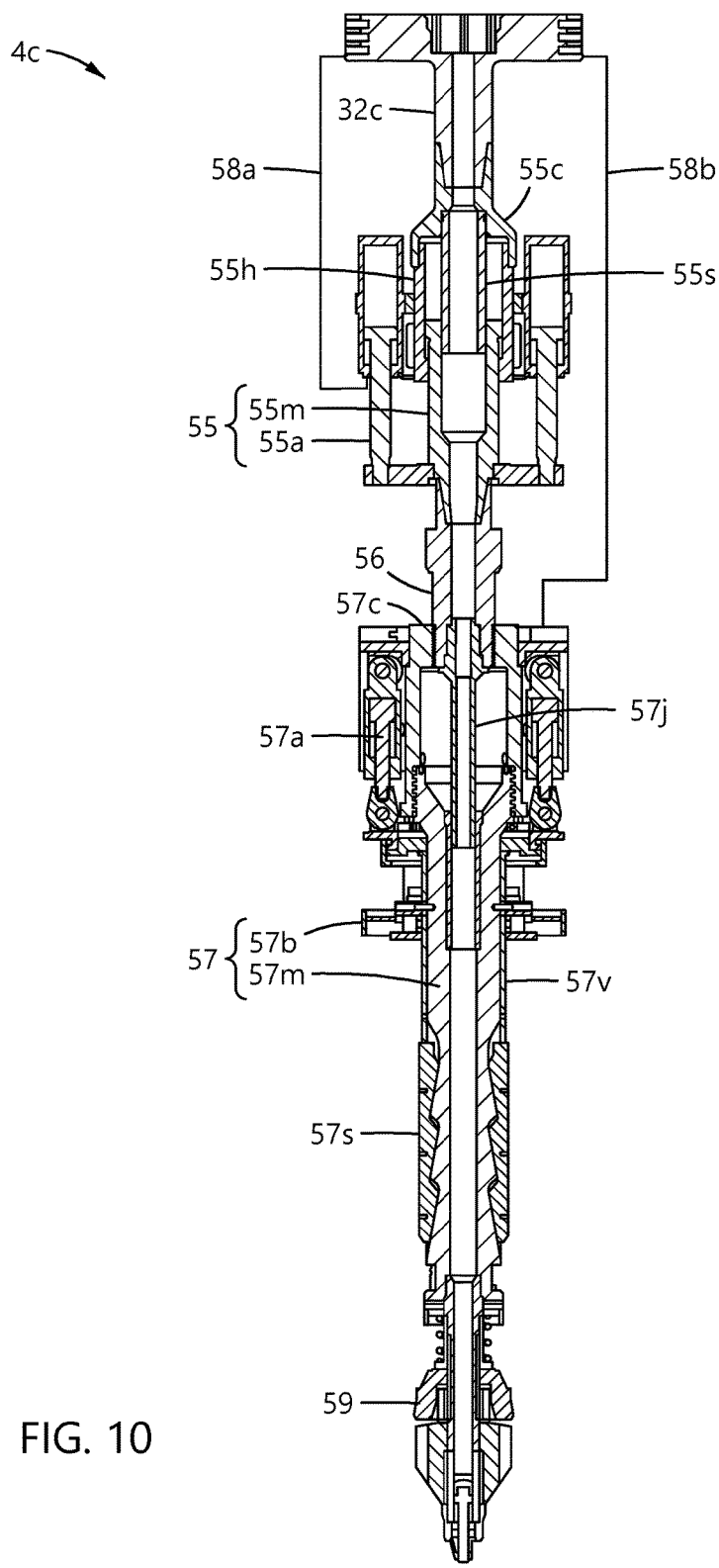
FIG. 10 illustrates a casing unit of the top drive.

FIG. 10 illustrates the casing unit 4*c*. The casing unit 4*c* may include the casing stem 32*c*, a thread compensator 55, an adapter 56, a clamp, such as a spear 57, one or more control lines 58*a,b*, and a fill up tool 59. The casing stem 32*c*, thread compensator 55, adapter 56, spear 57, and fill up tool 59 may be connected together, such as by threaded couplings.

The thread compensator 55 may include a cap 55*c*, a housing 55*h*, a mandrel 55*m*, a seal sleeve 55*s*, and an actuator 55*a*. The mandrel 55*m* may be longitudinally movable relative to the housing 55*h* between a retracted position and an engaged position by the actuator 55*a*. The actuator 55*a* may include one or more piston and cylinder assemblies. Upper ends of the piston and cylinder assemblies may be connected to the housing 55*h*, such as by a collar. Ports of the piston and cylinder assemblies may be in fluid communication with the HPU manifold 27*m* via the control line 58*a* for operation of the thread compensator 55.

Alternatively, the actuator 55*a* may be pneumatically operated instead of hydraulically operated and the control line 58*a* may be pneumatic instead of hydraulic.

The cap 55*c* may be annular and have a bore therethrough. An upper end of the cap 55*c* may include a coupling, such as a threaded box, for connection with the threaded pin of the casing stem 32*c*, thereby longitudinally and torsionally connecting the stem and the cap. The cap 55*c* may taper outwardly so that a lower end thereof may have a substantially greater diameter than the upper end. An inner surface of the cap 55*c* lower end may be threaded for receiving a threaded upper end of the housing 55*h*, thereby longitudinally and torsionally connecting the cap and the housing.

The housing 55*h* may be tubular and have a bore formed therethrough. A lower end of the housing 55*h* may be longitudinally splined for engaging longitudinal splines formed on an outer surface of the mandrel 55*m*, thereby torsionally connecting the housing and the mandrel while allowing relative longitudinal movement therebetween. The housing 55*h* lower end may form a shoulder for receiving a corresponding shoulder formed at an upper end of the mandrel 55*m* when the thread compensator 55 is in a hoisting position, thereby longitudinally connecting the housing and the mandrel. The piston and cylinder assemblies may be capable of supporting weight of a casing joint 60*j* (FIG. 12) and the shoulders, when engaged, may be capable of supporting weight of a casing string 60 (FIG. 13A). The shoulders may engage before the piston and cylinder assemblies are fully extended, thereby ensuring that string weight is not transferred to the actuator 55*a*. A stroke length of the actuator 55*a* may correspond to, such as being equal to or slightly greater than, a makeup length of the casing joint 60*j*.

A lower end of the mandrel 55*m* may form a threaded coupling, such as a pin, for mating with a threaded coupling, such as a box, formed at an upper end of the adapter 56. The seal sleeve 55*s* may have an upper threaded portion and a polished portion extending therefrom. The upper threaded portion of the seal sleeve 55*s* may carry a seal for engagement with a seal bore of the cap 55*c* upon engagement of the upper threaded portion with an inner thread of the cap. The mandrel 55*m* may carry a sliding seal in an inner surface thereof adjacent to a top thereof for engagement with the polished portion of the seal sleeve 55*s*, thereby sealing an interface between the two members.

The spear 57 may be capable of supporting weight of the casing string 60. The spear 57 may include a linear actuator 57*a*, a bumper 57*b*, a collar 57*c*, a mandrel 57*m*, a set of grippers, such as slips 57*s*, a seal joint 57*j*, and a sleeve 57*v*. The collar 57*c* may have an inner thread formed at each longitudinal end thereof. The collar upper thread may be engaged with an outer thread formed at a lower end of the adapter 56, thereby connecting the two members. The collar lower thread may be engaged with an outer thread formed at an upper end of the mandrel 57*m* and the mandrel may have an outer flange formed adjacent to the upper thread and engaged with a bottom of the collar 57*c*, thereby connecting the two members.

The seal joint 57*j* may include an inner barrel, an outer barrel, and a nut. The inner barrel may have an outer thread engaged with an inner thread of the lower portion of the adapter 56 and an outer portion carrying a seal engaged with a seal bore portion of the casing stem. The mandrel 57*m* may have a bore formed therethrough and an inner receptacle formed at an upper portion thereof and in communication with the bore. The mandrel receptacle may have an upper conical portion, a threaded mid portion, and a recessed lower portion. The outer barrel may be disposed in the recessed portion of the mandrel 57*m* and trapped therein by engagement of an outer thread of the nut with the threaded mid portion of the mandrel receptacle. The outer barrel may have a seal bore formed therethrough and a lower portion of the inner barrel may be disposed therein and carry a stab seal engaged therewith.

The linear actuator 57*a* may include a housing, an upper flange, a plurality of piston and cylinder assemblies, and a lower flange. The housing may be cylindrical, may enclose the cylinders of the assemblies, and may be connected to the upper flange, such as by fastening. The collar 57*c* may also have an outer thread formed at the upper end thereof. The upper flange may have an inner thread engaged with the outer collar thread, thereby connecting the two members. Each flange may have a pair of lugs for each piston and cylinder assembly connected, such as by fastening or welding, thereto and extending from opposed surfaces thereof.

Each cylinder of the linear actuator 57*a* may have a coupling, such as a hinge knuckle, formed at an upper end thereof. The upper hinge knuckle of each cylinder may be received by a respective pair of lugs of the upper flange and pivotally connected thereto, such as by fastening. Each piston of the linear actuator 57*a* may have a coupling, such as a hinge knuckle, formed at a lower end thereof. Each piston of the linear actuator 57*a* may be disposed in a bore of the respective cylinder. The piston may divide the cylinder bore into a raising chamber and a lowering chamber and the cylinder may have ports formed through a wall thereof and each port may be in fluid communication with a respective chamber.

Each port may be in fluid communication with the HPU manifold 27*m* via the respective control line 58*b* (only one shown). Supply of hydraulic fluid to the raising port may lift the lower flange to a retracted position (shown). Supply of hydraulic fluid to the lowering port may drop the lower flange toward an extended position (not shown). The piston and cylinder assemblies may share an extension control line and a retraction control line via a splitter (not shown).

The sleeve 57*v* may have an outer shoulder formed in an upper end thereof trapped between upper and lower retainers. A washer may have an inner shoulder formed in a lower end thereof engaged with a bottom of the lower retainer. The washer may be connected to the lower flange, such as by fastening, thereby longitudinally connecting the sleeve 57*v* to the linear actuator 57*a*. The sleeve 57*v* may also have one or more (pair shown) slots formed through a wall thereof at an upper portion thereof. The bumper 57*b* may be connected to the mandrel 57*m*, such as by one or more threaded fasteners, each fastener extending through a hole thereof, through a respective slot of the sleeve 57*v*, and into a respective threaded socket formed in an outer surface of the mandrel, thereby also torsionally connecting the sleeve to the mandrel while allowing limited longitudinal movement of the sleeve relative to the mandrel to accommodate operation of the slips 57*s*. A lower portion of the spear 57 may be stabbed into the casing joint 60*j* until the bumper 57*b* engages a top of the casing joint. The bumper 57*b* may cushion impact with the top of the casing joint 60*j* to avoid damage thereto.

The sleeve 57*v* may extend along the outer surface of the mandrel from the lower flange of the linear actuator 57*a* to the slips 57*s*. A lower end of the sleeve 57*v* may be connected to upper portions of each of the slips 57*s*, such as by a flanged (i.e., T-flange and T-slot) connection. Each slip 57*s* may be radially movable between an extended position and a retracted position by longitudinal movement of the sleeve 57*v* relative to the slips. A slip receptacle may be formed in an outer surface of the mandrel 57*m* for receiving the slips 57*s*. The slip receptacle may include a pocket for each slip 57*s*, each pocket receiving a lower portion of the respective slip. The mandrel 57*m* may be connected to lower portions of the slips 57*s* by reception thereof in the pockets. Each slip pocket may have one or more (three shown) inclined surfaces formed in the outer surface of the mandrel 57*m* for extension of the respective slip. A lower portion of each slip 57*s* may have one or more (three shown) inclined inner surfaces corresponding to the inclined slip pocket surfaces.

Downward movement of the sleeve 57*v* toward the slips 57*s* may push the slips along the inclined surfaces, thereby wedging the slips toward the extended position. The lower portion of each slip 57*s* may also have a guide profile, such as tabs, extending from sides thereof. Each slip pocket may also have a mating guide profile, such as grooves, for retracting the slips 57*s* when the sleeve 57*v* moves upward away from the slips. Each slip 57*s* may have teeth formed along an outer surface thereof. The teeth may be made from a hard material, such as tool steel, ceramic, or cermet for engaging and penetrating an inner surface of the casing joint 60*j*, thereby anchoring the spear 57 to the casing joint.

The fill up tool 59 may include a flow tube, a stab seal, such as a cup seal, a release valve, and a mud saver valve. The cup seal may have an outer diameter slightly greater than an inner diameter of the casing joint to engage the inner surface thereof during stabbing of the spear 57 therein. The cup seal may be directional and oriented such that pressure in the casing bore energizes the seal into engagement with the casing joint inner surface. An upper end of the flow tube may be connected to a lower end of the mandrel 57m, such as by threaded couplings. The mud saver valve may be connected to a lower end of the flow tube, such as by threaded couplings. The cup seal and release valve may be disposed along the flow tube and trapped between a bottom of the mandrel and a top of the mudsaver valve.

Additionally, the casing unit 4c may include one or more sensors (not shown), such as a position sensor for the thread compensator 55, a position sensor for the linear actuator 57a, and a position sensor for the bumper 57b. The sensors may be data communication with the control console 29 via one or more control cables (not shown) connecting the sensors to the casing stem 32c. Additionally, the spear 57 may include one or more pneumatically operated control valves (not shown) in fluid communication with the pneumatic manifold 30m via one or more control lines (not shown) connecting the control valves to the casing stem 32c. Alternatively, the linear actuator 57a may be electrically or pneumatically operated instead of hydraulically operated and the control line 58b may be a control cable or pneumatic control line instead of a hydraulic control line.

Alternatively, the clamp may be a torque head instead of the spear 57. The torque head may be similar to the spear 57 except for receiving an upper portion of the casing joint 60j therein and having the grippers for engaging an outer surface of the casing joint instead of the inner surface of the casing joint.

Figure 11:
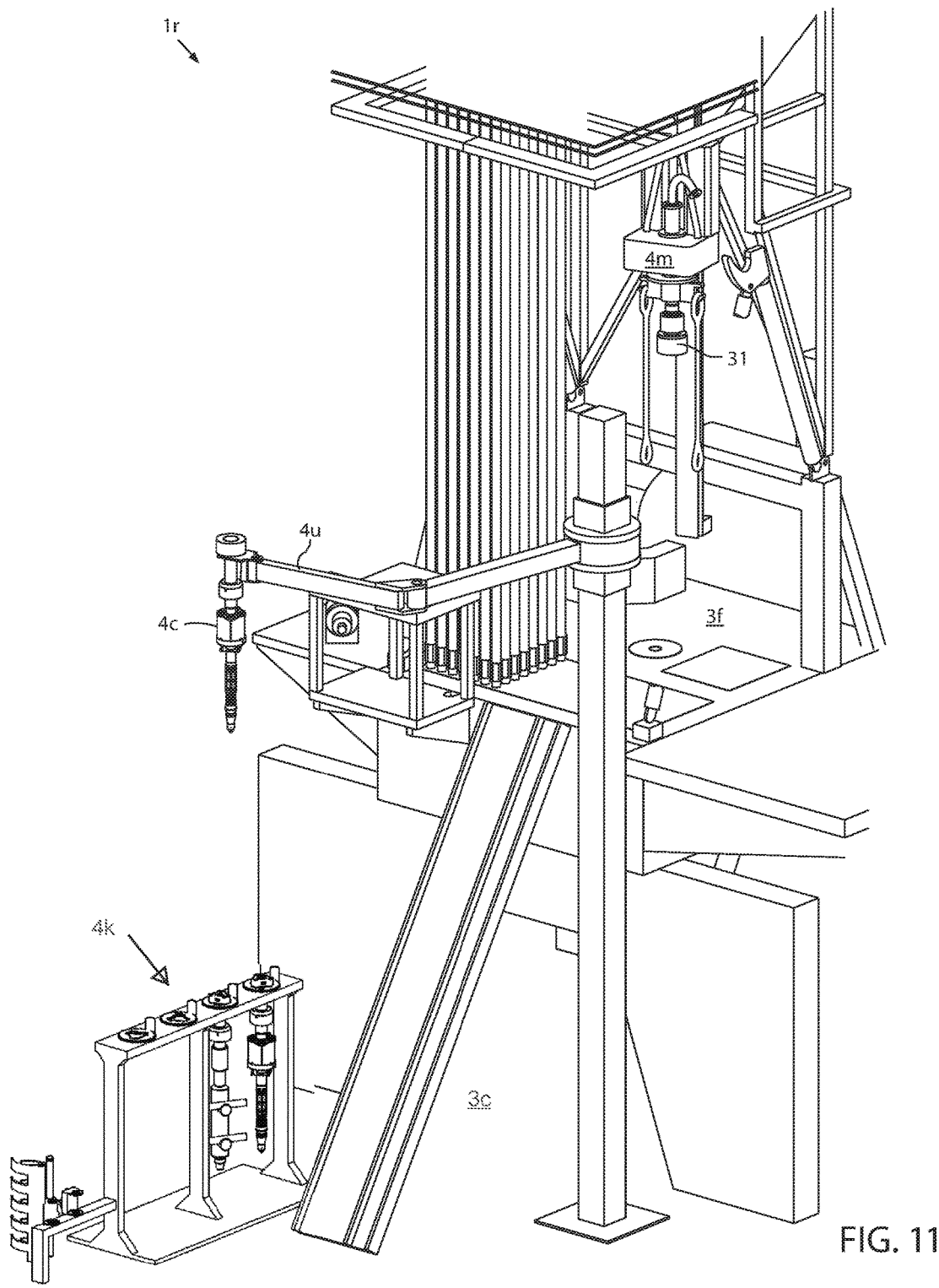
FIG. 11 illustrates the unit handler transporting the casing unit to the motor unit.

FIG. 11 illustrates the unit handler 4u transporting the casing unit 4c to the motor unit 4m. The unit handler 4u may be operated to retrieve the casing unit 4c from the unit rack, to hoist the casing unit above the rig floor 3f, and to a position the casing unit adjacent to the motor unit 4m. The drive motors 18 may then be operated to rotate the latch head 31 until the pins 35f are properly oriented with respect to the pinholes of the casing stem 32c. The unit handler 4u may then be operated to raise the casing stem 32c into engagement with the torque shaft 35 and the actuator 39 operated to engage the latch blocks 38 with the latch profiles of the casing stem.

Figure 12:
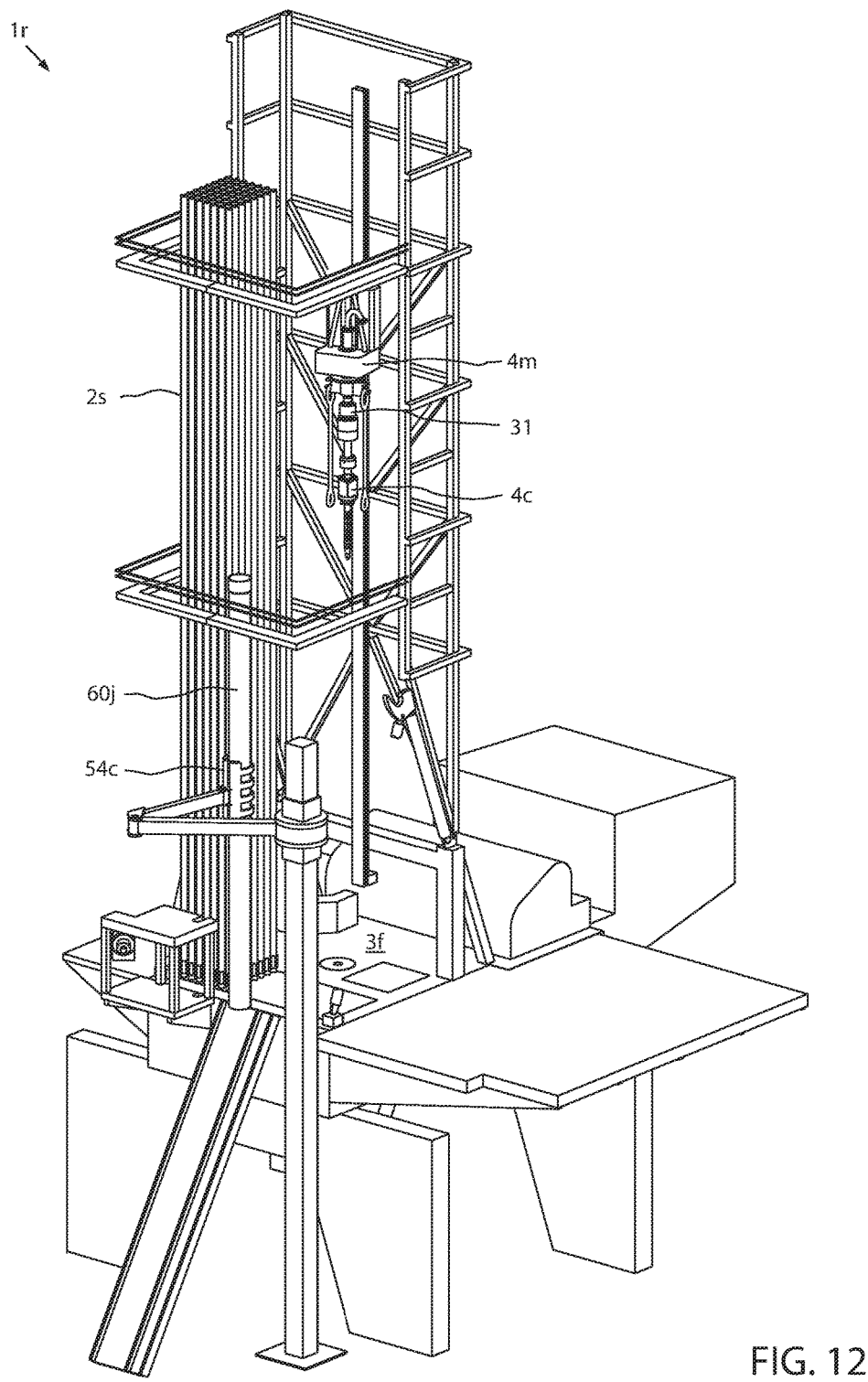
FIG. 12 illustrates the unit handler transporting a casing joint to the casing unit.
Figure 13A:
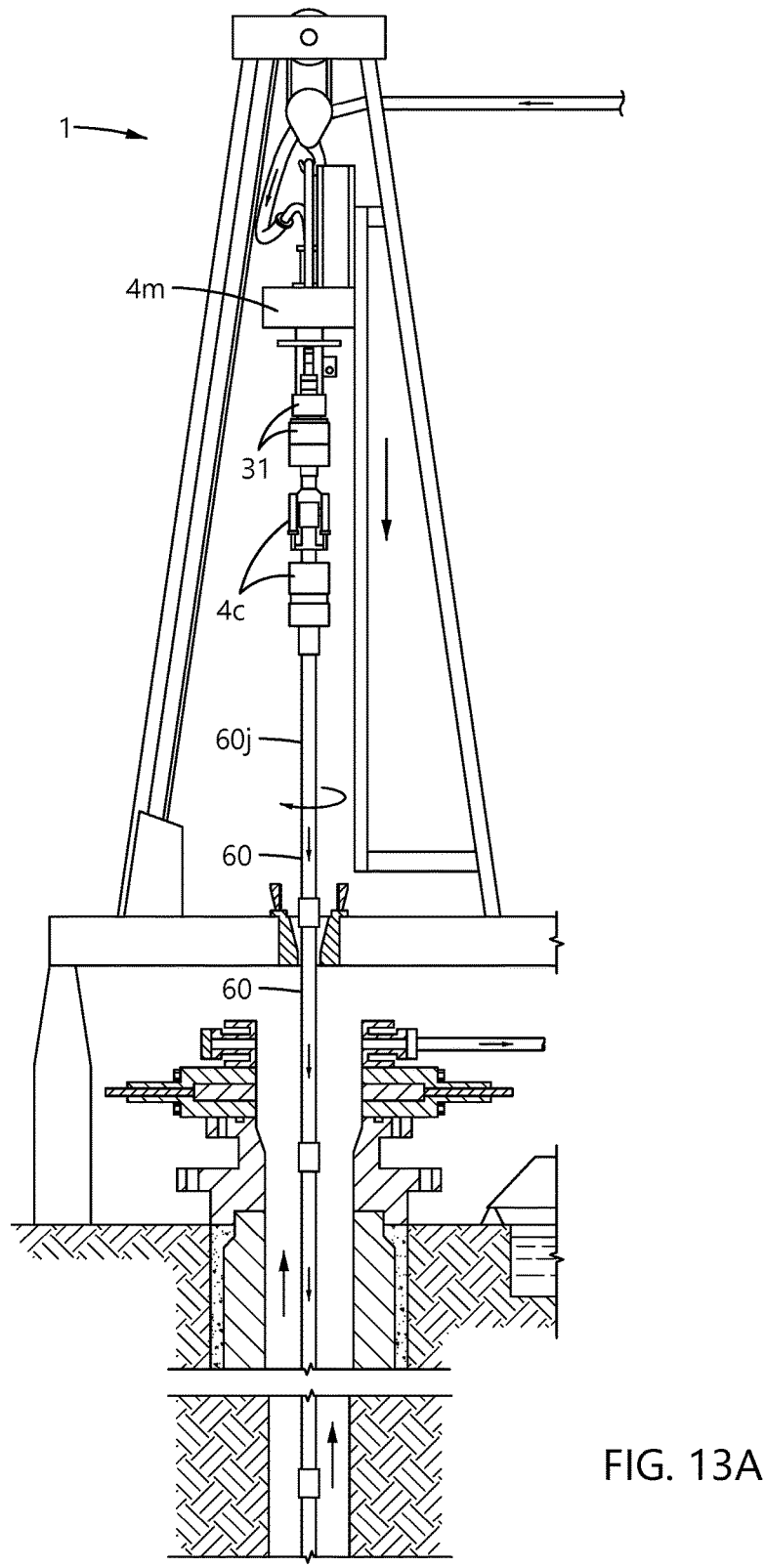
FIG. 13A illustrates the drilling system in a casing mode.

FIG. 12 illustrates the unit handler 4u transporting the casing joint 60j to the casing unit 4c. Once the casing unit 4c has been connected to the motor unit 4m, the holder 54h may be disconnected from the arm 54a and stowed on the unit rack. A pipe clamp 54c may then be connected to the arm 54a and the unit handler 4u operated to engage the pipe clamp with the casing joint 60j. The pipe clamp 54c may be manually actuated between an engaged and disengaged position or include an actuator, such as a hydraulic actuator, for actuation between the positions. The casing joint 60j may initially be located below the rig floor 3f and the unit handler 4u may be operated to raise the casing joint to the rig floor. The unit handler 4u may deliver the casing joint 60j to the rig floor 3f and into alignment with the casing unit 4c. The unit handler may hold the casing joint 60j while the spear 57 and fill up tool 59 are stabbed therein until the bumper 57b engages a top thereof or the unit handler may raise the casing joint to do the stabbing. The linear actuator 57a may then be operated to engage the slips 57s with the casing joint 60j and the pipe clamp 54c released therefrom.

FIG. 13A illustrates the drilling system 1 in a casing mode. Injection of the drilling fluid 13d into the casing joint 60j and rotation thereof by the drive motors 18 may allow the casing joint to be reamed into the wellbore 9. Once a top of the casing joint 60j reaches the rig floor 3f, another casing joint must be added to continue deployment. Deployment may be halted by stopping rotation of the motor unit 4m, stopping injection of the drilling fluid 13d, and stopping lowering of the traveling block 5t. The spider 52 may then be installed into the rotary table 53, thereby longitudinally supporting the casing joint 60j from the rig floor 3f. The slips 57s may be released and the unit handler 4u again operated to deliver an additional joint of casing to the casing unit 4c. The actuator 55a may then be operated to shift the thread compensator 55 from the hoisting position to a ready position. The top drive 4 may then be lowered to stab the additional casing joint into the casing joint 60j. The rotary table 53 may be locked or a backup tong (not shown) may be engaged with the top of the casing joint 60j and the drive motors 18 may be operated to spin and tighten the threaded connection between the casing joints 60j, thereby forming the casing string 60. The thread compensator 55 may lower the additional casing joint during spinning and tightening to maintain the threaded connection in a neutral condition. The spider 52 may then be released and running of the casing string 60 may continue.

Figure 13B:
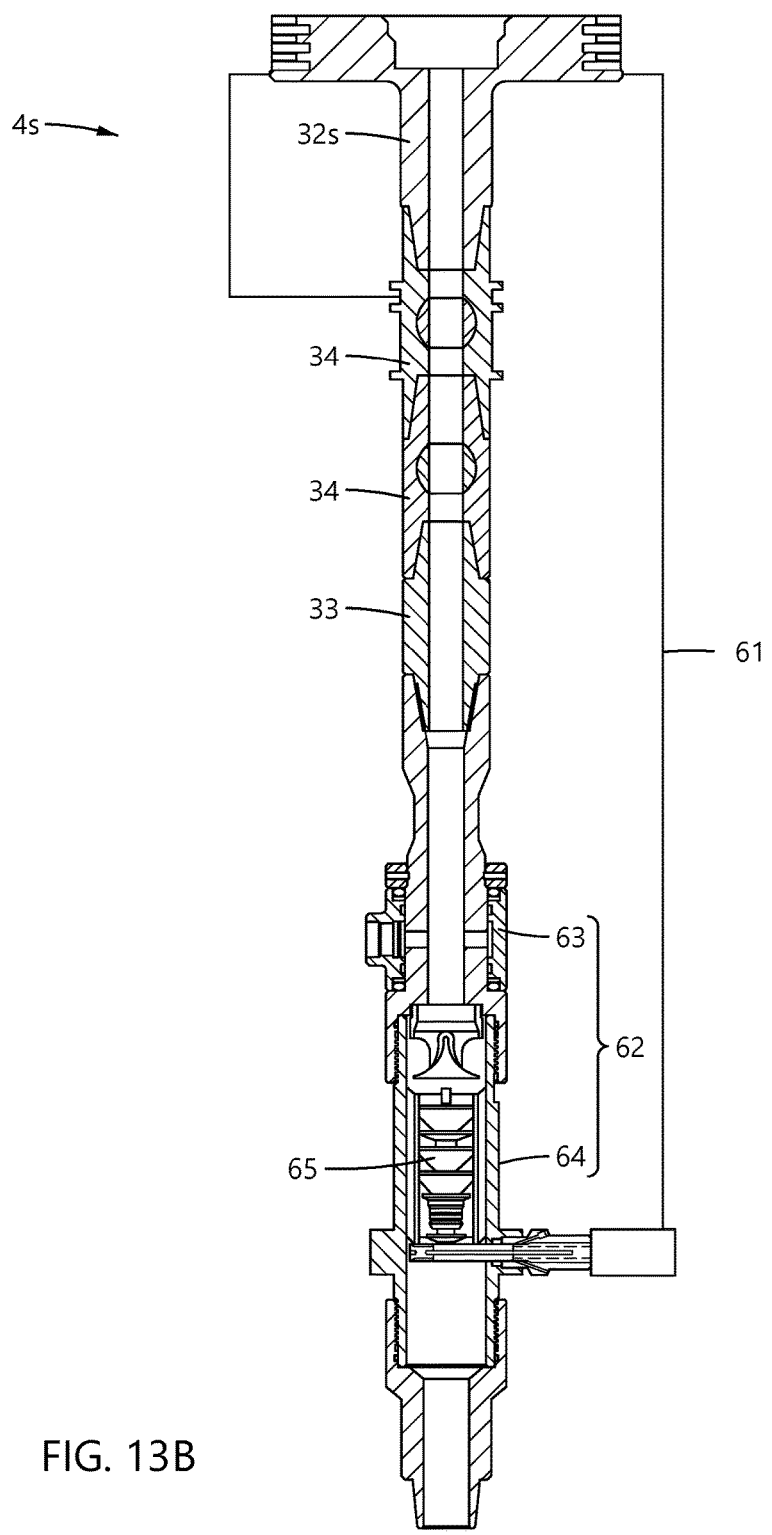
FIG. 13B illustrates a cementing unit of the top drive.

FIG. 13B illustrates the cementing unit 4s. The cementing unit 4s may include the cementing stem 32s, the thread saver 33, the IBOP 34, one or more control lines 61, and a cementing head 62. The cementing head 62 may include a cementing swivel 63, a launcher 64, and a release plug, such as a dart 65.

The cementing swivel 63 may include a housing torsionally connected to the drive body 22 or rail 4r, such as by a bar (not shown). The cementing swivel 63 may further include a mandrel and bearings for supporting the housing from the mandrel while accommodating rotation of the mandrel. An upper end of the mandrel may be connected to a lower end of the thread saver 33, such as by threaded couplings. The cementing swivel 63 may further include an inlet formed through a wall of the housing and in fluid communication with a port formed through the mandrel and a seal assembly for isolating the inlet-port communication. The mandrel port may provide fluid communication between a bore of the cementing head 62 and the housing inlet.

Figure 14:
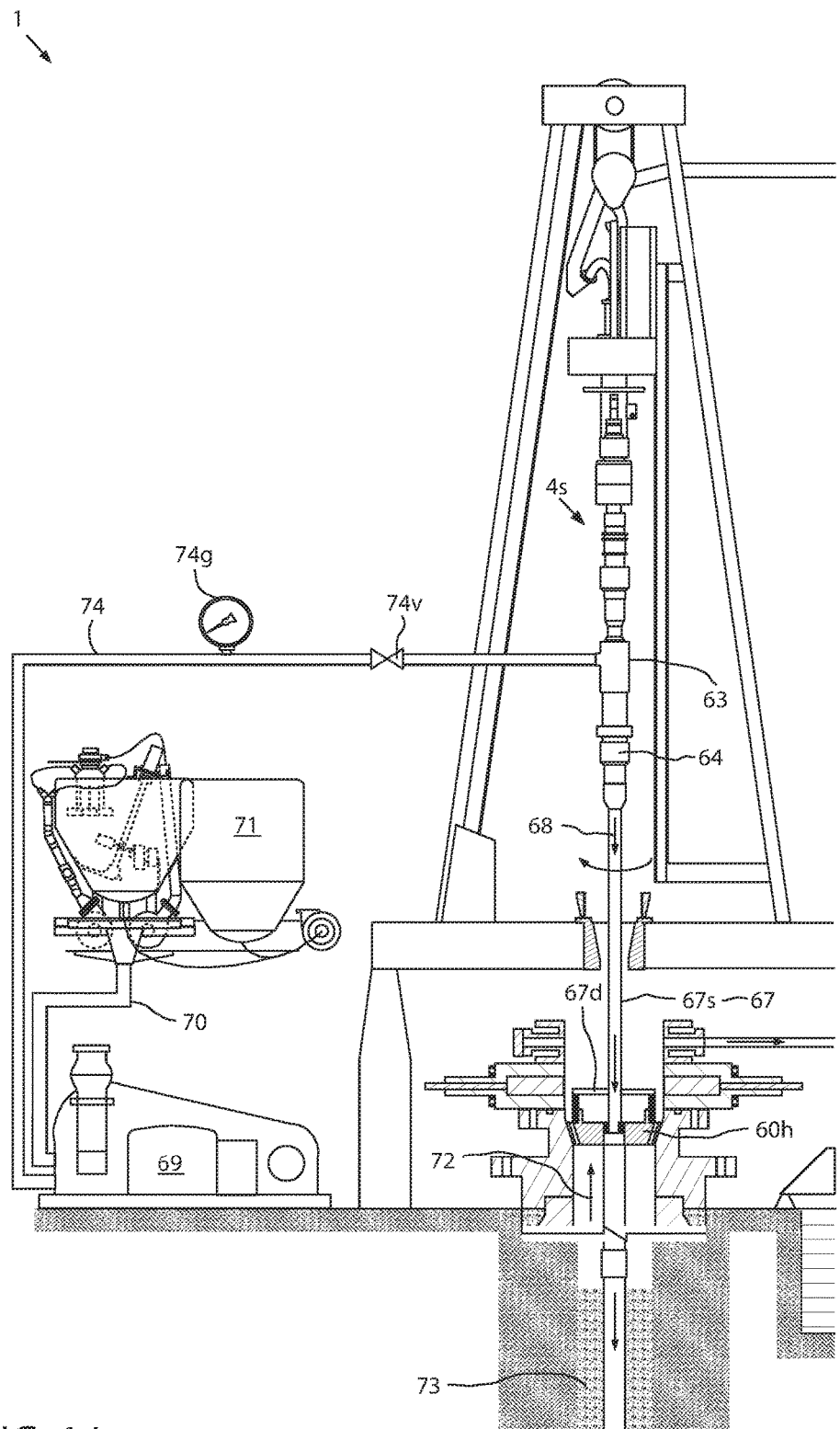
FIG. 14 illustrates the drilling system in a cementing mode.

The launcher 64 may include a body, a deflector, a canister, a gate, the actuator, and an adapter. The body may be tubular and may have a bore therethrough. An upper end of the body may be connected to a lower end of the cementing swivel 63, such as by threaded couplings, and a lower end of the body may be connected to the adapter, such as by threaded couplings. The canister and deflector may each be disposed in the body bore. The deflector may be connected to the cementing swivel mandrel, such as by threaded couplings. The canister may be longitudinally movable relative to the body. The canister may be tubular and have ribs formed along and around an outer surface thereof. Bypass passages (only one shown) may be formed between the ribs. The canister may further have a landing shoulder formed in a lower end thereof for receipt by a landing shoulder of the adapter. The deflector may be operable to divert fluid received from a cement line 74 (FIG. 14) away from a bore of the canister and toward the bypass passages. The adapter may have a threaded coupling, such as a threaded pin, formed at a lower end thereof for connection to a work string 67 (FIG. 14).

The dart 65 may be disposed in the canister bore. The dart 65 may be made from one or more drillable materials and include a finned seal and mandrel. The mandrel may be made from a metal or alloy and may have a landing shoulder and carry a landing seal for engagement with the seat and seal bore of a wiper plug (not shown) of the work string 67.

The gate of the launcher 64 may include a housing, a plunger, and a shaft. The housing may be connected to a respective lug formed in an outer surface of the body, such as by threaded couplings. The plunger may be radially movable relative to the body between a capture position and a release position. The plunger may be moved between the positions by a linkage, such as a jackscrew, with the shaft. The shaft may be connected to and rotatable relative to the housing. The actuator may be a hydraulic motor operable to rotate the shaft relative to the housing. The actuator may include a reservoir (not shown) for receiving the spent hydraulic fluid or the cementing unit 4s may include a second hydraulic conduit (not shown) for returning the spent hydraulic fluid to the HPU 27.

In operation, when it is desired to launch the dart 65, the console 29 may be operated to supply hydraulic fluid to the launcher actuator via the control line 61. The launcher actuator may then move the plunger to the release position. The canister and dart 65 may then move downward relative to the launcher body until the landing shoulders engage. Engagement of the landing shoulders may close the canister bypass passages, thereby forcing chaser fluid 68 (FIG. 14) to flow into the canister bore. The chaser fluid 68 may then propel the dart 65 from the canister bore, down a bore of the adapter, and onward through the work string 67.

Additionally, the cementing unit 4s may include a sensor (not shown), such as a dart detector for confirming successful launching of the dart 65. The sensor may be data communication with the control console 29 via one or more control cables (not shown) connecting the sensors to the cementing stem 32s. Alternatively, the launcher actuator may be electrically or pneumatically operated instead of hydraulically operated and the control line 61 may be a pneumatic control line or control cable instead of a hydraulic control cable.

FIG. 14 illustrates the drilling system 1 in a cementing mode. As a shoe (not shown) of the casing string 60 nears a desired deployment depth of the casing string, such as adjacent a bottom of the lower formation 10b, a casing hanger 60h may be assembled with the casing string 60. Once the casing hanger 60h reaches the rig floor 3f, the spider 52 may be set.

The casing unit 4c may be released from the motor unit 4m and replaced by the cementing unit 4s using the unit handler 4u. The work string 67 may be connected to the casing hanger 60h and the work string extended until the casing hanger 60h seats in the wellhead 7. The work string 67 may include a casing deployment assembly (CDA) 67d and a pipe string 67s, such as such as one or more joints of drill pipe connected together, such as by threaded couplings. An upper end of the CDA 67d may be connected a lower end of the pipe string 67s, such as by threaded couplings. The CDA 67d may be connected to the casing hanger 60h, such as by engagement of a bayonet lug (not shown) with a mating bayonet profile (not shown) formed the casing hanger. The CDA 67d may include a running tool, a plug release system (not shown), and a packoff. The plug release system may include an equalization valve and a wiper plug. The wiper plug may be releasably connected to the equalization valve, such as by a shearable fastener.

Once the cementing unit 4s has been connected to the motor unit 4m, an upper end of the cement line 74 may be connected to an inlet of the cementing swivel 63. A lower end of the cement line 74 may be connected to an outlet of a cement pump 69. A cement shutoff valve 74v and a cement pressure gauge 74g may be assembled as part of the cement line 74. An upper end of a cement feed line 70 may be connected to an outlet of a cement mixer 71 and a lower end of the cement feed line may be connected to an inlet of the cement pump 69.

Once the cement line 74 has been connected to the cementing swivel 63, the IBOP 34 may be closed and the drive motors 18 may be operated to rotate the work string 67 and casing string 60 during the cementing operation. The cement pump 69 may then be operated to inject conditioner 72 from the mixer 71 and down the casing string 60 via the feed line 70, the cement line 74, the cementing head 62, and a bore of the work string 67. Once the conditioner 72 has circulated through the wellbore 9, cement slurry 73 may be pumped from the mixer 71 into the cementing swivel 63 by the cement pump 69. The cement slurry 73 may flow into the launcher 64 and be diverted past the dart 65 (not shown) via the diverter and bypass passages. Once the desired quantity of cement slurry 73 has been pumped, the dart 65 may be released from the launcher 64 by operating the launcher actuator. The chaser fluid 68 may be pumped into the cementing swivel 63 by the cement pump 69. The chaser fluid 68 may flow into the launcher 64 and be forced behind the dart 65 by closing of the bypass passages, thereby launching the dart.

Pumping of the chaser fluid 68 by the cement pump 69 may continue until residual cement in the cement line 74 has been purged. Pumping of the chaser fluid 68 may then be transferred to the mud pump 12 by closing the valve 74v and opening the IBOP 34. The dart 65 and cement slurry 73 may be driven through the work string bore by the chaser fluid 68. The dart 65 may land onto the wiper plug and continued pumping of the chaser fluid 68 may increase pressure in the work string bore against the seated dart 65 until a release pressure is achieved, thereby fracturing the shearable fastener. Continued pumping of the chaser fluid 68 may drive the dart 65, wiper plug, and cement slurry 73 through the casing bore. The cement slurry 73 may flow through a float collar (not shown) and the shoe of the casing string 60, and upward into the annulus.

Pumping of the chaser fluid 68 may continue to drive the cement slurry 73 into the annulus until the wiper plug bumps the float collar. Pumping of the chaser fluid 68 may then be halted and rotation of the casing string 60 may also be halted. The float collar may close in response to halting of the pumping. The work string 67 may then be lowered to set a packer of the casing hanger 60h. The bayonet connection may be released and the work string 67 may be retrieved to the rig 1r.

Alternatively, for a liner operation (not shown) or a subsea casing operation, the drilling unit 4d may be used again after the casing or liner string is assembled for assembling a work string (not shown) used to deploy the assembled casing or liner string into the wellbore 9. The top drive 4 may be shifted back to the drilling mode for assembly of the work string. The work string may include a casing or liner deployment assembly and a string of drill pipe such that the drilling unit 4d may be employed to assemble the pipe string. The motor unit 4m may be operated for reaming the casing or liner string into the wellbore 9.

Figure 16A:
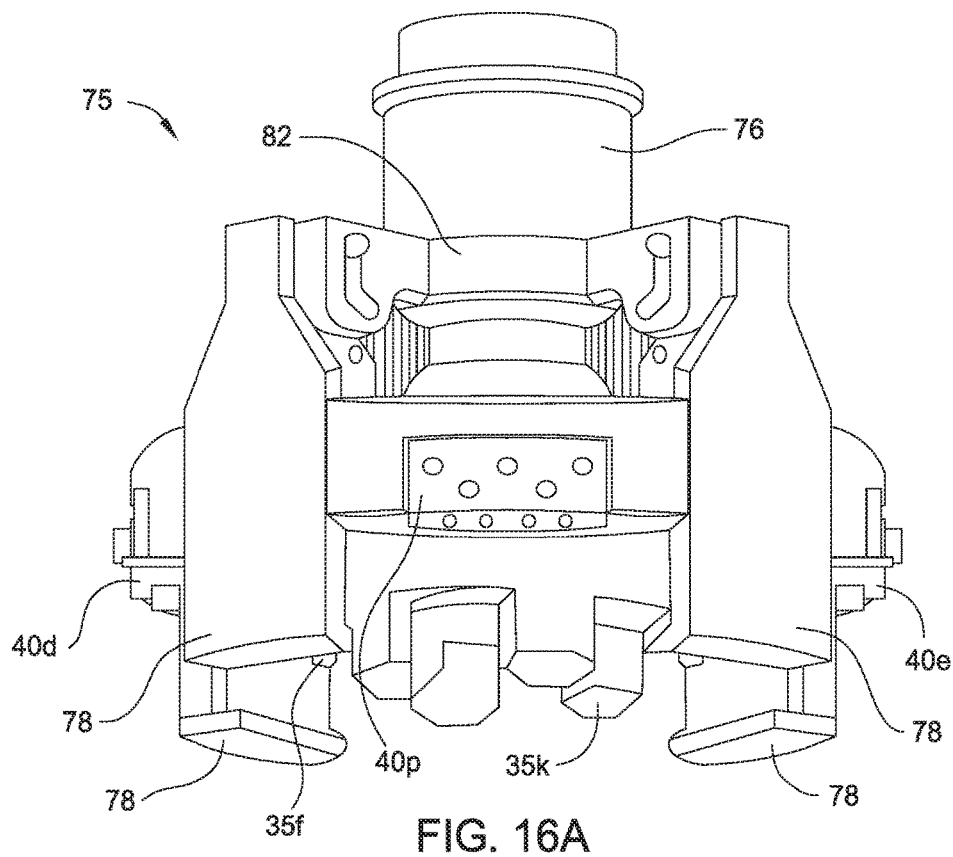
FIG. 16A illustrates the alternative latch head in the docked mode.
Figure 16B:
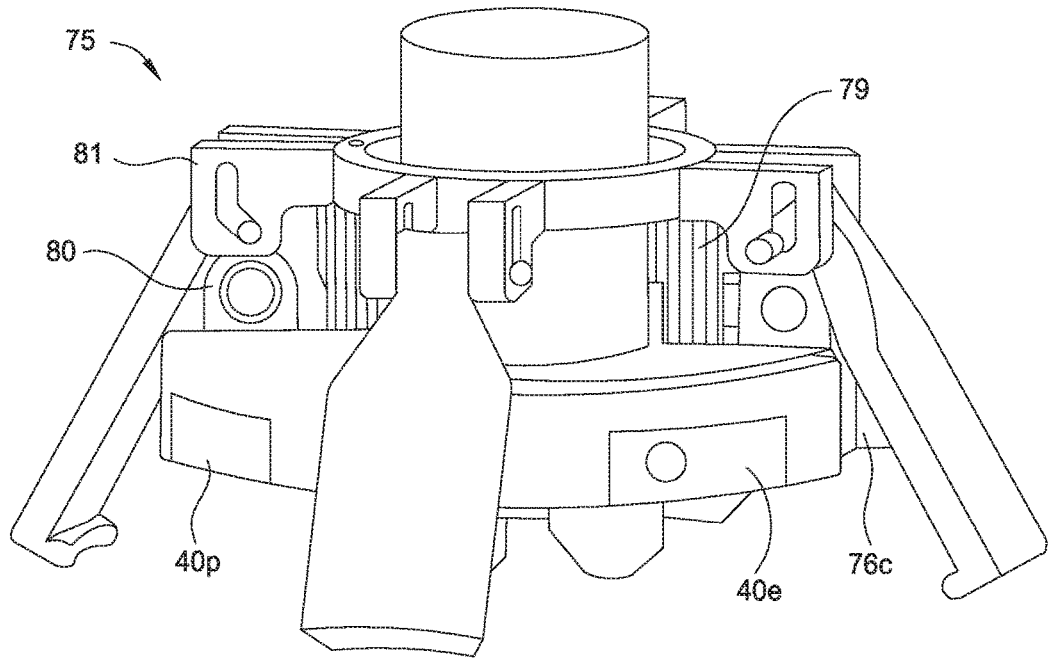
FIG. 16B illustrates the alternative latch head in the release mode.

FIG. 15 illustrates an alternative latch head 75, according to another embodiment of the present disclosure. FIG. 16A illustrates the alternative latch head 75 in the docked mode. FIG. 16B illustrates the alternative latch head 75 in the release mode. An alternative CMC may include the alternative latch head 75 and an alternative stem (not shown) for the respective drilling 4d, casing 4c, and cementing 4s units. The alternative CMC may be used with the top drive 4 instead of the CMC 4y. The alternative latch head 75 may include a torque shaft 76, a control swivel (not shown), a seal sleeve (not shown), a grapple 77, the (one or more) junction members 40d,e,h,p, and the torque sub (not shown). The grapple 77 may include a plurality of clamps 78, one or more actuators 79, a hinge 80 for each clamp, a cam mechanism 81 for each clamp, and a leveling ring 82.

The torque shaft 76 may have a bore formed therethrough and may have a tubular portion and a flange portion extending outward from the tubular portion. The tubular portion of the torque shaft 76 may be similar to the tubular portion of the torque shaft 35. The flange portion of the torque shaft 76 may have the receptacles 35j formed in a lower face and outer surface thereof for receiving the respective junction members 40d,e,h,p, may have one or more compartments 76m formed in an upper face thereof for receiving the respective actuator 79, may have cavities 76c formed in an outer surface thereof for receiving the clamps 78, and may have the alignment feature, such as the pins 35f, extending from the lower face thereof. The alternative latch head 75 may further include a latch sensor (not shown) for each clamp 78 similar to the latch sensor 49 and the torque shaft 76 may further have a cutout formed in the lower face thereof adjacent to each cavity 76c for housing the respective latch sensor.

Each alternative stem may have a bore formed therethrough and may have a tubular portion and a flange portion extending outward from the tubular portion. The tubular portion of each alternative stem may have a polished receptacle formed in an inner surface thereof and adjacent to a top thereof, may have the torsional coupling, such as the keyways, formed in the top thereof, and may have the coupling, such as the threaded box or pin, formed at a bottom thereof. The flange portion of each alternative stem may have receptacles formed in an upper face thereof for receiving the respective junction members 48d,e,h,p, may have clamp profiles formed in an outer surface thereof for receiving the clamps 78, and may have the alignment feature, such as the pinholes, extending from the upper face thereof. A lower portion of each clamp 78 may have a tongue formed on an inner surface thereof for being received by a groove of each clamp profile, thereby longitudinally connecting the torque shaft 76 and the respective alternative stem.

Each hinge 80 may pivotally connect the respective clamp 78 to the torque shaft 76. Each hinge 80 may include a pair of knuckles mounted to the upper face of the flange portion of the torque shaft 76. An upper portion of each clamp 78 may have a knuckle formed in an inner surface thereof. The hinge knuckles may be spaced apart for receiving and straddling the respective clamp knuckle. Each knuckle may have a hole formed therethrough and a hinge pin may be inserted through the respective holes to assemble the respective hinge 80. The leveling ring 82 may surround the tubular portion of the torque shaft 76 and may be longitudinally movable relative thereto between an upper position (FIG. 16B) and a lower position (FIGS. 15 and 16A) by operation of the actuators 79.

Each actuator 79 may be linear, such as a piston and cylinder assembly, for moving the leveling ring 82 between the upper and lower positions. Each piston and cylinder assembly may have a coupling, such as a hinge knuckle, formed at each longitudinal end thereof. An upper hinge knuckle of each piston and cylinder assembly may be received by respective knuckles of the leveling ring 82 and pivotally connected thereto, such as by fastening. A lower hinge knuckle of each piston and cylinder assembly may be received by knuckles mounted in the respective compartment 76m and pivotally connected to the torque shaft 76, such as by fastening. A piston of each piston and cylinder assembly may be disposed in a bore of the respective cylinder. The piston may divide the cylinder bore into a raising chamber and a lowering chamber and the cylinder may have ports formed through a wall thereof and each port may be in fluid communication with a respective chamber Each port may also be in fluid communication with the manifold 27m via a respective control line (not shown) and the control swivel. Supply of hydraulic fluid to the raising port may lift the leveling ring 82 to the upper position. Supply of hydraulic fluid to the lowering port may drop the leveling ring 82 to the lower position.

Each cam mechanism 81 may pivot the clamps 78 into engagement (FIG. 16A) with and out to disengagement (FIG. 16B) from the clamp profiles of the stems in response to movement of the leveling ring 82 between the upper and lower positions, thereby longitudinally connecting and disconnecting the stems to/from the torque shaft 76. Each cam mechanism 81 may include a pair of lugs mounted to the leveling ring 82. The upper portion of each clamp 78 may also serve as a lug. The cam lugs may be spaced apart for receiving and straddling the respective clamp lug. The cam lugs may each have a J-slot formed therethrough, the clamp lug may have a hole formed therethrough, and a follower pin may be inserted through the respective hole and J-slots to assemble the respective cam mechanism 81.

Alternatively, a tubular adapter (not shown) may be used to connect either torque shaft 35, 76 to the quill 23q. The quill 23q may then be a threaded pin instead of a threaded box and the adapter may include a threaded coupling at each longitudinal end thereof for accommodating the connection between the quill and either torque shaft 35, 76.

Alternatively, the CMC 4y or alternative CMC including the alternative latch head 75 of FIG. 15 may be used with any other top drive tool, such as a completion tool, a wireline tool, a fracturing tool, a pump, or a sand screen.

FIGS. 17-21 illustrate alternative embodiments of CMCs according to the present disclosure. The CMCs described below may be used in place of the CMC 4y.

FIGS. 17A-17D illustrates a CMC 1700 according to another embodiment of the present disclosure. The CMC 1700 includes a tool dock 1710 and a drive stem 1720. The tool dock 1710 and the drive stem 1720 may be joined together using a set of locking clamps 1730.

The tool dock 1710 may be attached to or integrated on a tool, such as drilling tool, a completion tool, a wireline tool, a fracturing tool, a pump, or a sand screen. The tool dock 1710 may include a stem 1711 having a central bore 1712. A shoulder 1717 may be formed at an upper end of the stem 1711. The shoulder 1717 may be used to engage the plurality of locking clamps 1730. In one embodiment, the tool dock 1710 may also include torque tabs 1716 formed above the shoulder 1717 for transferring torsional loads. An upper end of the tool dock 1710 may include a seal profile 1715 shaped to make a fluid connection with the drive stem 1720.

A flange 1713 may extend from the stem 1711. One or more junction members 1714 may be disposed on the flange 1713 to be connected with matching couplers from a top drive. Similar to one of the junction members 48d,e,h,p, each of the junction members 1714 may be configured to establish data, electrical, hydraulic, pneumatic communication, or any other signals.

The drive stem 1720 may include a mandrel 1721 having a central bore 1722. A seal profile 1723 may be formed at a lower end of the mandrel 1721. The seal profile 1723 matches the seal profile 1715 of the tool dock 1710 to seal the connection between the drive stem 1720 and tool dock 1710 preventing high pressure fluids from leaking out of the connection.

Torque tabs 1724 may be formed on the mandrel 1721. The torque tabs 1724 match the torque tab 1716 on the tool dock 1710 to transfer torsional loads. FIG. 17B is a perspective view of the drive stem 1720. An exemplary design of the torque tabs 1724 is shown in FIG. 17B. Alternatively, other torque transfer profile, such as a spline type profile, a gear type profile, may be used in place of the torque tabs 1724.

In one embodiment, the drive stem 1720 may include an internal blow out preventer 1725. The internal blow out preventer 1725 may be remotely actuated blow out preventer. A hydraulic swivel 1726 may be attached to the mandrel 1721.

A groove 1727 may be formed around the mandrel 1721 to receive the plurality of locking clamps 1730. As shown in FIG. 17B, the plurality of locking clamps 1730 may be radially distributed around the mandrel 1721. FIG. 17C is an enlarged partial view of the drive stem 1720 showing details of the locking clamps 1730. Each locking clamp 1730 may have a "C" shape profile. An upper end 1731 of each locking clamp 1730 is disposed in the groove 1727. The profile of the upper end 1731 and the groove 1727 are shaped to allow the locking clamps 1730 to pivot in the groove 1727 relative to the mandrel 1721.

An external sleeve 1733 may be disposed around the plurality of locking clamps 1730 to pivot in the groove 1727 therefore open and close. The external sleeve 1733 may move vertically by an actuator 1736. The actuator 1736 may be a hydraulic actuator, or an actuator powered by other forms of power. The locking clamps 1730 open/close when a contact surface 1734 near the upper end 1731 of each locking clamp 1730 interacts with an inner groove 1735 of the external sleeve 1736.

To open the locking clamps 1730, the internal groove 1735 in the external sleeve 1733 pushes the external profile of the locking clamps 1730 creating an angular movement tilting the locking clamps 1730 outwards, as shown in FIG. 17A. An internal profile in the upper end 1731 of each locking clamp 1730 mates with an angled profile of the groove 1727 facilitating the angular movement of the locking clamp 1730. The locking clamps 1730 pivot up to certain degree to allow access for the tool dock 1710 to make a connection.

To close the locking clamps 1730, the external sleeve 1733 lowers and the lower section of the external sleeve 1733 pushes the locking clamps 1730 inward. Multiple section of contact surface are created between the external sleeve 1733 and the locking clamps 1730 eliminating any possible clearance or play between the drive stem 1720 and the tool dock 1710. The locking clamps 1730 and the external sleeve 1733 function as a locking mechanism to secure the connection between the drive stem 1720 and the tool dock 1710. To disconnect the drive stem 1720 and the tool dock 1710, raise the external sleeve 1733 to open the plurality of locking clamps 1730.

FIG. 17D is a schematic sectional view of the CMC 1700 in a connected position. The upper end 1731 of each locking clamp 1730 has a load shoulder 1742. When the CMC 1700 is in the connected position, the load shoulder 1742 on the locking clamp 1730 clamps on a load shoulder 1737 in the groove 1727 of the drive stem 1720. The lower end 1732 of each locking clamp 1730 has a load shoulder 1740. When the CMC 1700 is in the connected position, the load shoulder 1740 of the locking clamp 1730 clamps on the shoulder 1717 of the tool dock 1710. The "C" shaped profile of the locking clamps 1730 transfer the axial load between the drive stem 1720 to the tool dock 1710 through the connections between the load shoulder 1742 and 1737 and the load shoulders 1740 and 1717. In one embodiment, one or both load shoulder pairs 1742, 1737 and 1740, 1717 may be tapered to eliminate the clearance needed for the connection. Tapered load shoulders also provides preload to the connection. In one embodiment, the contact surface 1734 of the locking clamp 1730 and the inner groove 1735 on the external sleeve 1733 may be tapered too. The tapered contact surfaces between the locking clamps 1730 and the external sleeve 1733 allows the external sleeve 1733 to push the locking clamps radially against the load shoulders 1742, 1737, therefore, preventing the force from the external sleeve 1733 to preload the connection.

In one embodiment, one or more junction members 1738 may be disposed on a flange 1739 of the external sleeve 1733. When the external sleeve 1733 is lowered to make the connection, the junction members 1733 couple with a corresponding one of the junction members 1714 on the tool dock 1710 to facilitate connections of data, electrical, hydraulic, pneumatic communication, or any other signals. Alternatively, the junction members may be incorporated in the mandrel 1721 of the drive stem 1720 and the stem 1711 of the tool dock 1710. Flow channels may be drilled through to the mandrel 1721 and the stem 1711 to allow fluid transfer and data transmission. In one embodiment, one or both of the junction members 1714, 1738 may be spring loaded to provide compensation to the variation of end positions of the external sleeve 1733. Alternatively, the flange 1739 or the flange 1713 may be movable relative to the external sleeve 1733 or the stem 1711 to compensate the variable end position.

Figure 18C:
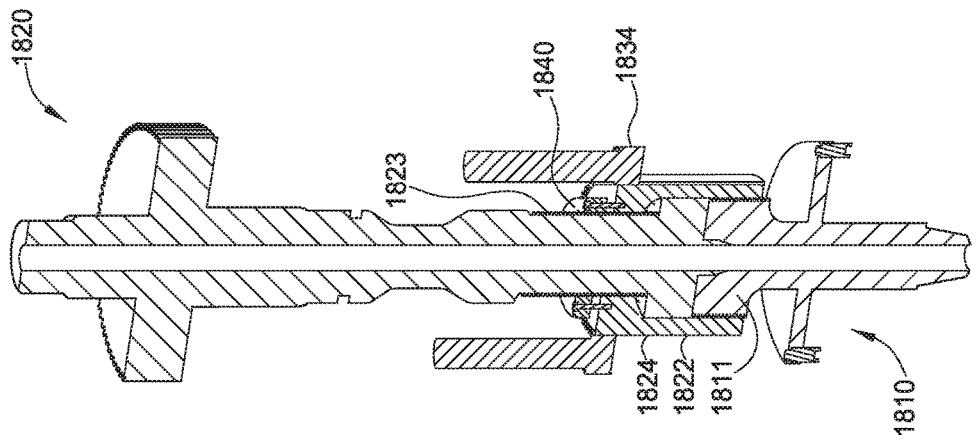
FIGS. 18A-18C schematically illustrate a combined multi-coupler according to another embodiment of the present disclosure.
Figure 18B:
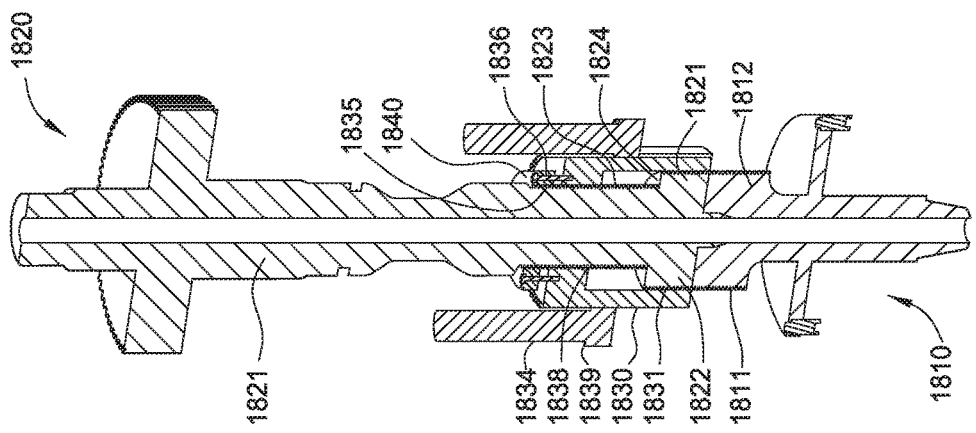
Figure 18A:
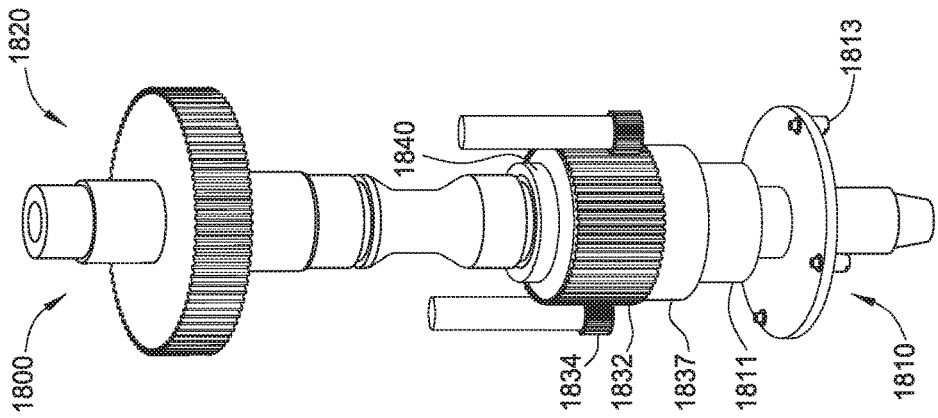

FIGS. 18A-18C illustrates a CMC 1800 according to another embodiment of the present disclosure. The CMC 1800 includes a tool dock 1810 and a drive stem 1820. FIG. 18A is a schematic perspective view of the CMC 1800 at an open position. FIG. 18B is a schematic sectional view of the CMC 1800 at the open position. FIG. 18C is a schematic sectional view of the CMC 1800 at a connected position.

The tool dock 1810 is similar to the tool dock 1710 except that the tool dock 1810 has external thread 1811 formed on an upper portion 1812. The external thread 1811 is configured to engage the drive stem 1820 and support axial loads.

The drive stem 1820 includes a mandrel 1821. The mandrel 1821 may include a load shoulder 1822 near a lower end. The load shoulder 1822 has an upper surface 1824. The mandrel 1821 has external threads 1823 formed above the load shoulder 1822.

The drive stem 1820 and the tool dock 1810 may be connected by a load nut 1830 and a guide ring 1840. The load nut 1830 may have a cylindrical outer surface 1837. Gears 1832 may be formed on the outer surface 1837. One or more drive gears 1834 may mate with gears 1832 so that the rotation of the drive gears 1834 rotates the load nut 1830.

The load nut 1830 may include an inner shoulder 1838. Internal threads 1831 may be formed on an inner surface 1839 below the inner shoulder 1838. The internal threads 1831 are configured to couple with the external threads 1811 on the tool dock 1810. The coupling between the internal threads 1831 and the external threads 1811 transfers axial loads between the load nut 1830 and the tool dock 1810.

The guide ring 1840 includes internal threads 1835 sized to couple with the external thread 1823 on the mandrel 1821. The guide ring 1840 is attached to the load nut 1830 by one or more pins 1836. The one or more pins 1836 prevent the guide ring 1840 and the load nut 1830 from rotating relative to each other, but allow some vertical movement between the load nut 1830 and the guide ring 1840. In one embodiment, the one or more pins 1836 may be screws with extended lengths. In another embodiment, the one or more pins 1836 may be spring loaded to allow the load nut 1830 to move down relative to the guide ring 1840.

The internal threads 1835 of the guide ring 1840 engage the external threads 1823 enabling the guide ring 1840 and the load nut 1830 to move vertically up or down the mandrel 1821.

Similar to the drive stem 1720 and the tool dock 1710, the drive stem 1820 and the tool dock 1820 may also matching torque transfer profiles to transfer torsional loads therebetween. The torque transfer profile can be a spline type, gear type, tab type. Seal profiles may be formed on the drive stem 1820 and the tool dock 1810 to seal the connection between the drive stem 1820 and tool dock 1810 preventing high pressure fluids from leaking out of the connection.

Junction members 1813, similar to the junction members 1733 and 1714 may also be disposed on the drive stem 1820 and the tool dock 1810 to facilitate connections of data, electrical, hydraulic, pneumatic communication, or any other signals. Alternatively, the junction members may be incorporated in the drive stem 1820 and the tool dock 1810 through flow channels drilled therethrough.

To connect with the tool dock 1810, the drive gears 1834 rotate to turn the load nut 1830, and the load nut 1830 turns the guide ring 1840 so that the load nut 1830 and the guide ring 1840 move downward relative to the mandrel 1821. The downward movement of the load nut 1830 allows the tool dock 1810 to engage the load nut 1830 through the internal threads 1831. The relative distance between the guide ring 1840 and the load nut 1830 guarantees the correct thread engagement between the load nut 1830 and the tool dock thread 1840. The load nut 1830 may move downward until the shoulder 1838 engages the upper surface 1824 of the load shoulder 1822 to transfer axial loads between the mandrel 1821 and the load nut 1830. The load nut 1830 transfers the axial loads to the tool dock 1810 through the connections between the internal threads 1831 and the external threads 1811.

To disconnect, the drive gears 1834 simply rotates along the opposition direction to disengage the internal threads 1831 and the external threads 1811.

Figure 19A:
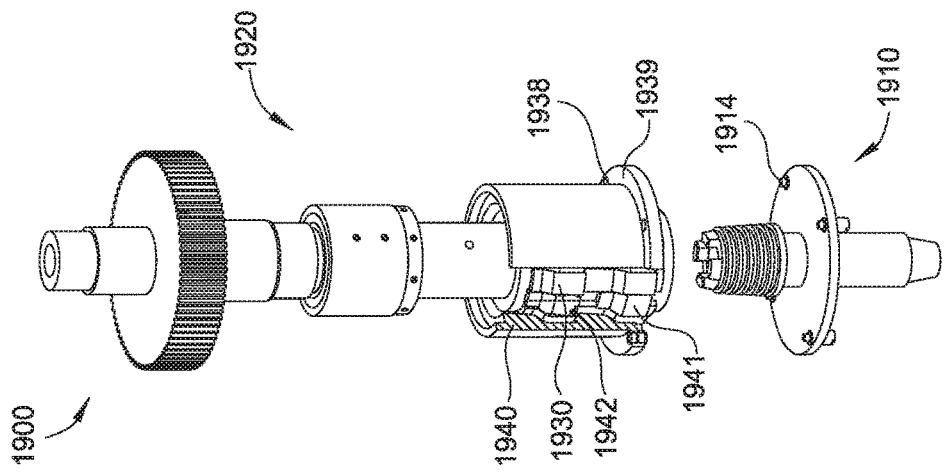
FIGS. 19A-19P schematically illustrate a combined multi-coupler according to another embodiment of the present disclosure.
Figure 19C:
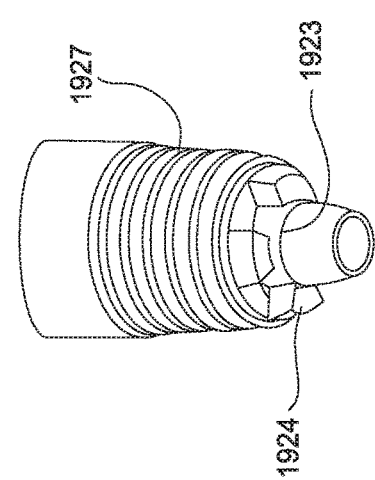
Figure 19D:
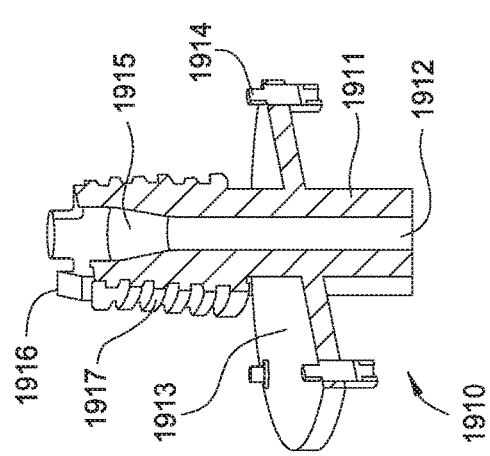
Figure 19B:
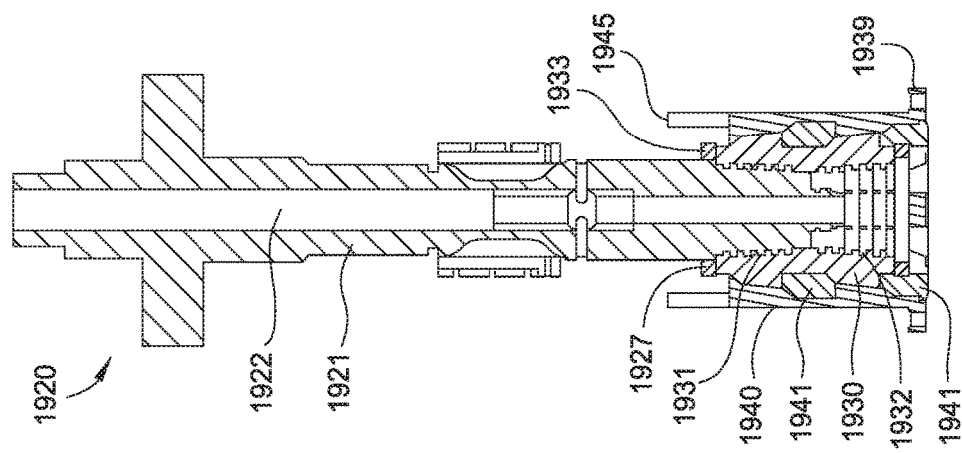
Figure 19J:
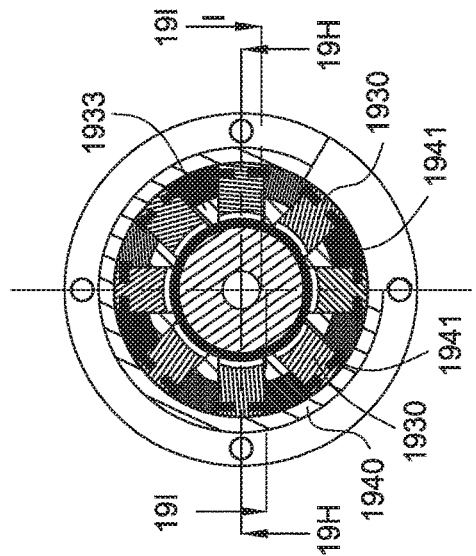
Figure 19I:
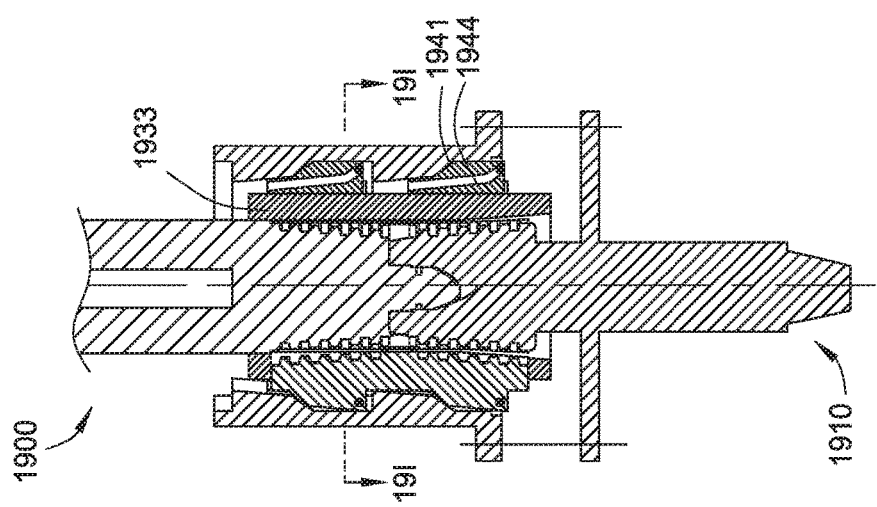
Figure 19H:
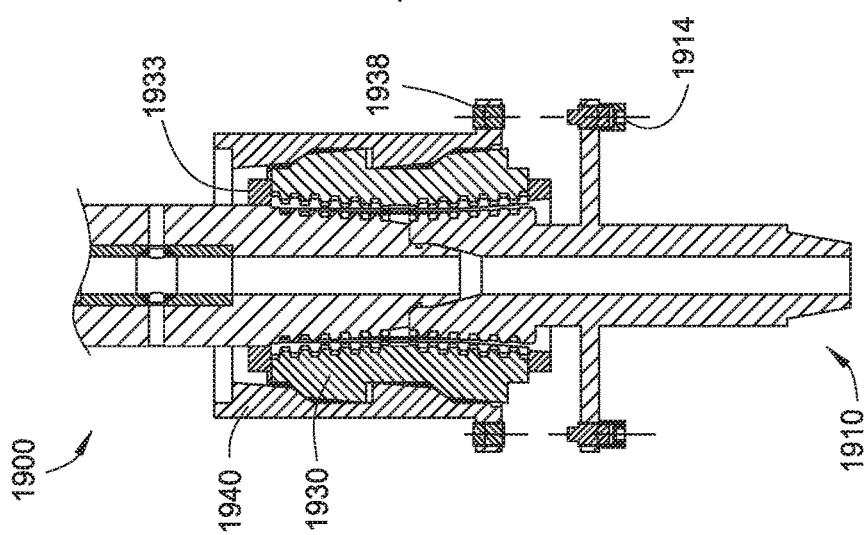
Figure 19M:
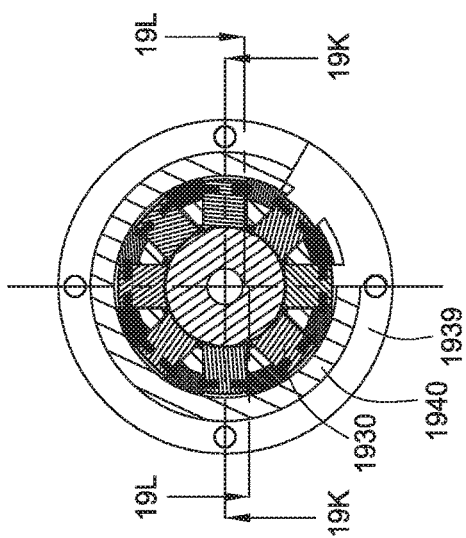
Figure 19L:
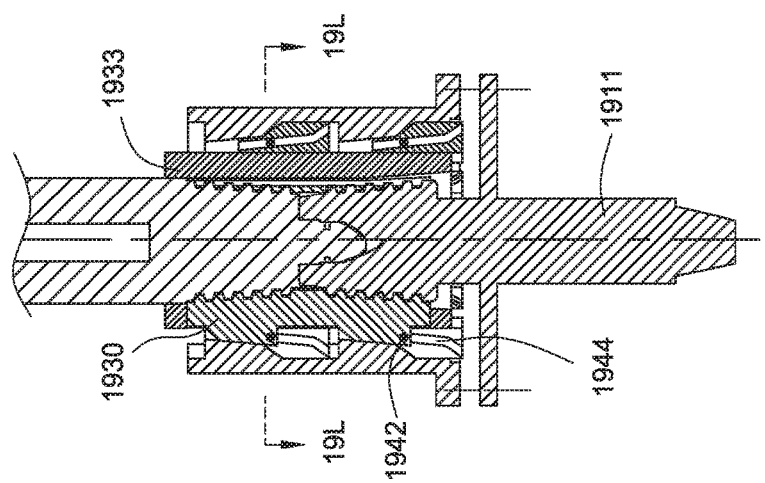
Figure 19K:
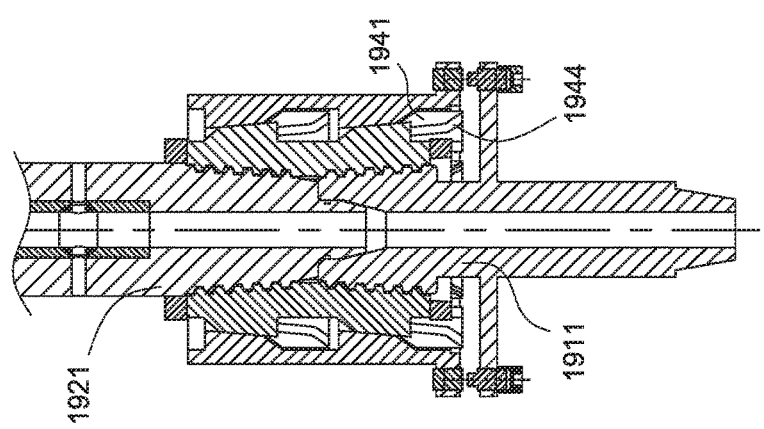
Figure 19P:
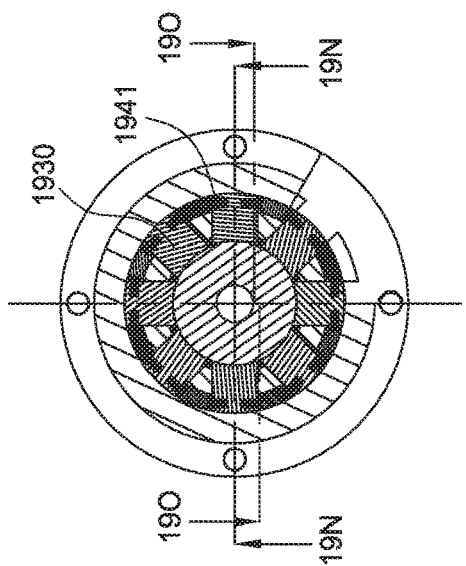
Figure 19O:
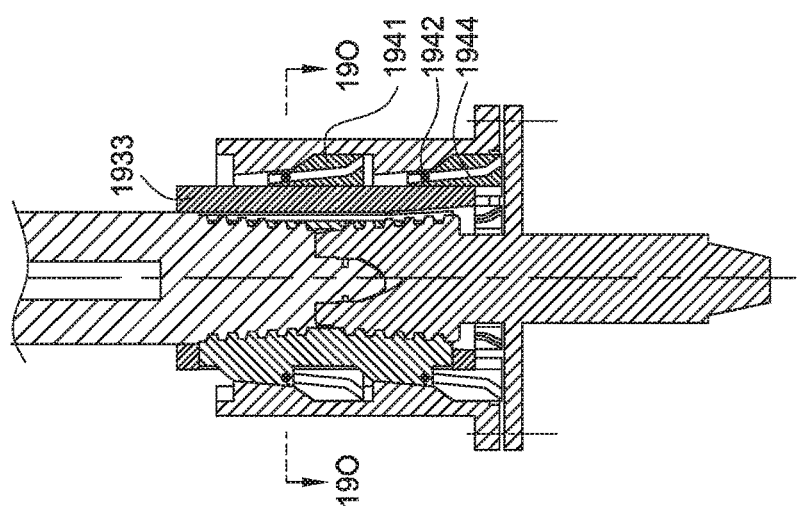

FIGS. 19A-19O illustrates a CMC 1900 according to another embodiment of the present disclosure. The CMC 1900 includes a tool dock 1910 and a drive stem 1920 connectable by a set of locking wedges. FIG. 19A is a schematic perspective view of the CMC 1900. FIG. 19B is a schematic sectional view of the drive stem 1920. FIG. 19C is a schematic perspective view of the drive stem 1920 showing the load profiles. FIG. 19D is a schematic sectional view of the tool dock 1910.

The tool dock 1910 may be attached to or integrated on a tool, such as drilling tool, a completion tool, a wireline tool, a fracturing tool, a pump, or a sand screen. The tool dock 1910 may include a stem 1911 having a central bore 1912. An axial load profile 1917 may be formed on an outer surface of the stem 1911. The axial load profile 1917 may include multiple grooves. In one embodiment, the axial load profile 1917 includes multiple grooves formed on a tapered surface. In one embodiment, the tool dock 1910 may also include torque tabs 1916 for transferring torsional loads. An upper end of the tool dock 1910 may include a seal profile 1915 shaped to make a fluid connection with the drive stem 1920.

A flange 1913 may extend from the stem 1911. One or more junction members 1914 may be disposed on the flange 1913 to be connected with matching junction members on the drive stem 1920 to establish data, electrical, hydraulic, pneumatic communication, or any other signals.

The drive stem 1920 may include a mandrel 1921 having a central bore 1922. A seal profile 1923 may be formed at a lower end of the mandrel 1921. The seal profile 1723 matches the seal profile 1915 of the tool dock 1910 to seal the connection between the drive stem 1920 and tool dock 1910 preventing high pressure fluids from leaking out of the connection.

Torque tabs 1924 may be formed on the mandrel 1921. The torque tabs 1924 match the torque tab 1916 on the tool dock 1910 to transfer torsional loads. Alternatively, other torque transfer profile, such as a spline type profile, a gear type profile, may be used in place of the torque tabs 1924.

An axial load profile 1927 may be formed around an outer surface of the mandrel 1921. The axial load profile 1927 may include multiple grooves. In one embodiment, the axial load profile 1927 includes multiple grooves formed on a tapered surface.

The drive stem 1920 further includes a plurality of locking wedges 1930. Each locking wedge 1930 may be a section of a ring. The plurality of locking wedges 1930 may be radially distributed around the mandrel 1921. In one embodiment, the plurality of locking wedges 1930 may be held in place by an internal carrier 1933 to form a circle. The internal carrier 1933 may be a tubular having a plurality of cutouts to receive the locking wedges 1930. The internal carrier 1933 may be fixedly attached to the mandrel 1921. The locking wedges 1930 can move radially inward and outward relative to the internal carrier 1933.

Each of the locking wedge 1930 may include an upper load profile 1931 and a lower load profile 1932 formed in an inner surface. The upper load profile 1931 may include multiple grooves that match the axial load profile 1927 on the mandrel 1921. The lower load profile may include multiple grooves that match the axial load profile 1917 of the tool dock 1910. Each locking wedge 1930 may be coupled to the mandrel 1921 and the tool dock 1910 through the upper and lower load profiles 1931, 1932 to transfer axial load between the tool dock 1910 and the mandrel 1921. The plurality of locking wedges 1930 may be moved radially inward to engage the mandrel 1921 and the tool dock 1910 and radially outward to disengage the mandrel 1921 and the tool dock 1910.

The drive stem 1920 further includes a sleeve 1940 disposed radially outside the plurality of locking wedges 1930. A plurality of cam blocks 1941 may be disposed inside the sleeve 1940. FIG. 19G is a sectional top view of the drive stem 1920. As shown in FIG. 19G, the plurality of locking wedges 1930 may be wedged between neighboring cam blocks 1941. Each cam block 1941 may have guiding slots 1944 formed on side surfaces. Each cam block 1941 may be connected to the neighboring locking wedge 1930 by a pin 1942. One end of each pin 1942 may be disposed in the guiding slot 1944 of a cam block 1941. The guiding slots 1944 are shaped to transfer the vertical movement of the sleeve 1940 to radial movement of the locking wedges 1930. The plurality of wedges 1930 may be moved radially inward or outward by moving the sleeve 1940 downward or upward.

The sleeve 1940 may be connected to an actuator 1945. The actuator 1945 may be configured to move the sleeve 1940 vertically along the mandrel 1920. The actuator 1945 may be a hydraulic actuator, or an actuator powered by other forms of power.

In one embodiment, one or more junction members 1938 may be disposed on a flange 1939 of the sleeve 1940. When the sleeve 1940 is lowered to make the connection, the junction members 1938 couple with a corresponding one of the junction members 1914 on the tool dock 1910 to facilitate connections of data, electrical, hydraulic, pneumatic communication, or any other signals. In one embodiment, one or both of the junction members 1914, 1938 may be spring loaded to provide compensation to the variation of end positions of the sleeve 1940 due to the tapered shape and the wear of the contact surface. Alternatively, the flange 1939 or the flange 1913 may be movable relative to the mandrel 1921 or the stem 1911 to compensate the variable end position. Alternatively, the junction members may be incorporated in the mandrel 1921 of the drive stem 1920 and the stem 1911 of the tool dock 1910. Flow channels may be drilled through to the mandrel 1921 and the stem 1911 to allow fluid transfer and data transmission.

Figure 19N:
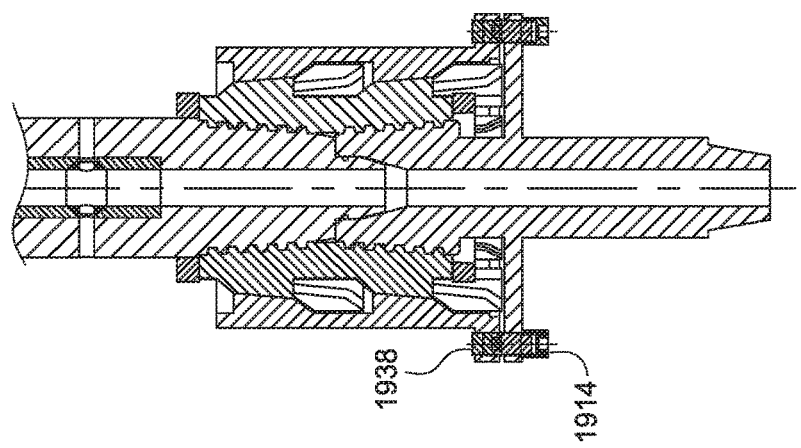

FIGS. 19E, 19F, and 19G schematically illustrate the CMC 1900 at an open position. The sleeve 1940 is moved up so that the plurality of locking wedges 1930 can open to allow the tool dock 1910 to be inserted into the drive stem 1920. In FIGS. 19H, 19I, and 19J, the tool dock 1910 is inserted into the drive stem 1920 and a seal connection is formed between the seal profiles 1923 and 1915. The torque tabs 1924 and 1916 also matches. The plurality of locking wedges 1930 remain open. In FIGS. 19K, 19L, and 19M, the sleeve 1940 is moved downward urging the plurality of locking wedges 1930 radially inward towards the mandrel 1921 and the stem 1911. In FIGS. 19N, 19P, and 19Q, the sleeve 1940 is moved to the connecting position, the upper and lower load profiles 1931, 1932 of the plurality of locking wedges 1930 are coupled with the axial load profiles 1927 and 1917 on the mandrel 1921 and the stem 1911 respectively. The junction members 1914 and 1938 also connected. The drive stem 1920 and the tool dock 1910 are connected.

The locking wedges 1930 and the sleeve 1940 function as a locking mechanism to secure the connection between the drive stem 1920 and the tool dock 1910. To disconnect the tool dock 1910 form the drive stem 1920, the sleeve 1940 is moved up to open the plurality of locking wedges 1930. The tool dock 1910 can then be moved away from the drive stem 1920.

Figures 20A, 20B:
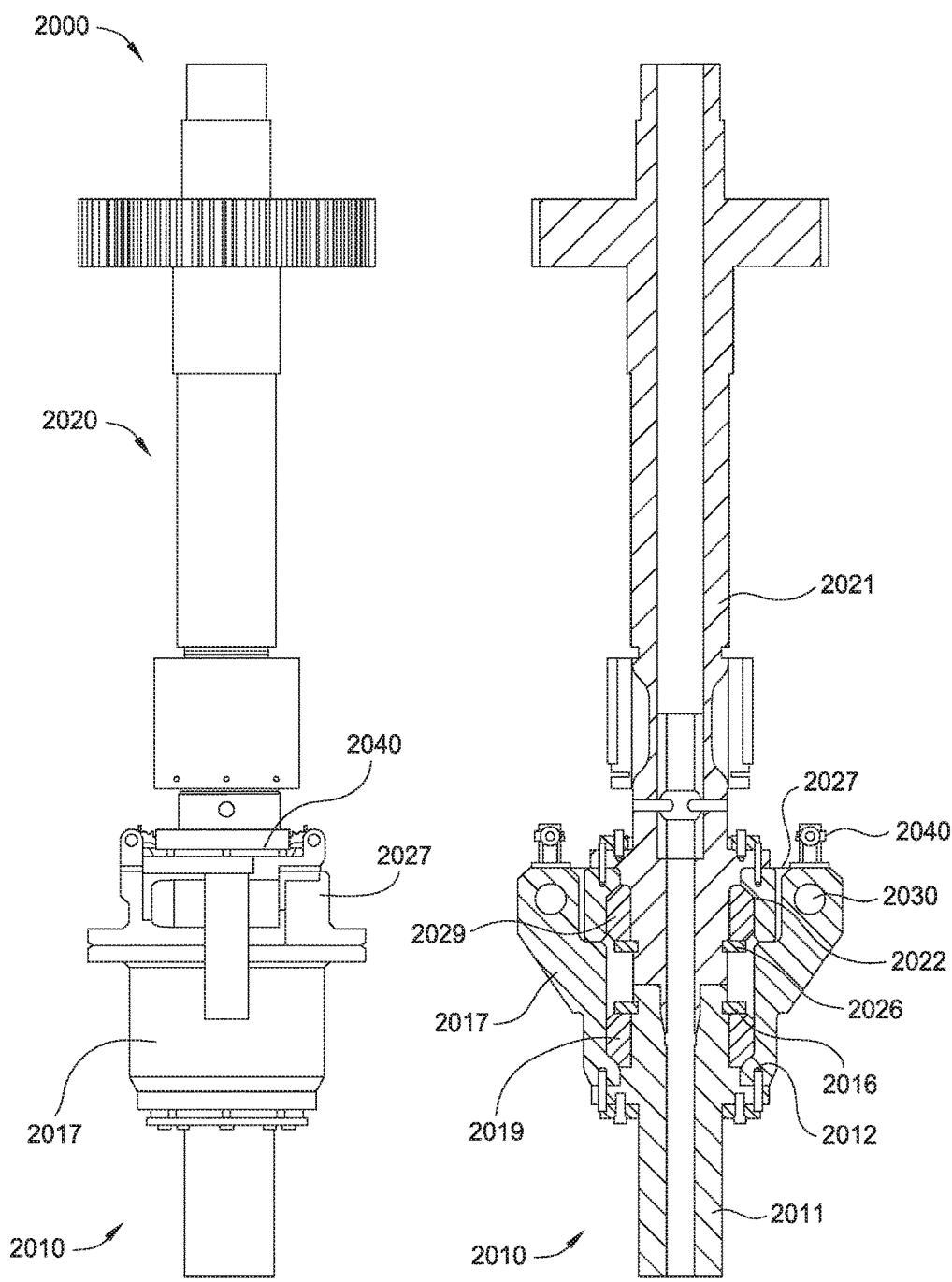
FIGS. 20A-20E schematically illustrate a combined multi-coupler according to another embodiment of the present disclosure.
Figure 20E:
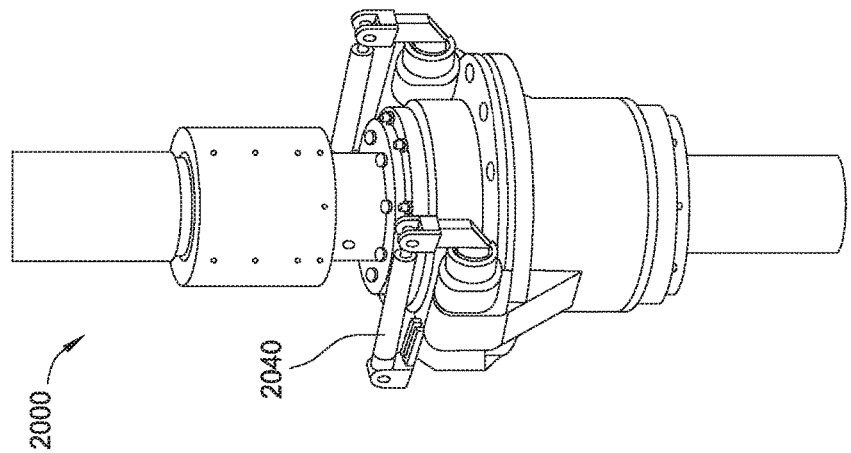
Figure 20D:
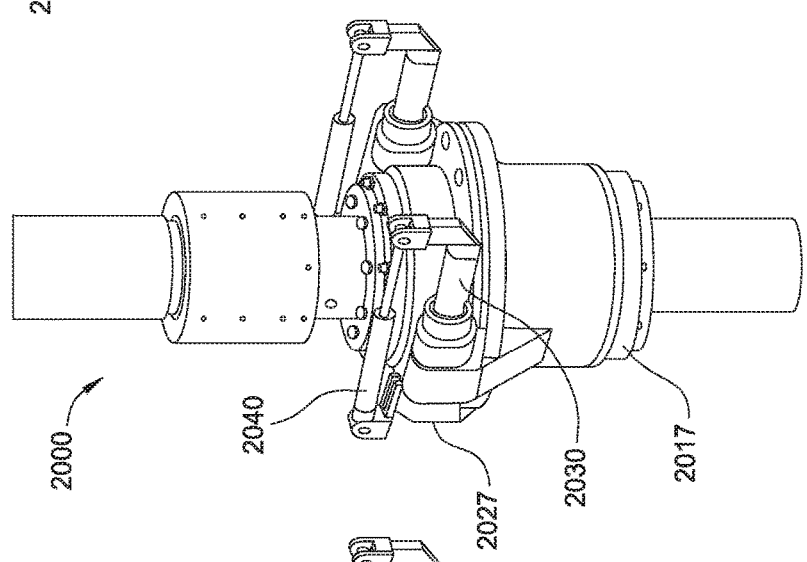
Figure 20C:
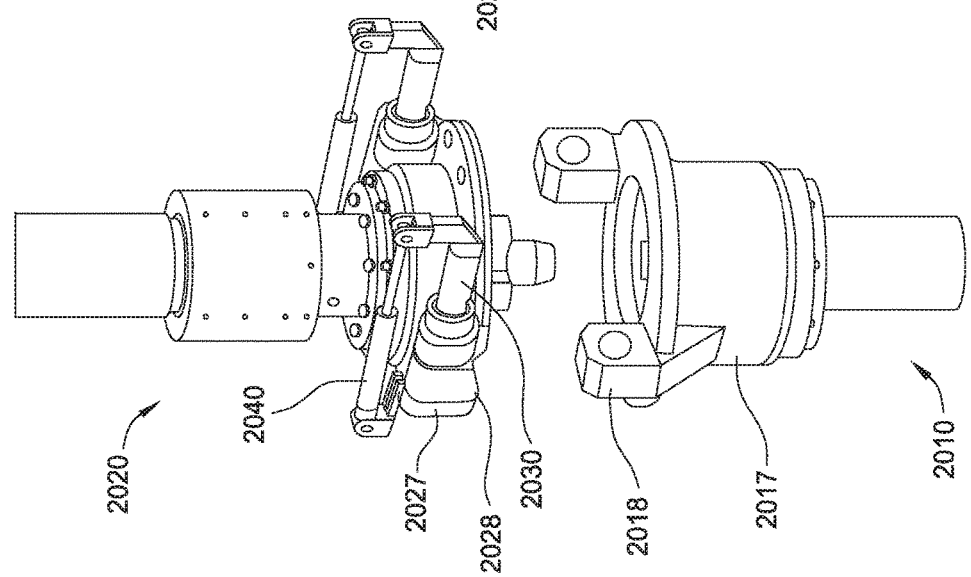

FIGS. 20A-20E illustrates a CMC 2000 according to another embodiment of the present disclosure. The CMC 2000 includes a tool dock 2010 and a drive stem 2020 joined by locking pins. FIG. 20A is a schematic perspective view of the CMC 2000 at a connected position. FIG. 20B is a schematic sectional view of the CMC 2000 at the connected position. FIG. 20C is a schematic view of the CMC 2000 at an open position.

The tool dock 2010 is similar to the tool dock 1710 except that the tool dock 2010 has a lower housing 2017 attached. The tool dock 2010 includes a stem 2011. Similar to the stem 1711, the stem 2011 may include a seal profile and torque tabs to connect with the drive stem 2020. A load nut 2019 may be connected to the drive stem 2011 by load threads. Locking tabs 2016 may be used to prevent the load nut 2019 from backing out of the threaded connection. The lower housing 2017 contacts the load nut 2019 at a load surface 2012 to transfer axial loads. The lower housing 2017 may include pin openings 2018.

The drive stem 2020 includes a mandrel 2021. The mandrel 2021 is similar to the mandrel 1721 except that the mandrel 2021 has an upper housing 2027 and a load nut 2029 attached. The load nut 2029 may be connected to the mandrel 2021 by load threads. Locking tabs 2026 may be used to prevent the load nut 2029 from backing out of the threaded connection. The upper housing 2027 contacts the load nut 2029 at a load surface 2022 to transfer axial loads.

The upper housing 2027 may have pin openings 2028 formed therein. When the drive stem 2020 and the tool dock 2010 are moved together, the pin openings 2028, 2018 may be aligned and load pins 2030 may be inserted through the pin opening 2028, 2018 to join the upper housing 2027 and the lower housing 2017 together. Two or more load pins 2030 may be used to join the upper housing 2027 and the lower housing 2017.

In one embodiment, each load pin 2030 may be coupled to an actuator 2040. The actuator 2040 is configured to move the load pin 2030 in and out the pin openings 2028, 2018. The actuator 2040 may be hydraulic, pneumatic, electric actuators. Alternatively, the load pins 2030 may be inserted and removed manually. The load pins 2030 function as a locking mechanism to secure the connection between the drive stem 2020 and the tool dock 2010.

FIGS. 20C, 20D, and 20E schematically illustrate the process of connecting the drive stem 2020 and the tool dock 2010.

Junction members, similar to the junction members 1733 and 1714 may also be disposed on the drive stem 2020 and the tool dock 2010 to facilitate connections of data, electrical, hydraulic, pneumatic communication, or any other signals. Alternatively, the junction members may be incorporated in the drive stem 2020 and the tool dock 2010 through flow channels drilled therethrough.

Alternatively, the CMC 2000 may include split or segmented upper and lower housing to incorporate load profiles in the housings, thereby eliminating the need of load nuts. The housing halves or segments may be attached together using screws or locking pins.

Figure 21I:
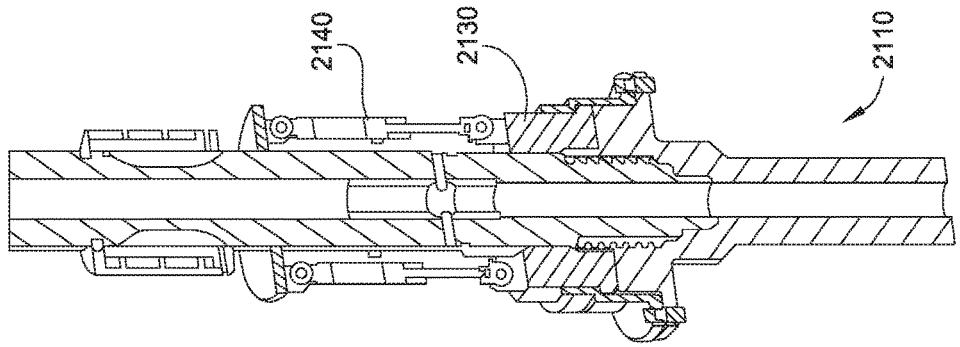

FIGS. 21A-21I illustrates a CMC 2100 according to another embodiment of the present disclosure. The CMC 2100 includes a tool dock 2110 and a drive stem 2120 having segmented buttress load profiles. FIG. 21A is a schematic view of the CMC 2100 in a connected position. FIG. 21B is a schematic sectional view of the CMC 2100 at the connected position. FIG. 20C is a schematic view of the drive stem 2120. FIG. 21D is a schematic view of the tool dock 2110.

The tool dock 2110 may be attached to or integrated on a tool, such as drilling tool, a completion tool, a wireline tool, a fracturing tool, a pump, or a sand screen. The tool dock 2110 may include a stem 2111 having a central bore 2112. The tool dock 2110 may also include a seal profile 2115 near an upper end of the central bore 2112 and shaped to make a fluid connection with the drive stem 2120.

An axial load profile 2117 may be formed inside the stem 2111 near an upper end of the stem 2111. The axial load profile 2117 may be a segmented buttress profile. A flange 2113 may extend from the stem 2111. A torque profile 2116 may be formed above the flange 2113 for transferring torsional loads. The torque profile 2116 may be a tab type, a spline type, a gear type, or any suitable type of torque profile.

One or more junction members 2114 may be disposed on the flange 2113 to be connected with matching couplers from a top drive. The junction members 2114 may be configured to establish data, electrical, hydraulic, pneumatic communication, or any other signals.

The drive stem 2120 may include a mandrel 2121 having a central bore 2122. A seal profile 2123 may be formed at a lower end of the mandrel 2121. The seal profile 2123 matches the seal profile 2115 of the tool dock 2110 to seal the connection between the drive stem 2120 and tool dock 2110 preventing high pressure fluids from leaking out of the connection.

An axial load profile 2127 may be formed around the mandrel 2121. The axial load profile 2127 matches the axial load profile 2117 of the tool dock 2110. The axial load profile 2127 may be a segmented buttress profile.

The mandrel 2121 may include a spline profile 2126 formed above the axial load profile 2127. A torque ring 2130 may be connected to the mandrel 2121 through the spline profile 2126. The torque ring 2130 may have a spline profile 2131 formed in an inner surface to couple with the spline profile 2126 so that the torque ring 2130 can move vertically along the mandrel 2121. The torque ring 2130 may have a torque profile 2124 formed at a lower surface. The torque profile 2124 matches the torque profile 2116 of the tool dock 2110.

A cover sleeve 2132 may be coupled to the torque ring 2130. One or more junction members 2135 may be disposed the cover sleeve 2132. The junction members 2135 may couple with a corresponding one of the junction members 2114 on the tool dock 2110 to facilitate connections of data, electrical, hydraulic, pneumatic communication, or any other signals. Alternatively, the junction members may be incorporated in the mandrel 2121 of the drive stem 2120 and the stem 1711 of the tool dock 2110. Flow channels may be drilled through to the mandrel 2121 and the stem 2111 to allow fluid transfer and data transmission.

Figure 21H:
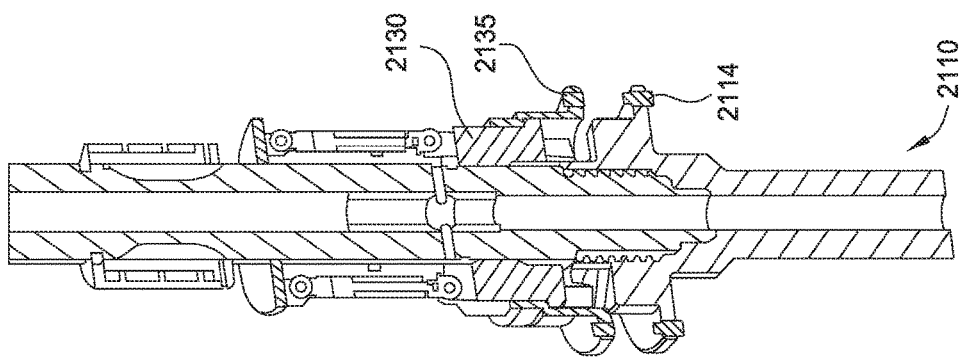
Figure 21G:
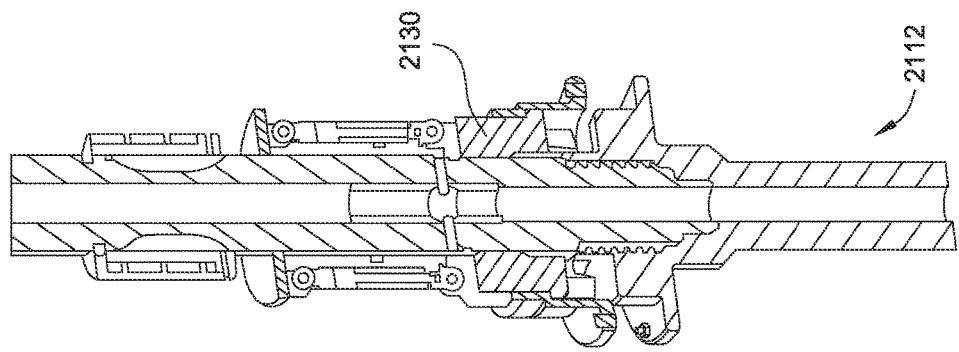
Figure 21F:
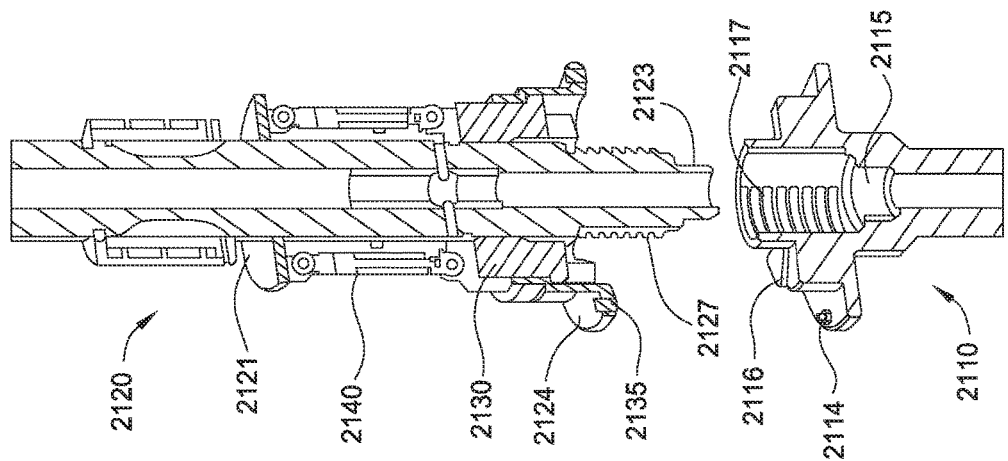

FIGS. 21F-21I schematically illustrate the process of making the connection between the drive stem 2120 and the tool dock 2110. In FIG. 21F, the actuator 2140 raises up the torque ring 2130 and the cover sleeve 2132. The drive stem 2120 and the tool dock 2110 may rotate relative to each other so that the axial load files 2117 and 2127 are in alignment for insertion. In FIG. 21G, the tool dock 2110 is stabbed to the drive stem 2120 until a seal connection is make between the seal profiles 2115, 2123. In FIG. 21H, the tool dock 2110 and the drive stem 2120 rotate relative to each other to couple the axial load profiles 2117 and 2127 so that axial loads can be transferred between the tool dock 2110 and the drive stem 2120. In FIG. 21I, the actuator 2140 lowers down the torque ring 2130 and the cover sleeve 2132 to couple the torque profiles 2116, 2124. The junction members 2114 and 2135 are also connected. The tool dock 2110 and the drive stem 2120 are connected.

The torque ring 2130 and the cover sleeve 2132 function as a locking mechanism to secure the connection between the drive stem 2120 and the tool dock 2110. To disengage the tool dock 2110 and the drive stem 2120, the torque ring 2130 and the cover sleeve 2132 may be raised first to disconnect the torque coupling and the junction members 2135, 2114. The tool dock 2110 and the drive stem 2120 can then be rotated relative to each other to disengage the axial load profiles 2127, 2117. The tool dock 2110 can then be moved away from the drive stem 2120.

The CMCs 1700, 1800, 1900, 2000, and 2100 disclosed above may be used in place of the CMC 4y with any suitable top drive tools, such as a drilling tool, a cementing tool, a casing tool, a completion tool, a wireline tool, a fracturing tool, a pump, or a sand screen.

It should be noted that coupling profiles used in any of the above CMCs may be also used in a unit rack, such as the unit rack 4k, for storing tools. Each tool dock may be secured to a tool receiving spot in the unit rack having the same profile as the profile in the drive stem.

It should be noted even though, in the embodiments described above, the tool docks are connected to a tool and the drive stems are connected to a top drive unit, structures of the tool docks may be connected to a top drive unit while structures of the corresponding drive stems may be connected to a tool.

One embodiment of the present disclosure provides a combined multi-coupler for a top drive. The combined multi-coupler includes a shaft for being rotated by a motor unit of the top drive, a stem for connecting a drilling unit, a casing unit, or a cementing unit to the shaft, a bore formed through the shaft and the stem for transporting fluid from the top drive to a tubular string connected to one of the units, a latch connected to a flange of the shaft and operable to engage a flange of the stem for longitudinally connecting the shaft and the stem, a fluid junction and an electrical junction, each junction comprising a member connected to the shaft flange and a member connected to the stem flange, a torsional coupling formed in the shaft, and a torsional coupling formed in the stem, wherein engagement of the stem with the shaft mates the torsional couplings and the junction members.

In the above combined multi-coupler the fluid junction may be a hydraulic junction. The electrical junction may be an electric power junction. The combined multi-coupler may further comprise a data junction and a pneumatic junction. Each of the data and pneumatic junctions may comprise a member connected to the shaft flange and a member connected to the stem flange.

The above combined multi-coupler may include a control swivel disposed around and connected to the shaft, control lines connecting the shaft members of the fluid junctions to a rotating member of the control swivel, and a control cable connecting the electric power junction to the rotating member, and a control cable connecting the data junction to the rotating member.

In the above combined multi-coupler, the latch may include a plurality of latch blocks and an actuator for each latch block, each actuator is connected to the respective latch block, each actuator is disposed in a slot formed in an upper face of the shaft flange and connected to the shaft, each actuator is operable to radially move the respective latch block between an engaged position and a disengaged position, and each latch block mates with a cavity of the shaft flange and a latch profile of the stem flange in the engaged position and is clear thereof in the disengaged position.

The above combined multi-coupler may further include a position sensor for each latch block and disposed in a respective cutout formed in a lower face of the shaft flange, each position sensor operable by movement of the respective latch block from the disengaged position to the engaged position.

In the above combined multi-coupler, each latch block may have a central backbone, plates extending from sides and an inner surface of the backbone, a neck extending upward from the backbone, and a lug formed on top of the neck.

In the above combined multi-coupler, each latch block may have an outer base, inner teeth extending from and along an inner surface of the base, a neck extending upward from the base, and a lug formed on top of the neck.

In the above combined multi-coupler, each latch block may have a base with a wedge formed on an inner surface thereof, a neck extending upward from the base, and a lug formed on top of the neck.

In the above combined multi-coupler, the latch may be a grapple. The grapple may include a plurality of clamps, a plurality of hinges pivotally connecting the clamps to the shaft flange, and a leveling ring surrounding the shaft.

In the above combined multi-coupler, the grapple may further include one or more actuators for raising and lowering the leveling ring relative to the shaft, and a plurality of cam mechanisms linking the clamps to the leveling ring for pivoting the clamps between an engaged position and a disengaged position in response to raising and lowering of the leveling ring, and each clamp mates with a clamp profile of the stem flange in the engaged position and is clear thereof in the disengaged position.

In the above combined multi-coupler, the shaft may be a torque shaft. The above combined multi-coupler may further include a torque sub. The torque sub includes a non-rotating interface, a recess formed in an outer surface of the torque shaft, a strain gage disposed on the torque shaft at the recess and oriented to measure torque exerted thereon, a transmitter disposed on the torque shaft, in communication with the strain gage, and operable to wirelessly transmit the torque measurement to the interface, a turns gear torsionally connected to the torque shaft, and a proximity sensor connected to the interface and located adjacent to the turns gear.

The above combined multi-coupler may further include a seal sleeve connected to the shaft, engaged with a seal bore thereof, and carrying a stab seal for engagement with a seal receptacle of the stem upon engagement of the stem with the shaft.

In the above combined multi-coupler, the drill unit may include the stem, a thread saver, and an internal blowout preventer connecting the thread saver to the stem.

In the above combined multi-coupler, the casing unit includes the stem, a thread compensator connecting a clamp to the stem, the clamp comprising a set of grippers for engaging a surface of a joint of casing, thereby anchoring the casing joint to the casing unit, and an actuator for selectively engaging and disengaging the clamp with a casing joint, and a stab seal for engaging an inner surface of the casing joint.

In the above combined multi-coupler, the cementing unit includes the stem, an internal blowout preventer, and a cementing swivel. The cementing swivel includes a housing having an inlet formed through a wall thereof for connection of a cement line, a mandrel connected to the respective quill and having a port formed through a wall thereof in fluid communication with the inlet, a bearing for supporting rotation of the mandrel relative to the housing, and a seal assembly for isolating the inlet-port communication.

In the above combined multi-coupler, the cementing unit further comprises a launcher. The launcher comprises a body connected to the mandrel of the cementing swivel, a dart disposed in the launcher body, and a gate having a portion extending into the launcher body for capturing the dart therein and movable to a release position allowing the dart to travel past the gate.

Another embodiment provides a modular top drive system for construction of a wellbore. The system includes any of the above combined multi-couplers, a rail for connection to a drilling rig, and the motor unit. The motor unit includes a drive body, a drive motor having a stator connected to the drive body, a trolley for connecting the drive body to the rail, and a quill connecting the shaft to a rotor of the drive motor.

The above system further includes a pipe handler. The pipe handler includes a handler body connected to the drive body, a pair of bails pivotally connected to the handler body, and a backup wrench. The backup wrench includes an arm, an upper hinge pivotally connecting the arm to the handler body, a pair of tong segments, a lower hinge pivotally connecting the tong segments to the arm, and a tong actuator pivotally connected to the arm and the tong segments and operable to move the tong segments between an engaged position with a drill string and a stowed position adjacent to the rail.

In the above system, the motor unit further comprises a becket for connection to a hoist of the drilling rig, a mud swivel comprising an outer barrel connected to the drive body and an inner barrel having an upper portion disposed in the outer barrel and a stinger portion for stabbing into a seal receptacle of the quill, a nipple connected to the outer barrel for receiving a mud hose, and a down thrust bearing for supporting the quill for rotation relative to the drive body.

The above system further includes a unit handler locatable on or adjacent to a structure of the drilling rig and operable to retrieve any one of the drilling, casing, and cementing units from a rack and deliver the retrieved unit to the motor unit.

In the above system, the unit handler comprises an arm, and a holder releasably connected to the arm and operable to carry any one of the drilling, casing, and cementing units.

In the above system, the unit handler further comprises a pipe clamp releasably connected to the arm and operable to carry a joint of casing or liner for delivery to the casing unit.

In the above system, the unit handler further comprises a base for mounting the unit handler to a subfloor structure of the drilling rig, a post extending from the base to a height above a floor of the drilling rig, a slide hinge transversely connected to the post, and the arm connected to the slide hinge and comprising a forearm segment, an aft-arm segment, and an actuated joint connecting the arm segments.

Embodiment of the present disclosure includes a combined multi-coupler, comprising a first tubular member having a first load profile and a first junction member, and a second tubular member having a second load profile and a second junction member. Engagement of the first tubular member to the second tubular member forms a connection between the first and second load profiles to transfer at least one of axial load and torsional load and a connection between the first and second junction members to transfer fluid or signals.

In one or more embodiments, one of the first tubular member and the second tubular member is a tool dock for connecting to one of a drilling tool, a cementing tool, a casing tool, a completion tool, a wireline tool, a fracturing tool, a pump, and a sand screen.

In one or more embodiments, the other one of the first tubular member and the second tubular member is a drive stem connected to a top drive.

In one or more embodiments, the first and second junction members comprise one or more of a hydraulic junction, an electric power junction, a data junction, and a pneumatic junction.

In one or more embodiments, the first tubular member has a first central bore and a first seal profile around the first central bore, the second tubular member has a second central bore and a second seal profile around the second central bore, and engagement of the first and second tubulars forms a sealed connection between the first and second central bores.

In one or more embodiments, the first tubular member comprises a stem having the first central bore, and a flange extended from the stem, wherein the first junction member is disposed on the flange.

In one or more embodiments, the second tubular member comprises a mandrel having the second central bore, and a latch head coupled to the mandrel, and a latch disposed on the latch head to engage the first and second tubular members.

In one or more embodiments, the second tubular member comprises a mandrel having the second central bore, a plurality of locking clamps movably disposed around the mandrel, and a sleeve disposed outside the plurality of locking clamps, wherein vertical movement of the sleeve opens and closes the plurality of locking clamps.

In one or more embodiments, each locking clamp has a C-shaped body, a first end of the C-shaped body couples with the second load profile.

In one or more embodiments, the second tubular member comprises a mandrel having the second central bore and an external threads, a guide ring coupled to the mandrel through the external threads, a load nut connected to the guide ring, wherein the load nut has an internal load thread matching the first load profile on the first tubular member and a load shoulder matching the second load profile.

In one or more embodiments, the second tubular member further comprises a drive gear coupled to gears formed on an outer surface of the load nut.

In one or more embodiments, the second tubular member comprises a mandrel having the second central bore, a plurality of locking wedges disposed radially around the central bore, wherein each locking wedge includes an upper load profile matching the second load profile and a lower load profile matching the first load profile, and a sleeve disposed outside the plurality of locking wedges, wherein vertical movement of the sleeve moves the plurality of locking wedges radially inward and outward.

In one or more embodiments, the first tubular member comprises a stem having the first central bore, and a first housing coupled to the stem, the second tubular member comprises a mandrel having the second central bore, and a second housing coupled to the mandrel, and one or more load pins selectively joining the first housing to the second housing.

In one or more embodiments, the second tubular member further comprises a load nut coupled to the mandrel through the second load profile, and the second housing contacts the load nut.

One or more embodiments further includes a locking mechanism actuated by a hydraulic, pneumatic, electric, or other power source to lock the first and second tubular members to transfer axial load and/or torque.

In one or more embodiments, the second tubular member comprises a mandrel having the second central bore, wherein the second load profile includes a segmented buttress profile formed on the mandrel, and a torque ring movably disposed around the mandrel.

In one or more embodiments, the second tubular member further comprises an actuator coupled to the torque ring.

In one or more embodiments of the present disclosure, a modular top drive system for construction of a wellbore includes a tool, a tool dock connected to the tool, wherein the tool dock has a first load profile and a first junction member, a top drive, and a drive stem connected to the top drive, wherein the drive stem has a second load profile and a second junction member. Engagement of the tool dock and the drive stem forms a connection between the first and second load profiles for transferring at least one of axial load and torsional load, and a connection between the first and second junction member for transferring fluid or electric communication between the tool and the top drive.

In one or more embodiments of the present disclosure, the tool is one of a drilling tool, a cementing tool, a casing tool, a completion tool, a wireline tool, a fracturing tool, a pump, and a sand screen.

In one or more embodiments of the present disclosure, a method for constructing a wellbore comprising engaging a tool dock to a drive stem connected to a top drive to formed a connection, transferring at least one of axial load and torsional load through the connection, and transferring at least at least one of hydraulic fluid, electric power, electric signals, data, and pneumatic signals through the junction.

In one or more embodiments of the present disclosure, the method for constructing a wellbore further comprising performing through a tool coupled to the tool dock at least one of a drilling operation, a casing operation, a cementing operation, a completion operation, a logging operation, a fracturing operation, and an oil recovery operation.

In one or more embodiments of the present disclosure, the method for constructing a wellbore further comprising locking the engagement of the tool dock and the drive stem by a locking mechanism.

In one or more embodiments of the present disclosure, the locking mechanism is activated by hydraulic power, electric power, or other source of power.

In one or more embodiments of the present disclosure, the locking mechanism is activated by at least at least one of hydraulic fluid, electric power, electric signals, data, and pneumatic signals transferred through the junction.

In one or more embodiments of the present disclosure, the locking mechanism translates and/or rotates the tool dock or the drive stem to secure the engagement between the tool dock and the drive stem.

In one or more embodiments of the present disclosure, the first load profile comprises a first axial load profile and a first torque profile, and the second load profile comprises a second axial load profile corresponding to the first axial load profile and a second torque profile corresponding to the first torque profile.

While the foregoing is directed to embodiments of the present disclosure, other and further embodiments of the disclosure may be devised without departing from the basic scope thereof, and the scope of the invention is determined by the claims that follow.

The invention claimed is:

1. A combined multi-coupler, comprising:
a first tubular member having a first load profile and a first junction member, wherein the first tubular member is a tool dock for connecting to one of a drilling tool, a cementing tool, a casing tool, a completion tool, a wireline tool, a fracturing tool, a pump, and a sand screen;
a second tubular member having a second load profile and a second junction member, wherein the second tubular member is a drive stem connected to a top drive;
a sleeve member disposed around the second tubular member;
a plurality of locking clamps pivotally coupled to the second tubular member and configured to pivot from an open position to a closed position, wherein the plurality of locking clamps are at least partially disposed between the second tubular member and the sleeve member;
the sleeve member is configured to move in a vertical direction from a first position to a second position to move the plurality of locking clamps from the open position to the closed position, respectively; and wherein engagement of the first tubular member to the second tubular member forms a connection between the first and second load profiles, and a connection between the first and second junction members to transfer fluid or signals, and the engagement of the first tubular member and the second tubular member is secured by the plurality of locking clamps when the plurality of locking clamps are in the closed position.

2. The combined multi-coupler of claim 1, wherein the first and second junction members comprise one or more of a hydraulic junction, an electric power junction, a data junction, and a pneumatic junction.

3. The combined multi-coupler of claim 1, wherein the first tubular member has a first central bore with a first seal profile, the second tubular member has a second central bore with a second seal profile, and engagement of the first and second tubular members forms a sealed connection between the first and second central bores.

4. The combined multi-coupler of claim 1, wherein the first tubular member comprises:
a stem having a first central bore; and
a flange extended from the stem, wherein the first junction member is disposed on the flange.

5. The combined multi-coupler of claim 1, wherein the second tubular member comprises:
a mandrel having a second central bore.

6. The combined multi-coupler of claim 5, wherein each locking clamp has a C-shaped body, a first end of the C-shaped body couples with the second load profile.

7. The combined multi-coupler of claim 1, wherein the plurality of locking clamps and the sleeve member function as a locking mechanism actuated by a hydraulic, pneumatic, electric, or other power source to lock the first and second tubular members.

8. The combined multi-coupler of claim 1, wherein the second tubular member further comprises a groove.

9. The combined multi-coupler of claim 8, wherein the plurality of locking clamps have an upper end, and wherein the upper end of each locking clamp is disposed in the groove and the plurality of locking clamps are configured to pivot in the groove.

10. The combined multi-coupler of claim 9, wherein the upper end of each locking clamp has an actuation profile, the groove has an actuation profile, and the plurality of locking clamps are configured to pivot from the open position to the closed position along the respective actuation profiles.

11. The combined multi-coupler of claim 1, further comprising an actuator coupled to the second tubular member configured to move the sleeve member in the vertical direction between the first position and the second position.

12. The combined multi-coupler of claim 11, wherein the plurality of locking clamps pivot from the closed position to the open position when a contact surface of an upper end of each locking clamp interacts with an inner groove of the sleeve member as the sleeve member moves from the second position to the first position.

13. The combined multi-coupler of claim 1, wherein the plurality of locking clamps are coupled to the first tubular member in the closed position.

14. The combined multi-coupler of claim 1, the second tubular member further comprising an internal blowout preventer.

15. A modular top drive system for construction of a wellbore, comprising:
a tool;
a tool dock connected to the tool, wherein the tool dock has a first load profile and a first junction member;
a top drive; and
a drive stem connected to the top drive, wherein the drive stem has a second load profile and a second junction member;
a sleeve member disposed around the drive stem;
a plurality of locking clamps pivotally coupled to the drive stem and at least partially disposed between the drive stem and the sleeve member, and wherein the plurality of locking clamps are configured to pivot from an open position to a closed position; and
the sleeve member configured to move in a vertical direction from a first position to a second position to move the plurality of locking clamps from the open position to the closed position;
wherein engagement of the tool dock and the drive stem forms a connection between the first and second load profiles and a connection between the first and second junction members for transferring fluid or electric communication between the tool and the top drive, and wherein the engagement of the tool dock and the drive stem is secured by the plurality of locking clamps when in the closed position.

16. The modular top drive system of claim 15, wherein the tool is one of a drilling tool, a cementing tool, a casing tool, a completion tool, a wireline tool, a fracturing tool, a pump, and a sand screen.

17. The modular top drive system of claim 15, further comprising:
the drive stem having a groove;
the plurality of locking clamps having an upper end, wherein the upper end of each locking clamp is disposed in the groove and configured to pivot in the groove from the open position to the closed position.

18. A method for constructing a wellbore, comprising:
engaging a tool dock to a drive stem connected to a top drive to form a connection, wherein a sleeve member is disposed around the drive stem;
securing the connection by moving a plurality of clamping members pivotally coupled to the drive stem with the sleeve member from an open position to a closed position to couple the plurality of clamping members to the tool dock, wherein the plurality of clamping members are at least partially disposed between the drive stem and the sleeve member;
transferring at least one of axial load and torsional load through the connection; and
transferring at least one of hydraulic fluid, electric power, electric signals, data, and pneumatic signals through the connection.

19. The method of claim 18, wherein the plurality of clamping members function as a locking mechanism, and further comprising activating the locking mechanism by at least one of hydraulic fluid, electric power, electric signals, data, and pneumatic signals transferred through the connection to secure the engagement between the tool dock and the drive stem.

* * * * *